(12) United States Patent
Park et al.

(10) Patent No.: US 11,487,097 B1
(45) Date of Patent: Nov. 1, 2022

(54) SYSTEM AND METHOD FOR SYNCHRONIZED FLUORESCENCE CAPTURE

(71) Applicant: Ramona Optics Inc., Durham, NC (US)

(72) Inventors: Jaehee Park, Durham, NC (US); Mark Harfouche, Durham, NC (US); Gregor Horstmeyer, Durham, NC (US); Jed Doman, Durham, NC (US); Paul Reamey, Durham, NC (US)

(73) Assignee: Ramona Optics Inc., Durham, NC (US)

( * ) Notice: Subject to any disclaimer, the term of this patent is extended or adjusted under 35 U.S.C. 154(b) by 0 days.

(21) Appl. No.: 17/159,100

(22) Filed: Jan. 26, 2021

Related U.S. Application Data

(60) Provisional application No. 62/965,946, filed on Jan. 26, 2020.

(51) Int. Cl.
| | |
|---|---|
| H04N 7/18 | (2006.01) |
| G02B 21/16 | (2006.01) |
| H04N 5/247 | (2006.01) |
| H04N 5/225 | (2006.01) |
| H04N 5/265 | (2006.01) |
| G02B 21/06 | (2006.01) |
| G02B 21/36 | (2006.01) |
| G01N 21/64 | (2006.01) |
| H04N 5/262 | (2006.01) |

(52) U.S. Cl.
CPC ......... *G02B 21/16* (2013.01); *G01N 21/6428* (2013.01); *G01N 21/6458* (2013.01); *G02B 21/06* (2013.01); *G02B 21/367* (2013.01); *H04N 5/2256* (2013.01); *H04N 5/247* (2013.01); *H04N 5/265* (2013.01); *H04N 5/2624* (2013.01); *G01N 2021/6439* (2013.01)

(58) Field of Classification Search
CPC ...... G02B 21/16; G02B 21/06; G02B 21/367; G01N 2021/6439; G01N 21/6428; G01N 21/6458; H04N 5/2256; H04N 5/247; H04N 5/2624; H04N 5/265
USPC .......................................................... 348/79
See application file for complete search history.

(56) References Cited

U.S. PATENT DOCUMENTS

| | | | | |
|---|---|---|---|---|
| 5,480,804 | A * | 1/1996 | Niwa | G01N 21/6428 250/461.2 |
| 10,859,805 | B2 * | 12/2020 | Themelis | G02B 21/36 |
| 2011/0284720 | A1 * | 11/2011 | Wu | G02B 21/245 250/201.3 |
| 2012/0085928 | A1 * | 4/2012 | Jung | G01N 21/6452 250/458.1 |
| 2018/0307031 | A1 * | 10/2018 | Deissler | G02B 21/06 |
| 2020/0300764 | A1 * | 9/2020 | Gerlach | G01N 33/564 |

* cited by examiner

*Primary Examiner* — Jayanti K Patel
*Assistant Examiner* — Richard B Carter
(74) *Attorney, Agent, or Firm* — Patent2ip LLC; Tue Nguyen

(57) ABSTRACT

A system and method for high resolution multi-fluorescence imaging with synchronized image acquisition amongst sensors can be used to simultaneously capture fluorescence signals from multiple fluorophores over extremely large fields of view. The system can include an array of microcameras, along with a particular arrangement of fluorescent filters that can be fixed in one location or moved to new locations.

20 Claims, 50 Drawing Sheets

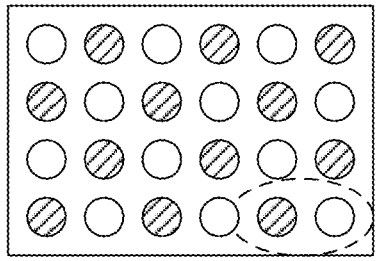
(a)
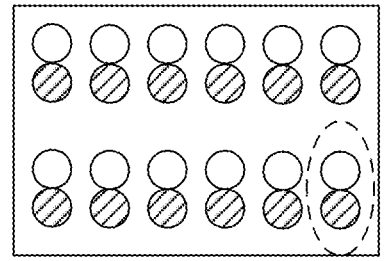
(b)
FIG. 10A
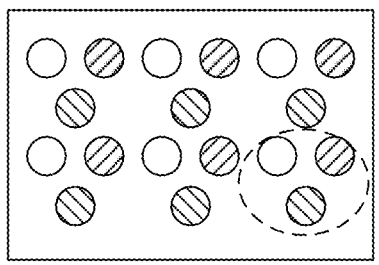
(a)
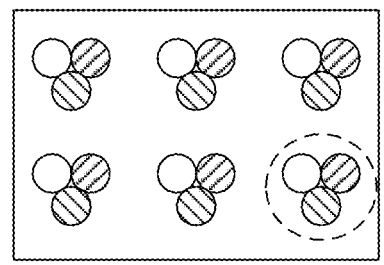
(b)
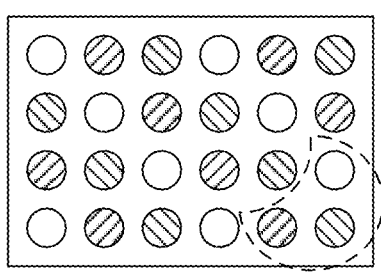
(c)
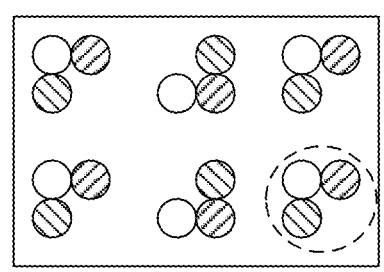
(d)
FIG. 10B
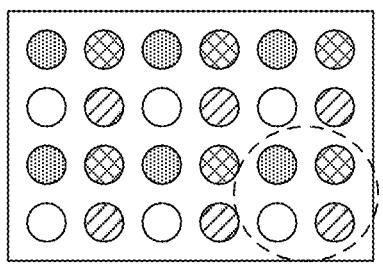
(a)
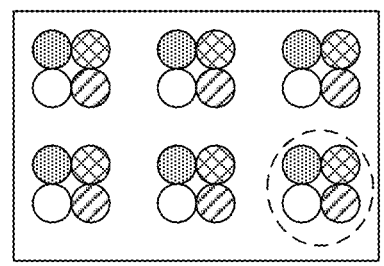
(b)
FIG. 10C

Generating multiple illumination patterns in sequence, wherein each pattern comprises radiation from one or more light sources, wherein the light sources are configured either to generate a fluorescence excitation on a sample or to illuminate the sample
1100

*FIG. 11A*

Generating multiple illumination patterns in sequence, wherein each pattern comprises radiation from one or more light sources, wherein each light source is configured either to generate different fluorescence excitation on a sample or to illuminate the sample
1120

*FIG. 11B*

Generating multiple illumination patterns in sequence, wherein a first group of patterns comprises radiation from one or more first light sources, wherein each first light source is configured either to generate a same first fluorescence excitation on a sample or to illuminate the sample, wherein a second group of patterns comprises radiation from one or more second light sources, wherein each second light source is configured either to generate a same second fluorescence excitation different from the first fluorescence excitation or to illuminate the sample
1140

*FIG. 11C*

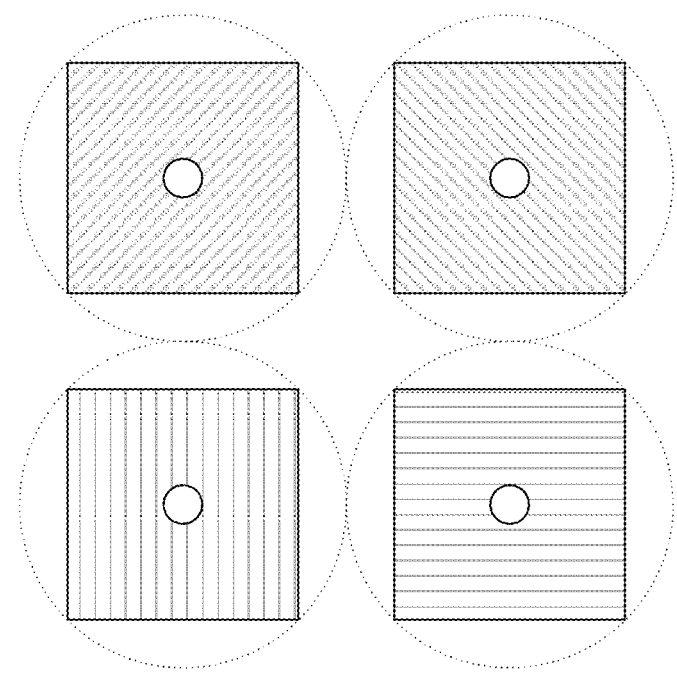
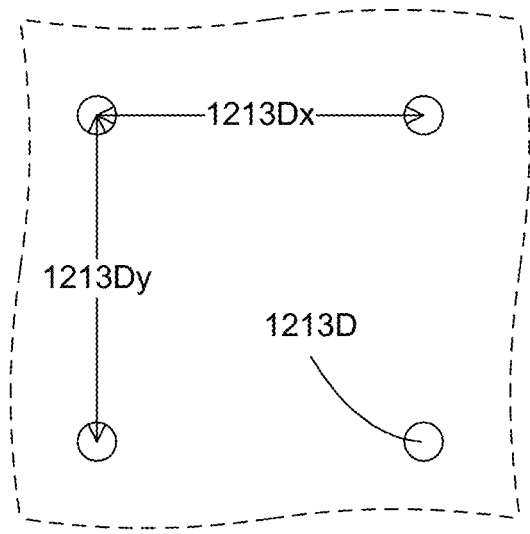
FIG. 12D

Forming a camera array, wherein 2 adjacent cameras in the camera array in 2 directions comprise an overlapped field of view, wherein the overlapped field of view is configured for stitching images captured by the 2 adjacent cameras
1300

FIG. 13A

Forming a camera array, wherein 2 adjacent first cameras in the camera array in a first direction comprise a first overlapped field of view, wherein the first overlapped field of view is configured for stitching images captured by the 2 adjacent first cameras, wherein 2 adjacent second cameras in the camera array in a second direction comprise a second overlapped field of view, wherein the second overlapped field of view is configured for fusing images captured by the 2 adjacent second cameras, wherein the fused images comprise better resolution than individual images used for fusing
1320

FIG. 13B

Forming a camera array, wherein 2 adjacent cameras in the camera array in 2 directions comprise an overlapped field of view, wherein the overlapped field of view is configured for fusing images captured by the 2 adjacent cameras, wherein the fused images comprise better resolution than individual images used for fusing
1340

FIG. 13C

Forming a camera array, wherein 2 adjacent cameras in the camera array in 2 directions comprise a non-overlapped field of view
1360

FIG. 13D

Forming a camera array, wherein the camera array comprises 2 sets of cameras, wherein 2 adjacent cameras in each set of cameras in 2 directions comprise a stitchable overlapped field of view
1400

Forming a camera array, wherein the camera array comprises 4 sets of cameras, wherein 2 adjacent cameras in each set of cameras in 2 directions comprise a stitchable overlapped field of view
1500

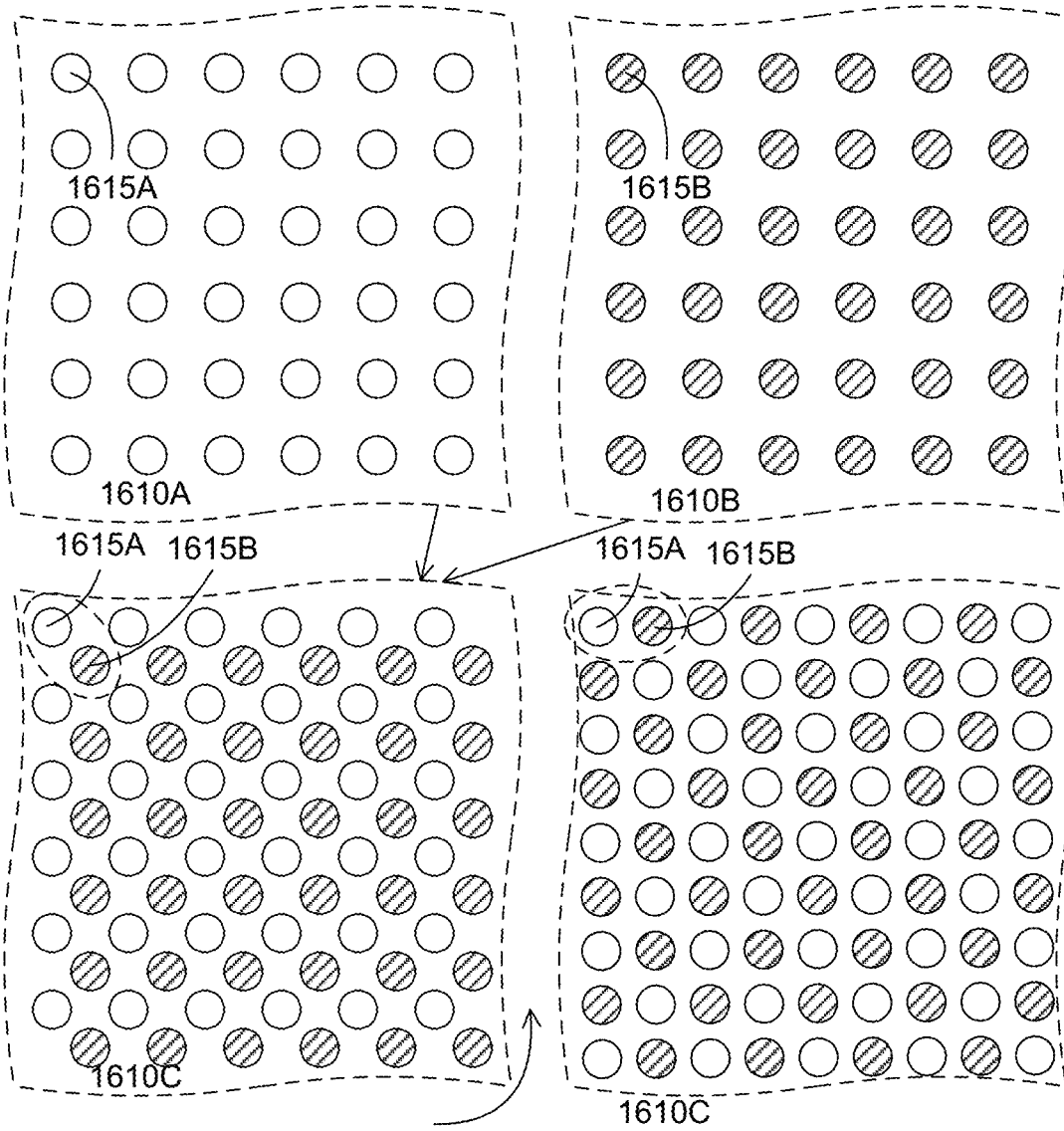

Forming a camera array, wherein the camera array comprises 4 sets of cameras, wherein 2 adjacent cameras in each set of cameras in 2 directions comprise a fusable overlapped field of view
1700

Forming a camera array, wherein the camera array comprises 2 sets of cameras, wherein 2 adjacent cameras in each set of cameras in a first direction comprise a stitchable overlapped field of view, wherein 2 adjacent cameras in each set of cameras in a second direction comprise a fusable overlapped field of view
1800

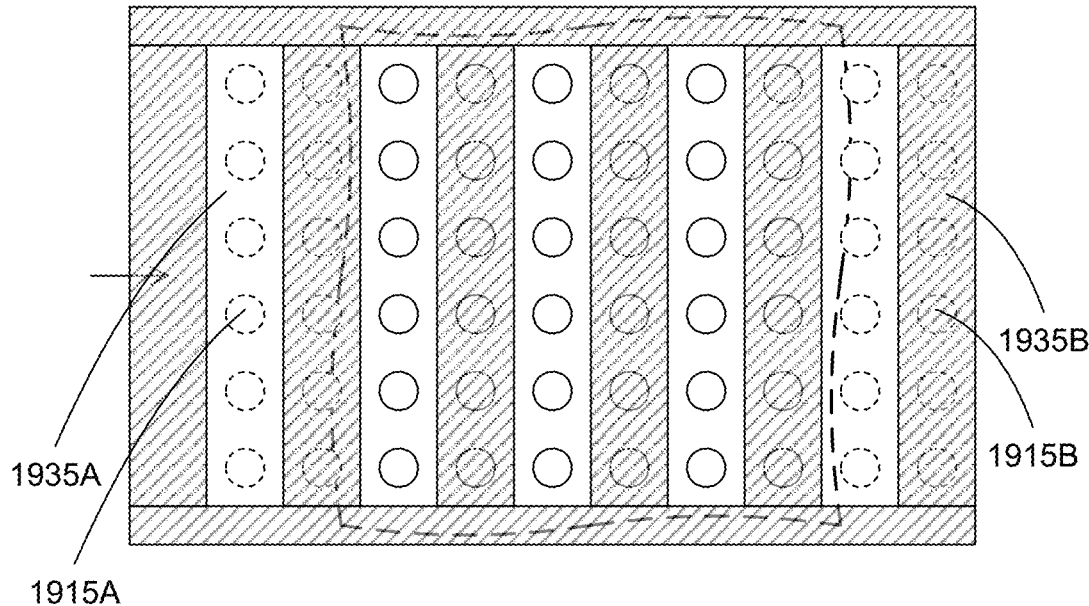
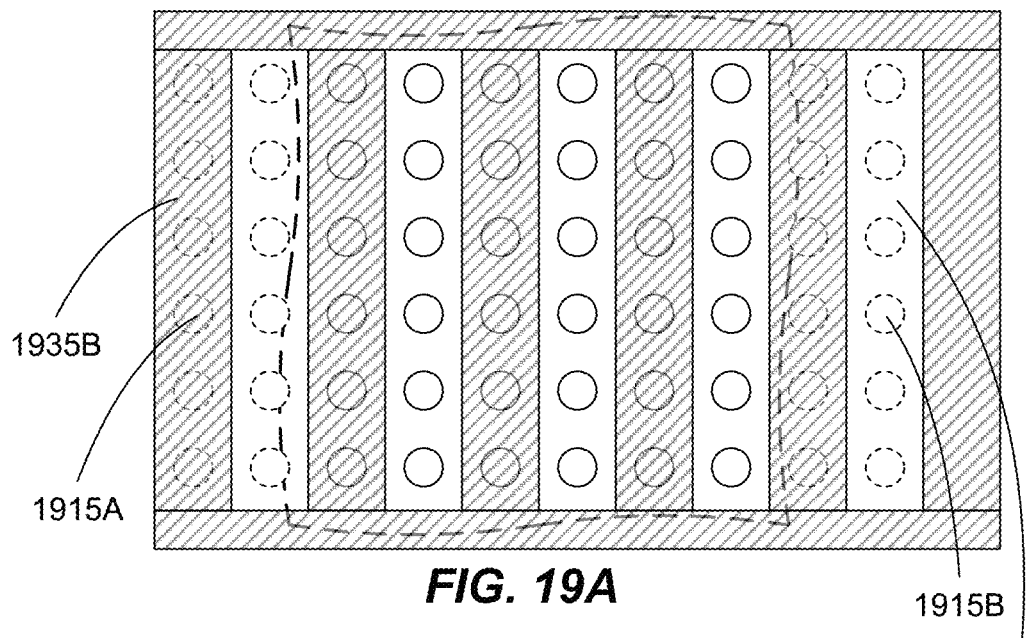
FIG. 19A
Forming a camera array, wherein 2 adjacent cameras in 2 directions comprise a fusable overlapped field of view, wherein a filter is configured to change a capture characteristic of a row or column of cameras by shifting in the column or row direction, respectively
1900
FIG. 19B

Forming a camera array, wherein 2 adjacent cameras in 2 directions comprise a fusable overlapped field of view, wherein a filter is configured to change a capture characteristic of a set of cameras by shifting in 3 directions
2000

Forming an image system, wherein the image system comprises an array of radiation sources and an array of cameras, wherein the radiation sources are configured to generate a radiation having wavelengths configured to generate fluorescence excitation on the sample, wherein the cameras are configured to capture the fluorescence signal emitted from the sample due to the fluorescence excitation
2200

*FIG. 22A*

Illuminating a sample with a first pattern, wherein the pattern comprises light having wavelengths configured to generate fluorescence excitation on the sample
2220

Capturing images corresponded to the first pattern
2221

Stitching the images into a stitched image
2222

Repeating for other patterns with the same excitation wavelengths
2223

Fusing the stitched images
2224

Computing fluorescence properties from the fused image
2225

*FIG. 22B*

Forming an image system, wherein the image system comprises an array of radiation sources and an array of cameras, wherein the radiation sources are configured to generate two types of radiation having wavelengths configured to generate two types of fluorescence excitation on the sample, wherein the cameras are configured to be covered by movable emission filters for sequentially capturing the two types of fluorescence signals emitted from the sample due to the two types of fluorescence excitation
2240

*FIG. 22C*

Positioning emission filters to covering a camera array with a first type of emission filters
2260

Illuminating a sample with a first pattern, wherein the pattern comprises radiation having wavelengths configured to generate a first type of fluorescence excitation on the sample
2260

Capturing images corresponded to the first pattern
2261

Shifting the emission filters to cover the camera array with a second type of emission filters
2263

Illuminating a sample with a second pattern, wherein the pattern comprises radiation having wavelengths configured to generate a second type of fluorescence excitation on the sample
2264

Capturing images corresponded to the second pattern
2265

*FIG. 22D*

Forming a retrofit assembly for a computational imaging system, wherein the computational imaging system comprises an array of radiation sources and an array of cameras,
wherein the retrofit assembly comprises a set of first filters configured to enable the radiation sources to generate radiation having wavelengths configured to generate fluorescence excitation on a sample,
wherein the retrofit assembly comprises a set of second filters configured to enable the cameras to capture the fluorescence signal emitted from the sample due to the fluorescence excitation
2400

*FIG. 24A*

Placing a set of first filters on radiation sources of an array of radiation sources of a computational imaging system, wherein the set of first filters is configured to enable the radiation sources to generate radiation having wavelengths configured to generate fluorescence excitation on a sample of the computational imaging system
2420

Placing a set of second filters on cameras of an array of cameras of the computational imaging system, wherein the set of second filters is configured to enable the cameras to capture the fluorescence signal emitted from the sample due to the fluorescence excitation
2430

*FIG. 24B*

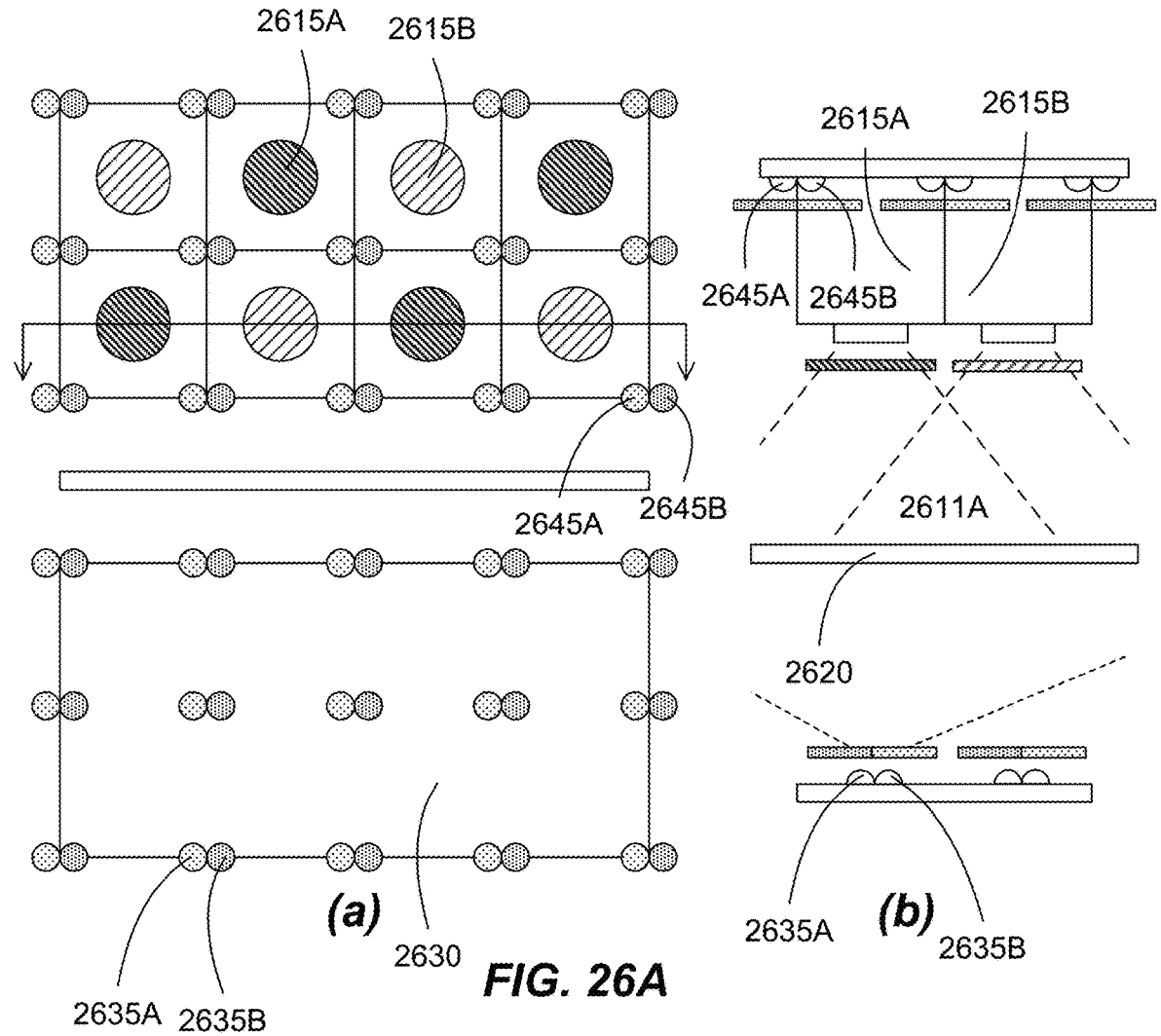
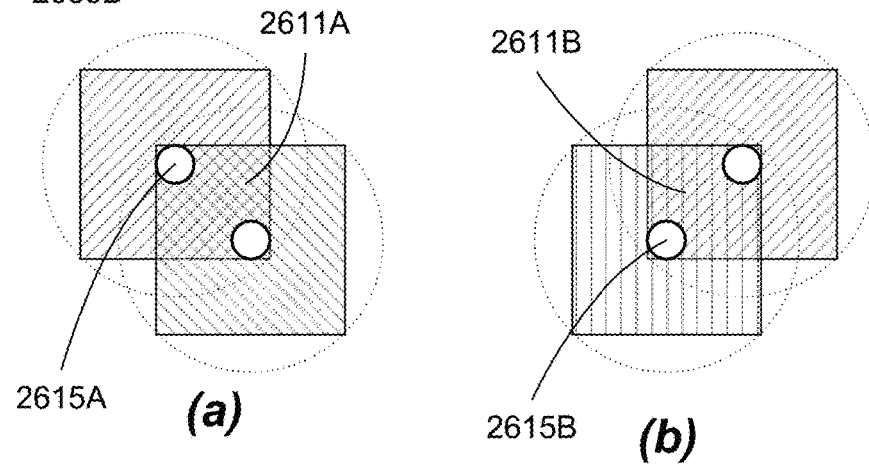
FIG. 26A
FIG. 26B

Forming a computational imaging system, wherein the computational imaging system comprises an array of radiation sources and an array of cameras, wherein the radiation sources comprise multiple sets of radiation sources, wherein each set of radiation sources is configured to generate radiation having a different band of wavelengths with each band configured to generate a different fluorescence excitation on the sample, wherein the cameras comprise multiple sets of cameras, with each set of cameras configured to capture fluorescence signals emitted from the sample due to the fluorescence excitation based on a band of wavelengths, wherein 2 adjacent cameras in each set of cameras in two directions comprise a fusable overlapped field of view
2700

*FIG. 27A*

Forming a computational imaging system, wherein the computational imaging system comprises an array of radiation sources and an array of cameras, wherein the radiation sources comprise multiple sets of radiation sources, wherein a first set of radiation sources is configured to illuminate a sample, wherein a second set of radiation source is configured to generate radiation having a band of wavelengths configured to generate a fluorescence excitation on the sample, wherein the cameras comprise multiple sets of cameras, wherein a first set of cameras is configured to capture images illuminated by the first set of radiation sources, wherein a second set of cameras is configured to capture fluorescence signals emitted from the sample due to the fluorescence excitation based on the band of wavelengths, wherein 2 adjacent cameras in each set of cameras in two directions comprise a fusable overlapped field of view
2720

*FIG. 27B*

Illuminating a sample with a sequence of patterns, wherein each pattern comprises light having first wavelengths configured to generate first fluorescence excitation on the sample, wherein the each pattern further comprises light having second wavelengths configured to generate second fluorescence excitation on the sample
2800

*FIG. 28A*

Illuminating a sample with a sequence of patterns, wherein each pattern comprises light having first wavelengths configured to generate first fluorescence excitation on the sample, wherein the each pattern further comprises light having second wavelengths configured to illuminating the sample
2820

*FIG. 28B*

Illuminating a sample with a sequence of patterns, wherein a first pattern comprises light having first wavelengths configured to generate first fluorescence excitation on the sample, wherein a second pattern comprises light having second wavelengths configured to generate second fluorescence excitation on the sample
2840

*FIG. 28C*

Illuminating a sample with a sequence of patterns, wherein a first pattern comprises light having first wavelengths configured to generate first fluorescence excitation on the sample, wherein a second pattern comprises light having second wavelengths configured to illuminating the sample
2860

*FIG. 28D*

Forming a retrofit assembly for a computational imaging system, wherein the computational imaging system comprises an array of radiation sources and an array of cameras,
wherein the retrofit assembly comprises a set of first filters configured to enable checkerboard alternate radiation sources to generate radiation having wavelengths configured to generate fluorescence excitation on a sample,
wherein the retrofit assembly comprises a set of second filters configured to enable checkerboard alternate cameras to capture the fluorescence signals emitted from the sample due to the fluorescence excitation,
wherein the retrofit assembly comprises a modification of fuse algorithm to account for a new overlapped field of view of adjacent checkerboard alternate cameras
3100

*FIG. 31A*

Forming a retrofit assembly for a computational imaging system, wherein the computational imaging system comprises an array of radiation sources and an array of cameras,
wherein the retrofit assembly comprises two sets of first and second filters configured to enable checkerboard alternate radiation sources to generate radiation having wavelengths configured to generate two different fluorescence excitation on a sample,
wherein the retrofit assembly comprises two sets of third and fourth filters configured to enable checkerboard alternate cameras to capture the fluorescence signals emitted from the sample due to the different fluorescence excitation,
wherein the retrofit assembly comprises a modification of fuse algorithm to account for a new overlapped field of view of adjacent checkerboard alternate cameras
3120

*FIG. 31B*

Forming a computational imaging system, wherein the computational imaging system comprises an array of radiation sources and an array of cameras, wherein the radiation sources comprise multiple sets of radiation sources,
wherein one of
wherein each set of radiation sources is configured to generate radiation having a different band of wavelengths with each band configured to generate a different fluorescence excitation on the sample,
or
wherein a first set of radiation sources is configured to illuminate a sample, wherein a second set of radiation source is configured to generate radiation having a band of wavelengths configured to generate a fluorescence excitation on the sample, wherein the cameras comprise multiple sets of cameras, wherein the multiple sets of cameras are arranged in columns,
wherein one of
wherein each set of cameras is configured to capture fluorescence signals emitted from the sample due to the fluorescence excitation based on a band of wavelengths,
or
wherein a first set of cameras is configured to capture images illuminated by the first set of radiation sources, wherein a second set of cameras is configured to capture fluorescence signals emitted from the sample due to the fluorescence excitation based on the band of wavelengths, wherein adjacent cameras in each set of cameras in a first direction along the columns of cameras comprise a fusable overlapped field of view, wherein adjacent cameras in each set of cameras in a second direction across the columns comprise a stitchable overlapped field of view, wherein the computational imaging system comprises a fusing algorithm to fuse images captured from each set of cameras

Providing a computational imaging system, wherein the computational imaging system comprises a camera array and an array of radiation sources, wherein adjacent cameras in the camera array are separate by a distance that provides overlapped field of views for fusing captured images
3700

Placing a set of first filters on alternate columns of the radiation sources of the array of radiation sources, wherein the set of first filters is configured to enable the radiation sources to generate radiation having wavelengths configured to generate first fluorescence excitation on a sample of the computational imaging system
3710

Optionally placing a set of second filters on remaining columns of the radiation sources of the array of radiation sources for generating second fluorescence excitation on the sample
3720

Placing a set of third filters on alternate columns of the cameras of the array of cameras, wherein the set of third filters is configured to enable the cameras to capture the fluorescence signal emitted from the sample due to the first fluorescence excitation
3730

Optionally placing a set of fourth filters on remaining columns of cameras of the array of cameras for capturing second fluorescence excitation
3740

Modifying fusing algorithm to account for new overlapped filed of views of the adjacent cameras
3750

*FIG. 37*

Forming a retrofit assembly for a computational imaging system, wherein the computational imaging system comprises an array of radiation sources and an array of cameras,
wherein the retrofit assembly comprises a set of first filters configured to enable alternate columns of the radiation sources to generate radiation having wavelengths configured to generate fluorescence excitation on a sample,
wherein the retrofit assembly comprises a set of second filters configured to enable columns of the cameras to capture the fluorescence signals emitted from the sample due to the fluorescence excitation,
wherein the retrofit assembly comprises a modification of fuse algorithm to account for a new overlapped field of view of adjacent alternate columns of the cameras
3800

*FIG. 38A*

Forming a retrofit assembly for a computational imaging system, wherein the computational imaging system comprises an array of radiation sources and an array of cameras,
wherein the retrofit assembly comprises two sets of first and second filters configured to enable alternate columns of the radiation sources to generate radiation having wavelengths configured to generate two different fluorescence excitation on a sample,
wherein the retrofit assembly comprises two sets of third and fourth filters configured to enable alternate columns of the cameras to capture the fluorescence signals emitted from the sample due to the different fluorescence excitation,
wherein the retrofit assembly comprises a modification of fuse algorithm to account for a new overlapped field of view of adjacent alternate columns of the cameras
3820

*FIG. 38B*

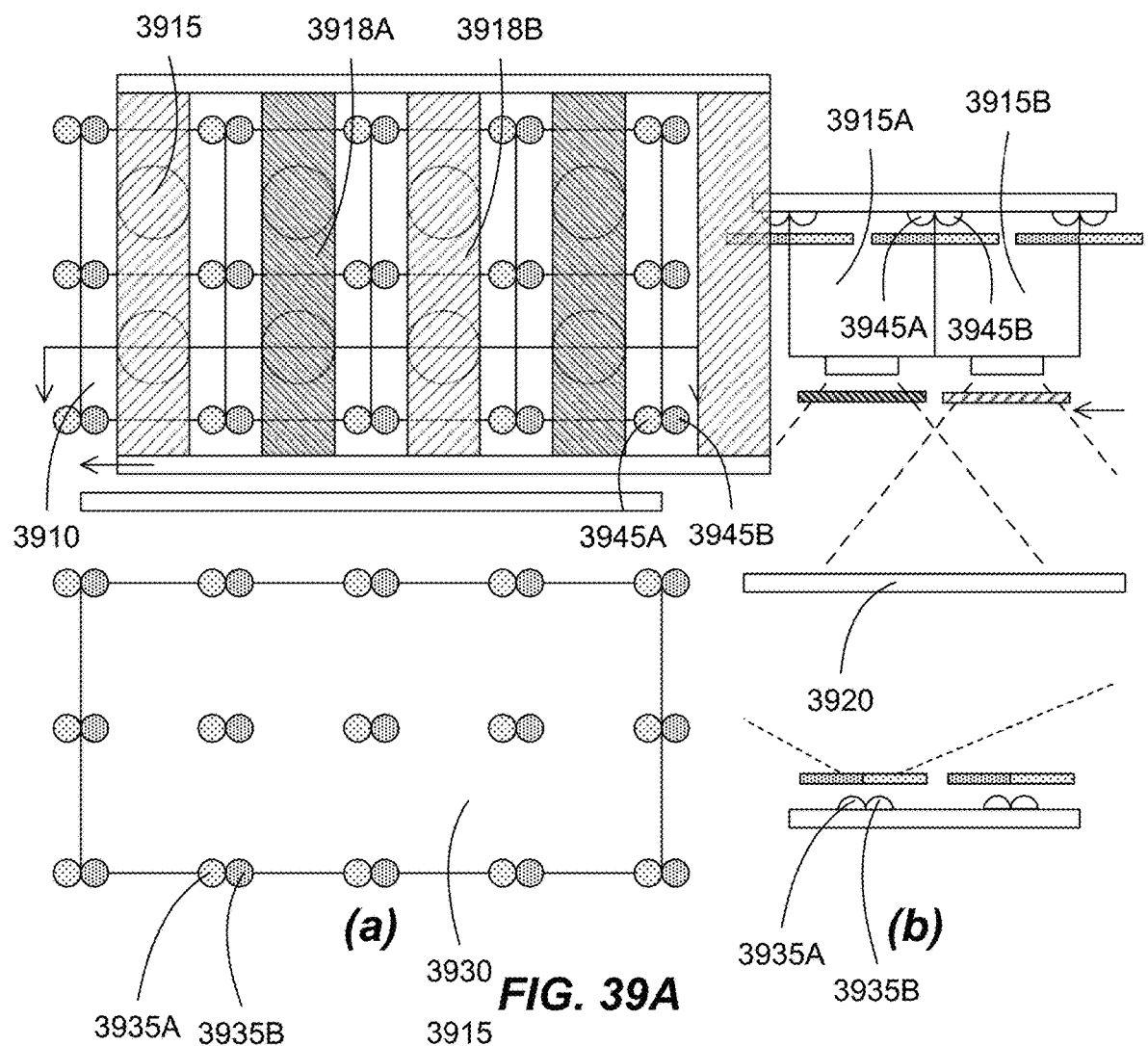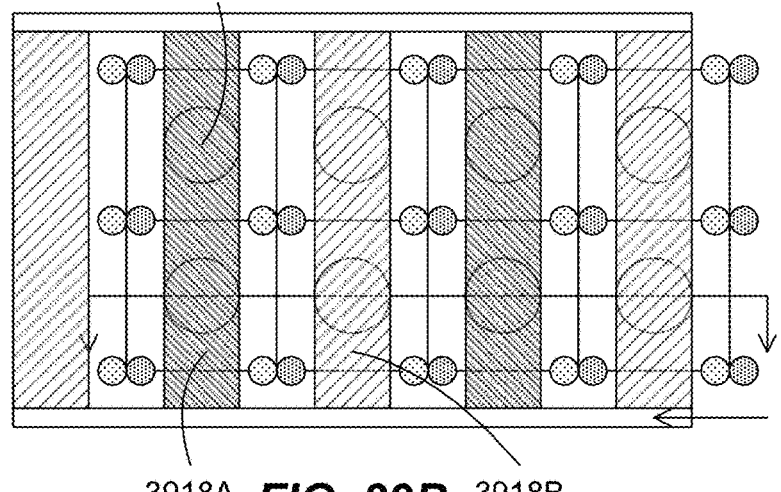
FIG. 39A
FIG. 39B

Forming a computational imaging system, wherein the computational imaging system comprises an array of radiation sources and an array of cameras, wherein the radiation sources comprise multiple sets of radiation sources,
wherein one of
wherein each set of radiation sources is configured to generate radiation having a different band of wavelengths with each band configured to generate a different fluorescence excitation on the sample,
or
wherein a first set of radiation sources is configured to illuminate a sample, wherein a second set of radiation source is configured to generate radiation having a band of wavelengths configured to generate a fluorescence excitation on the sample, wherein the cameras comprise multiple cameras arranged in rows and columns, wherein the computational imaging system comprises a set of filters configured to change a capture characteristic of the cameras in alternate columns, wherein the set of filters is configured to be movable along the row direction, wherein the set of filters is configured to at least one of cameras in alternate rows are configured to capture fluorescence signals emitted from the sample due to the fluorescence excitation based on a band of wavelengths,
or
cameras in first alternate rows are configured to capture images illuminated by the first set of radiation sources, cameras in second alternate rows are configured to capture fluorescence signals emitted from the sample due to the fluorescence excitation based on the band of wavelengths, wherein the computational imaging system comprises a fusing algorithm to fuse images captured from each set of cameras

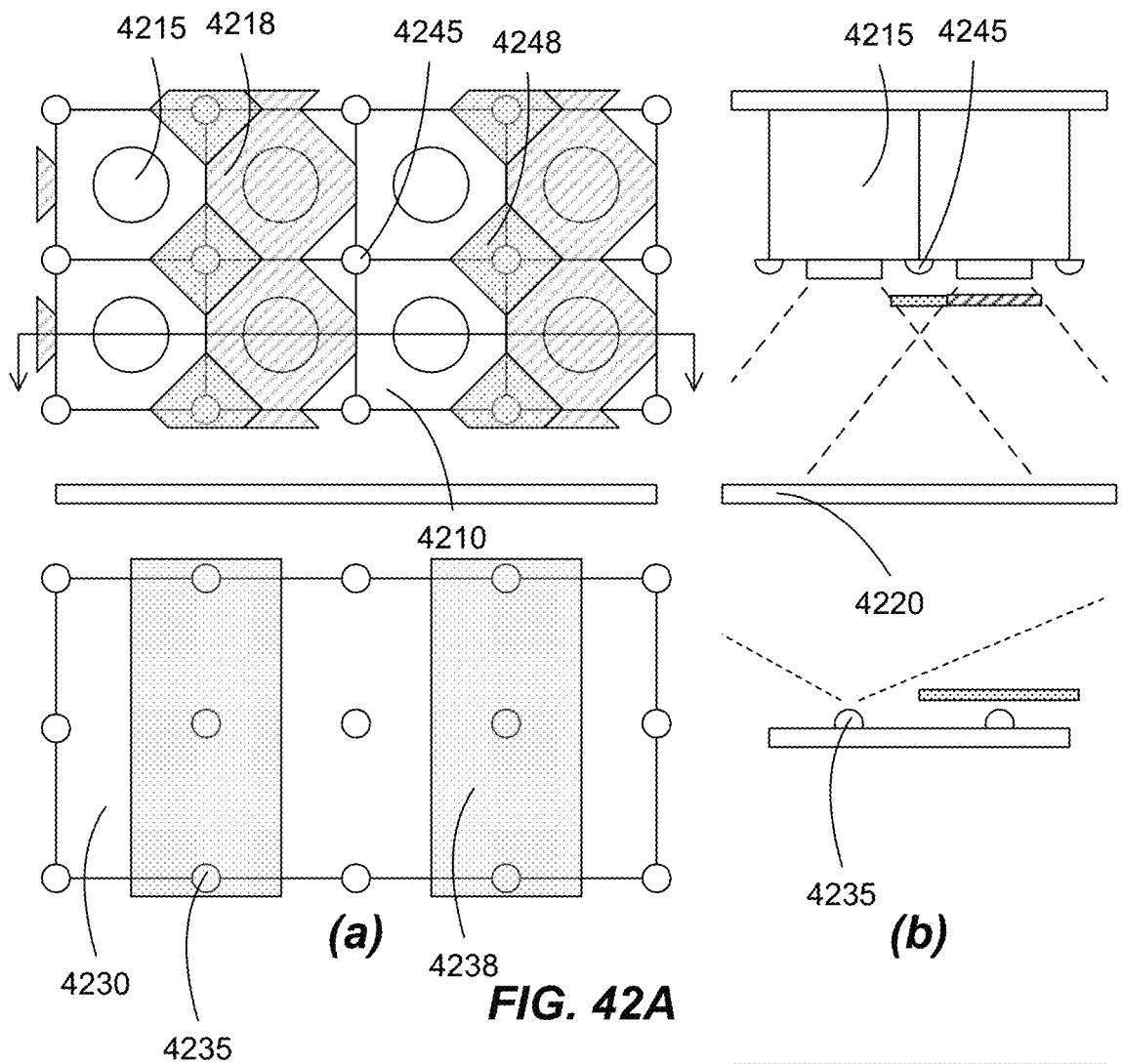
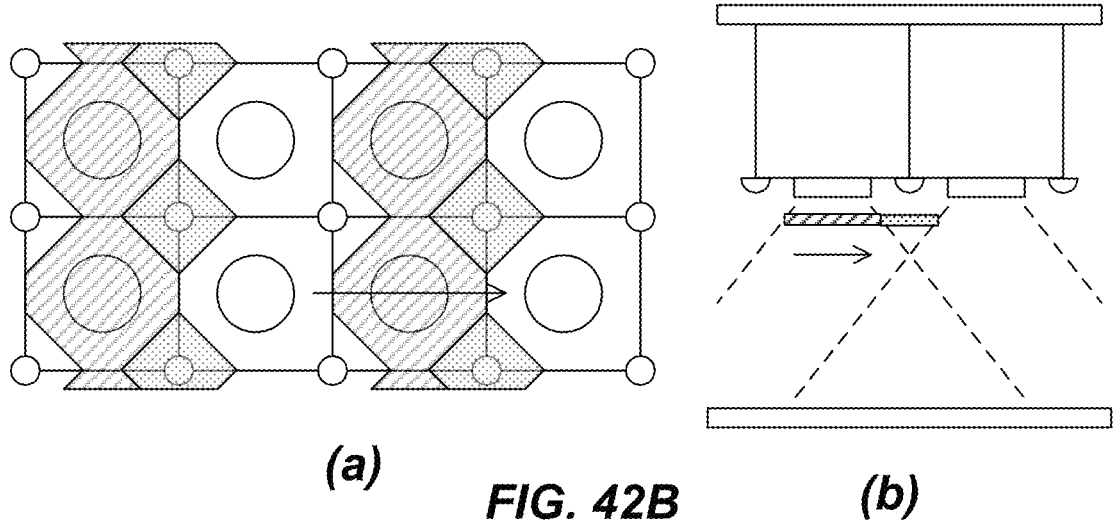
FIG. 42A
FIG. 42B

Forming a retrofit assembly for a computational imaging system, wherein the computational imaging system comprises an array of radiation sources and an array of cameras,
wherein the retrofit assembly comprises a set of first filters configured to enable alternate columns of the radiation sources to generate radiation having wavelengths configured to generate fluorescence excitation on a sample, wherein the retrofit assembly comprises a set of second filters configured to enable columns of the cameras to capture the fluorescence signals emitted from the sample due to the fluorescence excitation, wherein the set of second filters is configured to be movable along a row direction, wherein the retrofit assembly comprises a modification of fuse algorithm to account for a new overlapped field of view of adjacent alternate columns of the cameras
4400

*FIG. 44A*

Forming a retrofit assembly for a computational imaging system, wherein the computational imaging system comprises an array of radiation sources and an array of cameras,
wherein the retrofit assembly comprises two sets of first and second filters configured to enable alternate columns of the radiation sources to generate radiation having wavelengths configured to generate two different fluorescence excitation on a sample,
wherein the retrofit assembly comprises two sets of third and fourth filters configured to enable alternate columns of the cameras to capture the fluorescence signals emitted from the sample due to the different fluorescence excitation, , wherein the sets of third and fourth filters are configured to be movable along a row direction,
wherein the retrofit assembly comprises a modification of fuse algorithm to account for a new overlapped field of view of adjacent alternate columns of the cameras
4420

*FIG. 44B*

SYSTEM AND METHOD FOR SYNCHRONIZED FLUORESCENCE CAPTURE

The present patent application claims priority from U.S. Provisional Patent Applicant Ser. No. 62/965,946, filed on Jan. 26, 2020, entitled "System and method for synchronized fluorescence capture", of the same inventors, hereby incorporated by reference in its entirety.

The present patent application relates to patent application Ser. No. 16/066,065, filed on Jun. 26, 2018, entitled "Multiple camera microscope imaging with pattern illumination"; and in patent application Ser. No. 17/092,177, filed on Nov. 6, 2020, entitled "Methods to detect image features from variably-illuminated images"; hereby incorporated by reference in their entirety.

This invention was made with Government Support under R44OD024879 awarded by the NIH. The Government has certain rights in the invention.

BACKGROUND OF THE INVENTION

A fluorescence microscope is an optical microscope that uses a fluorescence signal to study the properties of organic or inorganic substances. A sample, e.g., the organic or inorganic substance under observation, is illuminated with light having a wavelength spectrum. The light is absorbed by the sample, such as being absorbed by the fluorophores in the sample, causing the fluorophores to emit light of longer wavelengths. The emitted light has a color in the longer wavelength portion of the visible light spectrum. For example, a green fluorescence protein can emit a green light after being irradiated with a blue light.

FIG. 1 illustrates a schematic of a fluorescence microscope according to some embodiments. A light source 130 can generate light 131 and 131* in the visible or ultraviolet spectrum which is directed toward a beamsplitter 150. A fluorescence excitation filter 135 is disposed in the path of the light, to filter out light 131* having undesirable wavelengths, such as light having wavelengths longer than a threshold wavelength. The threshold wavelength can be the longest wavelength that can generate fluorescence excitation on the sample. After the fluorescence excitation filter 135, only light 131 within a desirable wavelength range can reach the beamsplitter 150, and can be reflected toward the sample 120.

The fluorophores in the sample, after absorbing the fluorescence excitation light 131, can emit fluorescence light 111, which can pass through an emission filter 115 to reach the camera 110. The emission filter 115 is also functioned to filter out the reflective portion 111* of the illumination light 131, which can be much stronger than the emitted fluorescence. The beamsplitter 150 can also be a dichroic beamsplitter, which can act as a wavelength specific filter, transmitting the fluorescence 111 through to the camera, and reflecting the reflective excitation light 131. Thus, the wavelength ranges, e.g., the band pass filter characteristics, of the fluorescence excitation filter, the emission filter, and the dichroic beamsplitter are chosen to match the spectral excitation and emission characteristics of the fluorophores in the sample.

To use the fluorescence microscope, the sample must be a fluorescent sample, such as labeling the sample with fluorescent stains or a fluorescent protein.

Often, it is beneficial to excite and detect more than one type of fluorescent emission, e.g., more than one color, or a set of optical wavelengths. Detecting more than one fluorescence color is helpful for acquiring more information about a specimen of interest, or for ratiometric fluorescence imaging in which the intensity of one fluorescence emitter is divided by the intensity of another. Nearly all current fluorescent microscope arrangements detect multiple fluorescence emission wavelengths over time, by mechanically shifting between more than one emission filter between subsequent snapshots. Unfortunately, these setups are not able to accurately image more than one fluorescence emission spectrum in quickly moving specimens, such as freely moving organisms.

There are also setups that use more than one image sensor placed behind a common objective lens, along with arrangement of beam-splitters, to image more than one fluorescent emitter simultaneously. Unfortunately, these arrangements are limited to a small field-of-view when imaging at high resolution, restricted by the field-of-view of the employed objective lens for imaging. They also require a complex optical arrangement.

To circumvent the use of multiple detectors and beamsplitters, it is also possible to rely on a spatial light modulator to alter the point-spread function of each fluorescence emission wavelength. In either of these strategies, due to lens aberrations and limited availability of large-format digital detectors with more than a few hundred megapixels, it is difficult to design a single-lens fluorescence microscope that offers high resolution over a wide field-of-view.

SUMMARY OF THE EMBODIMENTS

In some embodiments, the present invention discloses systems and methods for a fluorescence microscope with the ability to synchronize the captured fluorescence signals through the process of multi-channel imaging.

In some embodiments, the present invention discloses a multi-channel computational fluorescence microscope system, which can capture simultaneously fluorescence caused by multiple fluorescence excitation sources and can analyze the data, including synchronizing and correlating the interaction between various fluorescence elements and also with the surrounding morphologies. The multi-channel fluorescence capability of the microscope can be achieved by partitioning the camera array and the illumination source into multiple imaging channels, with each channel observing a similar area of the sample but designed to generate and obtain different fluorescence excitation, emission and interaction.

In some embodiments, the multi-channel computational fluorescence microscope system can include a camera array and an illumination source, together with a controller having a post processing algorithm to analyze the captured data. The camera array can include multiple groups of camera units, with each group of camera units having one or more camera channels configured to simultaneously capture multiple channels of information. The illumination source can include multiple groups of radiation source units, with each group of radiation source units having one or more types of radiation source units configured to provide corresponding radiation to the camera channels.

A benefit of the multi-channel computational fluorescence microscope system is a new ability to accurately correlate fluorescence measurements from one or more fluorescence markers at high resolution across an unbound field of view. This capability can open up new directions for scientific discovery, such as allowing for temporal correlations to be drawn over ever increasing sample sizes, more than just several square centimeters. It can also enable experiments to be performed on freely moving organisms, as well as large bacteria colonies that might behave differently than if they were constrained to a small volume.

BRIEF DESCRIPTION OF THE DRAWINGS

FIGS. 10A-10C illustrate illumination sources according to some embodiments.

FIGS. 11A-11C illustrate flow charts for generating illumination patterns according to some embodiments.

FIGS. 12A-12D illustrate camera arrangements according to some embodiments.

FIGS. 13A-13D illustrate flow charts for forming camera arrangements according to some embodiments.

FIGS. 16A-16C illustrate a camera arrangement according to some embodiments.

FIGS. 19A-19B illustrate a camera arrangement according to some embodiments.

FIGS. 22A-22D illustrate flow charts for a computational fluorescence microscope system according to some embodiments.

FIGS. 24A-24B illustrate flow charts for retrofitting a microscope system according to some embodiments.

FIGS. 26A-26B illustrate a configuration for a computational fluorescence microscope system according to some embodiments.

FIGS. 27A-27B illustrate flow charts for a computational fluorescence microscope system according to some embodiments.

FIGS. 28A-28D illustrate flow charts for operating a computational fluorescence microscope system according to some embodiments.

FIGS. 31A-31B illustrate flow charts for retrofitting a microscope system according to some embodiments.

FIG. 34 illustrates a flow chart for forming a computational microscope according to some embodiments.

FIG. 37 illustrates a flow chart for retrofitting a computational microscope system according to some embodiments.

FIGS. 38A-38B illustrate flow charts for retrofitting a microscope system according to some embodiments.

FIGS. 39A-39B illustrate a configuration for a computational fluorescence microscope system according to some embodiments.

FIG. 40 illustrates a flow chart for forming a computational microscope according to some embodiments.

FIGS. 42A-42B illustrate a configuration for a computational fluorescence microscope system according to some embodiments.

FIGS. 44A-44B illustrate flow charts for retrofitting a microscope system according to some embodiments.

DETAILED DESCRIPTION OF THE EMBODIMENTS

Figure 1:
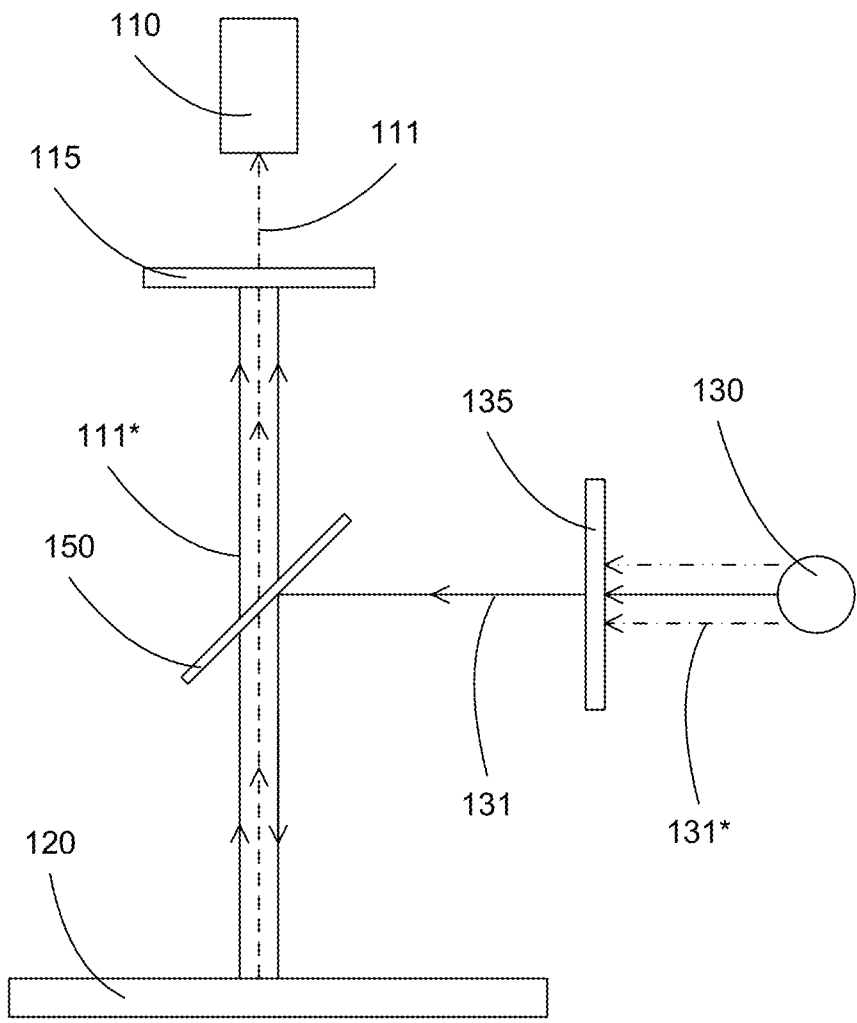
FIG. 1 illustrates a schematic of a fluorescence microscope according to some embodiments.

In some embodiments, the present invention discloses systems and methods for a fluorescence microscope with the ability to synchronize the captured fluorescence signals through the process of multi-channel imaging. The fluorescence microscope can have multiple camera units configured to simultaneously capture images of a sample, including capturing multiple fluorescence images caused by multiple fluorescence excitation radiation and with multiple emission characteristics. By simultaneously capturing the fluorescence images, correlation between the fluorescence signals can be calculated.

Further, the multi-channel imaging process can be configured for multi-channel fluorescence and visible light imaging, which can allow for the observation of the specific structures which have been labeled for fluorescence through the fluorescence channel, together with observation of the cell morphologies through the visible light imaging channel.

For example, the multi-channel imaging process provided by the present microscope system can enable observing a tissue sample prepared with a fluorescent DNA stain by fluorescence microscopy to not only revealing the organization of the DNA within the cells but also revealing the cell morphologies.

Fluorescence spectral filters are widely used in microscopy to image samples that are tagged with fluorescent proteins to observe biological activities. Excitation light is used to create fluorescent light within a sample of interest, and the spectral emission filters are used to block this excitation light, while allowing the desired fluorescence emission to pass on through into the imaging system for detection. The present fluorescence microscope can excite and detect more than one type of fluorescent emission, in addition to acquiring visual images, to reveal more information about a specimen of interest, including the correlation with the physical locations of the fluorophores due to the synchronization with visible light images. The present fluorescence microscope system can also accurately acquire images for more than one fluorescence emission spectrum in quickly moving specimens, such as freely moving organisms. In addition, the present fluorescence microscope system can offer a simple optical arrangement for achieving large field-of-view imaging at high resolution.

In some embodiments, the fluorescence microscope can use multiple small microscopes tiled together in an array and can overcome these limitations while maintaining the capability to image with high resolution (4-10 um) over a large area (hundreds of square centimeters). It is an innovative feature of the present fluorescence microscope to use the tiling of multiple small microscopes to detect multi-channel fluorescence imaging, and to post-process the detected multi-channel fluorescence images to create a final composite image.

In some embodiments, the method of fluorescence imaging is used for characterizing properties of a sample through captured fluorescence images, in a multi-channel computational microscope system that reconstructs images using multiple cameras, multiple illumination patterns, and computational post-processing. The multi-channel computational microscope system can employ an array of micro cameras in conjunction with an illumination source configured to provide multiple variably illumination patterns.

The multi-channel computational microscope system can be based on the technology of a micro-camera array microscope (MCAM) system. Details about the MCAM system can be found in patent application Ser. No. 16/066,065, filed on Jun. 26, 2018; and in patent application Ser. No. 17/092, 177, filed on Nov. 6, 2020, entitled "Methods to detect image features from variably-illuminated images"; hereby incorporated by reference in their entirety, and briefly described below.

The MCAM system can be viewed as a group of multiple individual microscopes tiled together in an array to image a large sample. The individual microscopes can be configured into a micro camera package, e.g., forming a tightly packed array of micro-cameras with high resolution (1-10 µm) over a large area (hundreds of square centimeters). The images taken from the individual micro cameras, which include overlapped image patches of the sample, can be stitched together to form the image of the sample.

The MCAM system can include a programmable illumination system, such as a large array of light sources, with individual light sources or groups of light sources capable of being controlled separately, for example, by a controller. The light sources can be visible light sources, infrared light sources or ultraviolet light sources such as light emitting diodes (LEDs) or lasers with appropriate wavelengths. The illumination system can be placed below or above the sample, to provide transmissive or reflective light to the micro cameras.

The MCAM system can use multiple micro-cameras to capture light from multiple sample areas, with each micro camera capturing light from a sample area sequentially from multiple patterned illumination configurations provided on the same sample area.

The illumination system can provide the sample with different illumination configurations, which can allow the micro cameras to capture images of the sample with light incident upon the sample at different angles and wavelengths. The illumination angle and wavelength are important degrees of freedom that impact specimen feature appearance. For example, by slightly changing the incident illumination angle, a standard image can be converted from a bright field image into a phase-contrast-type image or a dark field image, where the intensity relationship between the specimen and background is completely reversed.

Further, by providing the sample with different light angles and wavelengths, both intensity and phase information of the received illumination can be recorded, which can allow the reconstruction of an image, for example, with more information or higher resolution. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

Micro-Camera Array Microscope (MCAM) System

Figure 2:
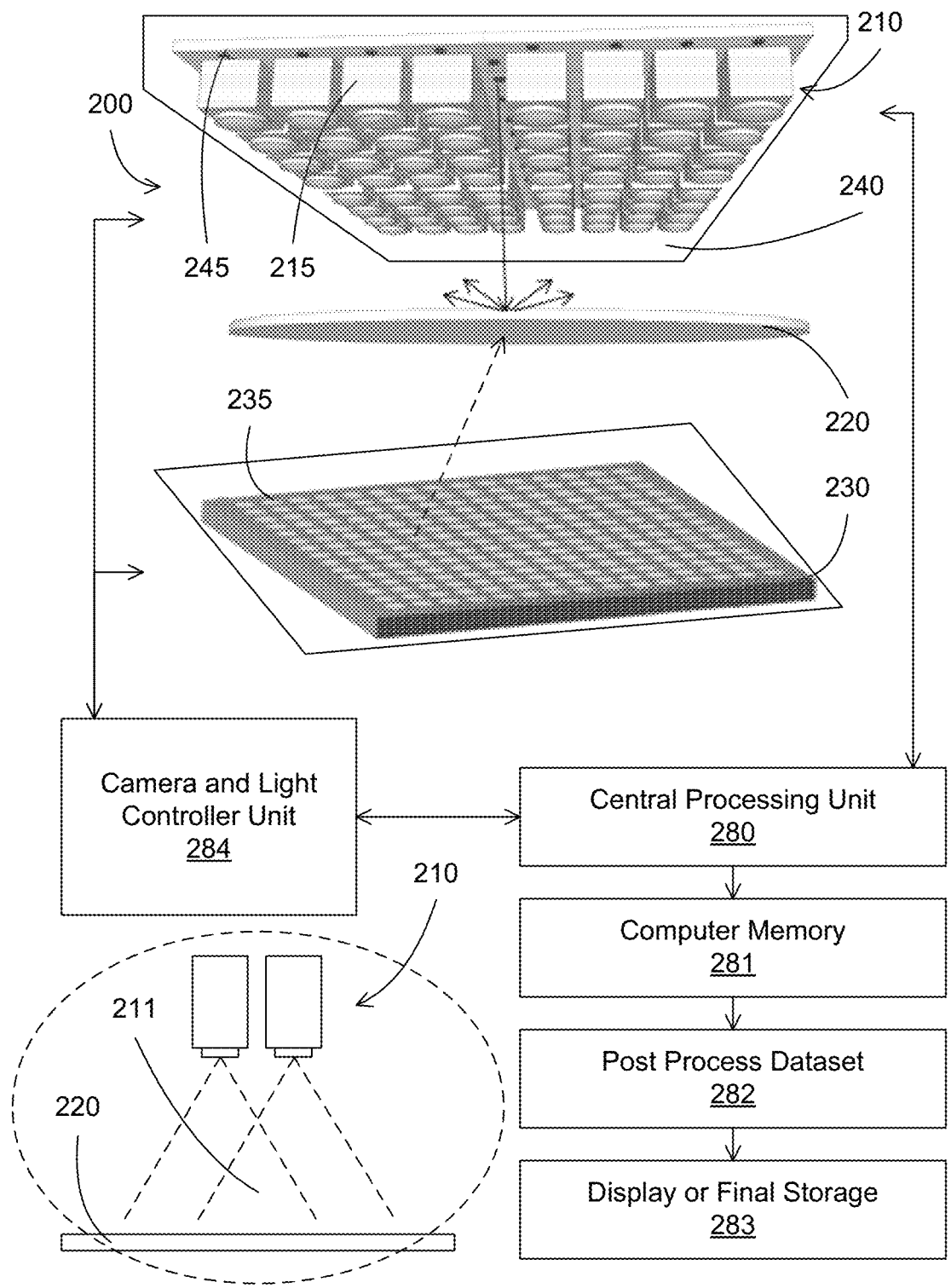
FIG. 2 illustrates a schematic MCAM system according to some embodiments.

FIG. 2 illustrates a schematic MCAM system according to some embodiments. The MCAM system 200 can include an array of camera units 210 and a patterned illumination source 230 and 240 for microscopic imaging. The camera units 210 are configured to image partially overlapping fields of view (FOV) 211 of image areas of a sample 220. The patterned illumination source 230 and 240 can be configured to provide radiation, e.g., electromagnetic waves including visible light, infrared and ultraviolet light, on the sample 220 from a plurality of angles and spatial patterns, so that the spatial-angular distribution of radiation reaching the sample changes over time.

The illumination source can include a bottom set of radiation source units 230, a top set of radiation source units 240, or both bottom and top sets of radiation source units 230 and 240. The illumination source can provide illumination patterns to the sample 220 of the MCAM system 200, in which there is either a transmission illumination through the bottom set of radiation source units 230, or a reflection illumination through the top set of radiation source units 240, disposed near the micro cameras. The illumination source can also provide a dual illumination geometry, in which there are a transmission illumination through the bottom set of radiation source units 230, and a reflection illumination through the top set of radiation source units 240.

The illumination source can be configured to generate multiple illumination patterns. At each illumination pattern in the spatial-angular distribution of radiation generated from the illumination source 230 and 240, each camera unit can acquire an image. The set of images acquired from the camera units for the image areas for the illumination patterns can be processed to form an image reconstruction of the sample. The image reconstruction can also offer at least a measure of sample depth, spectral (i.e., color) properties, or the optical phase at the sample plane.

The MCAM system 200 can include a controller for controlling the camera units, the radiation source units, and for processing the images. For example, the controller can include a central processing unit 280, which can couple to a camera and light controller units 284 for controlling the camera units, e.g., to tell the camera units when to capture images, and for controlling the radiation source units, e.g., to tell the radiation source units when to be activated and what radiation source units to be activated. The central processing unit 280 can be coupled with the camera units to obtain the image data captured by the camera units. The data can be stored in memory 281, can be processed in a post processing dataset 292, and can be displayed 283 on a display or to send to a final storage.

Figure 3A:
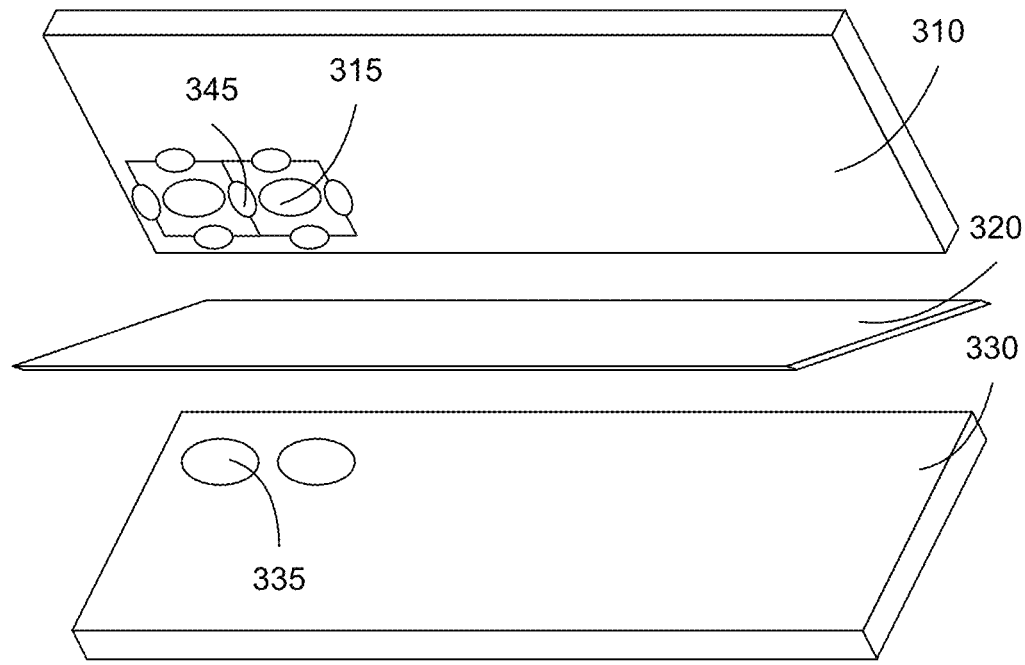
FIGS. 3A-3B illustrate a configuration for a MCAM system according to some embodiments.
Figure 3B:
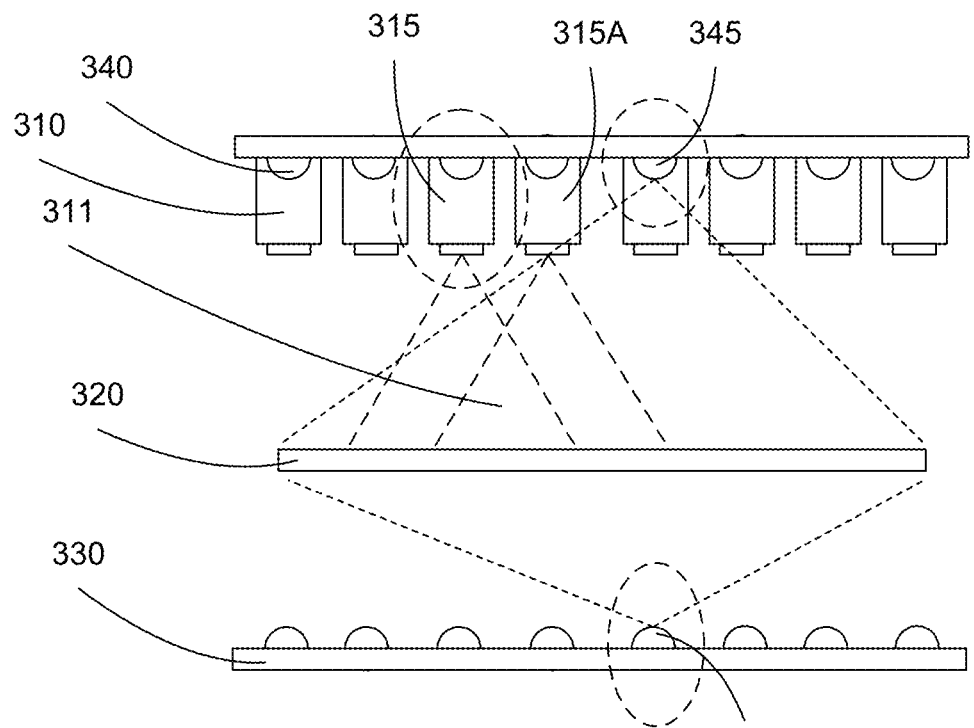

FIGS. 3A-3B illustrate a configuration for a MCAM system according to some embodiments. FIG. 3A shows a perspective view and FIG. 3B shows a cross section view of a MCAM system. The MCAM system can include a camera array and an illumination source, which are controlled by one or more controllers, such as a camera controller, an illumination controller, and a system controller.

An MCAM system can include an array of camera units 310 focused on a large sample 320 under the illumination of an array of radiation source units 330 and 340 such as LEDs or other light sources. A controller can be used to control the illumination system to provide variably illuminated radiation patterns, e.g., multiple illumination patterns with each pattern different from other patterns, to the sample.

Each camera unit in the camera array can focus on a sample area, having overlapping areas 311 with nearby camera unit to allow for stitching for fusing. Each camera can acquire multiple images under different illumination patterns. The captured images can be stitched and fused together to form a high dimension image reconstruction of the sample.

The imaging process starts by capturing k sets of variably-illuminated images from k illuminated patterns. The variably illuminated radiation patterns include multiple illumination patterns in which the radiation is from different radiation source units. For example, an illumination pattern can include radiation from a single radiation source unit.

Thus, if the radiation source unit in an illumination source is activated one at a time, there can be k illumination patterns for an illumination source having k radiation source units. For example, an illumination source can have 50 radiation source units. When the radiation source unit is activated one at a time, there are 50 illumination patterns, with each pattern including radiation from a radiation source unit.

In some embodiments, different illumination patterns can be provided by a programmable array of radiation source units 335 and 345, with different radiation source units activated to emit radiation to the sample. Each radiation source unit can be configured to cover the whole sample, e.g., radiation from a radiation source unit can reach all areas of the sample. The programmable radiation source array can include radiation source units that are at different positions above or below the sample, as well as radiation source units that emit different frequencies (i.e., colors) of radiation. The radiation source units can include light emitting diodes (LEDs), individual lasers, laser diodes, spatial light modulators or other electronically controllable light emission elements.

The variably-illuminated images can be captured by a camera array, with each camera unit 315 in the camera array capturing an image. The camera array can include n camera units, with each camera unit configured to capture an area of the sample. Adjacent camera units 315 and 315A can be configured to capture images having an overlapped area 311 images. The n camera units can be arranged to capture an image of the whole sample, having n overlapping images.

The camera units in the camera array are all activated at a same time for each illumination pattern to capture images. Thus, for each illumination pattern, there can be a set of n images. For example, a camera array can have 50 camera units. There is a set of 50 images captured under one illumination pattern. The set of images can be stitched together to form an assembled image of the sample.

Under k different illumination patterns, there can be k sets of assembled images, each captured under a different angle and spatial pattern. The image reconstruction of the sample, obtained by fusing the k sets of assembled images, can contain the spatial-angular distribution of radiation reaching the sample. As such, the image reconstruction can offer a measure of sample depth, spectral properties, and the optical phase at the sample plane.

Figure 4:
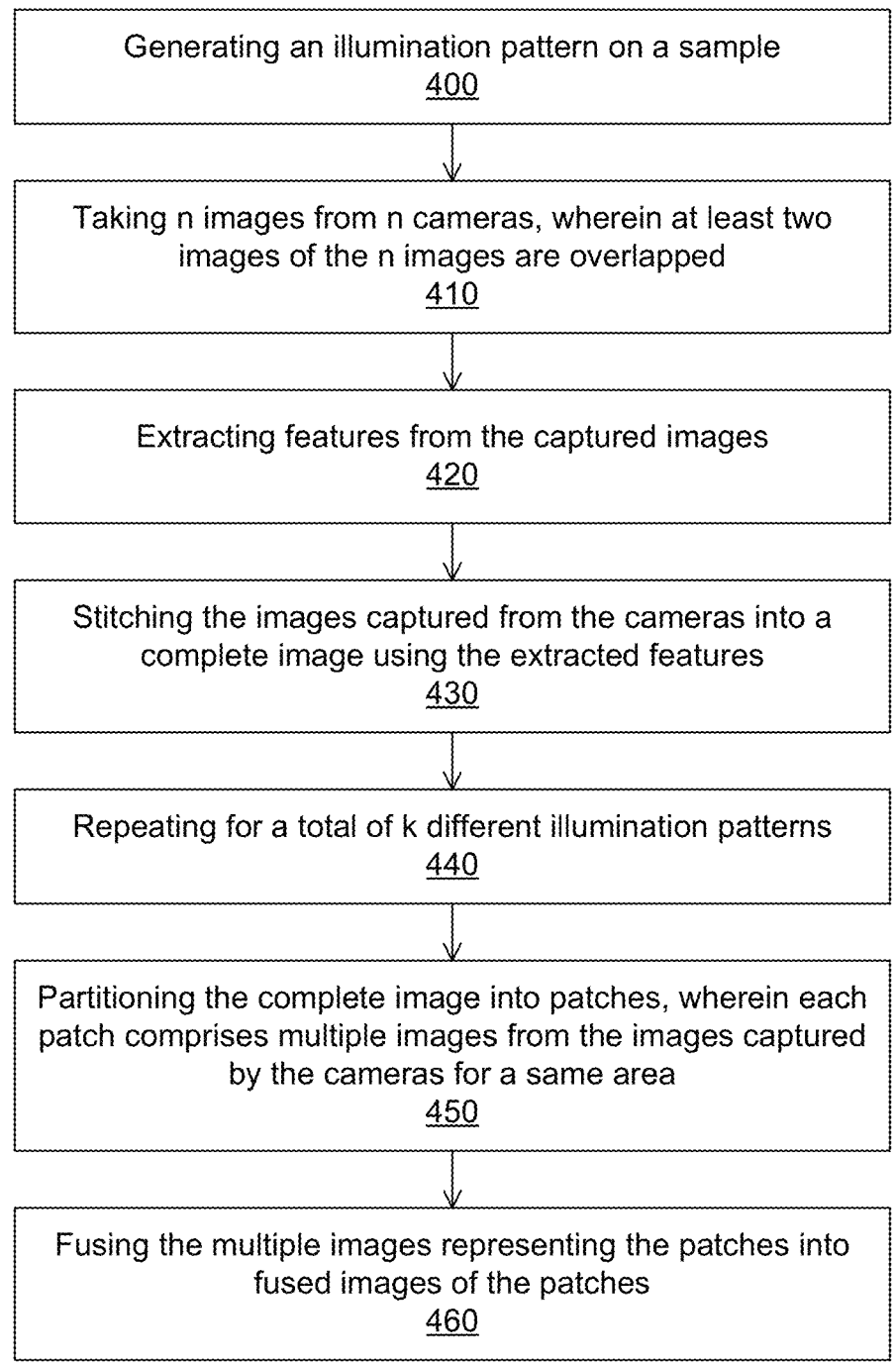
FIG. 4 illustrates a flow chart for operating an MCAM system according to some embodiments.

FIG. 4 illustrates a flow chart for operating an MCAM system according to some embodiments. The MCAM system can include a camera array and an illumination source, which are controlled by one or more controllers, such as a camera controller, an illumination controller, and a system controller configured to process the images captured by the camera array under multiple illumination patterns generated by the illumination source. The image processing process can include a stitching process to stitch overlapped image areas to form an assembled image of the whole sample. The image processing process can include a fusing process to fuse a set of assembled images under multiple illumination patterns to form an image reconstruction of the sample.

Operation 400 generates an illumination pattern on a sample. The illumination pattern can include radiation from one or more radiation source units from the illumination source. The illumination pattern can reach and interact with the sample, such as being partially or totally absorbed by the sample, being transmissive or reflective by the sample, depending on the location of the light sources, being scattered by the sample, or a combination of two or more interactions, such as partially absorbed or reflected and partially transmissive.

Operation 410 captures images from the camera units, for example, n images can be taken for a camera array having n camera units. The images can be overlapped, meaning adjacent cameras can capture some image data from a same image area. The images can also be non-overlapped and observe different areas of the sample. Movement of the sample by a sample stage can be used to bring the sample into view at different micro-cameras while multiple images are acquired by each micro-camera, such that the entire sample area may be observed within the captured image data for subsequent processing. The cameras can be positioned so that the camera array covers the whole sample, e.g., every area of the sample is captured by one or more camera units.

Operation 420 extracts and describes features to form feature descriptors for the n images captured by the camera units under the illumination pattern. A feature can be described by a descriptor.

Operation 430 stitches the images into an assembled image of the sample by matching the descriptors of the extracted features. For example, the feature descriptors in each image can be matched against feature descriptors in other images, and the images can be transformed to allow the overlapping of the matched descriptors to form an assembled image. After the stitching process, the assembled image can include n individual images captured by the n camera units under the illumination pattern.

A first step in the stitching process can include matching the identified descriptors in each image of the n captured images. The descriptors have been extracted and described for the features on each image. The matching of descriptors can allow the alignment of the images to form an assembled image. After matching the descriptors, the images can be aligned to form the assembled image.

The identification and matching of descriptors can be performed on multiple images, or alternatively, on individual images. For multiple images, two images can be stitched together, even though there are no matched features on the two images. The two images can be stitched together based on the matching of the descriptors, which can perform the alignment for all images.

An assembled image of the sample can be an image representing an area of interest on the sample. In some embodiments, the sample image can be considered as the image of the whole sample, since the whole sample is typically imaged. In some embodiments, only an area of interest on the sample is imaged.

The sample image can be large, e.g., larger than an image captured by a single camera of the camera array. Further, the sample image is configured, e.g., positioned in the microscope, in such a way so that the images captured by the camera array cover the area of interest on the sample, e.g., stitching the images captured by the camera array can allow the formation of sample image.

Operation 440 repeats for a total of k different illumination patterns. The repetition process can include generating a different illumination pattern, taking n more images from the n camera units, extracting features and stitching the images together to form another assembled image. The repetition process can continue until there are a total of k illumination patterns, e.g., when the number of illumination patterns reaches a predetermined number.

Each illumination pattern can be different and the set of illumination patterns can be configured to provide complete information of the sample to be captured by the cameras. After k illumination patterns, there can be a set of k assembled images, with each assembled image including n images captured by n camera units under an illumination pattern, stitched together.

Operation 450 partitions the set of k assembled images into patches. The partition process can partition a sample image into multiple patches. Thus, the partition process can partition the set of assembled images into multiple sets of patches, with each patch in a set of patches being the same partitioned area in each sample image of the set of assembled images. The patch partition can be selected to simplify the reconstruction of fused images from the sets of patches.

Each set of patches can include multiple patches, with a patch being the area portion on a sample image of the set of sample images. A patch can be a portion of a sample image, which can be smaller than the image captured by a camera. Thus, an image captured by a camera can include one or more patches. A patch can be at an overlapped area between multiple cameras, and thus there can be multiple patches representing an area on the sample image that is captured by multiple cameras. For example, if the patch is at the overlapped area of 2 cameras, there are two patches in a sample image stitched together from the cameras for a particular illumination pattern. For k illumination patterns, a set of patches can include 2 k patches, for areas of the sample overlapped by two cameras.

Operation 460 fuses the multiple patches in each set of patches into fused patches. For example, the patches in a set of patches can be fused together to form a fused image of the patch. The fusing process thus can produce a high resolution image for the patches.

Each set of k images from each camera can be fused, e.g., processed to combine into one image. Since each image of the set contains different information about the image area, such as the transmissive or reflective light data and the scattered light data from different light angles, images in the set can be processed to combine this information to a fused image carrying both intensity and phase information.

In the fusing process, a complex function S, e.g., having intensity and phase information, representing the sample area, can be determined from the set of k images. When an image of the sample area is captured by a camera, only the intensity is captured, e.g., the phase information is lost to the camera, and a 2D image is formed to represent the 3D sample with finite thickness. By taking a set of images with different illumination patterns representing lights having different phases reaching the camera, the phase information can be reconstructed to generate a representation of the 3D sample with finite thickness.

For example, the sample area represented by the set of k images can be described as a complex function S. The MCAM system can capture k images of the sample area, meaning the complex function S is transformed into a set of k images M through a system matrix T that describes the MCAM image formation process, which can be determined from the geometry of the MCAM setup, including the light paths from the light sources to the camera.

$$M=\|T \cdot S\|^2+n$$

The set of k images M is the result of the transformation of the system matrix M with the sample function S. Here, the absolute square term is due to the ability to detect only intensity by the camera, and n is an additive Gaussian noise.

The sample function S can be calculated from the above function by solving the inverse problem. A possible approach for the inverse problem is to minimize the mean-squared error between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as Douglas-Rachford algorithm.

In some embodiments, an approach for the inverse problem is to solve the minimization problem by constructing an Augmented Lagrangian and then minimizing the Augmented Lagrangian with gradient descent. In some embodiments, the inverse problem can be solved using an iterative optimization strategy that first determines the gradients, or the gradients and the Hessians, and then applying a Gauss-Newton method. In some embodiments, the sample may be fluorescent and function S can be a real, positive-valued function, and a minimization method similar to those used in structured illumination fluorescent microscopes to determine a high-resolution sample can be used. The image reconstructions process can also include an estimate of the sample height, the sample phase, and its spectral color content.

The fused patches can then be assembled to produce a final, large, high-resolution image reconstruction of the sample. The final image can include a measurement of depth at different spatial locations across the image. The final image can include a measurement of the optical phase at different spatial locations across the image. The final image can include a measurement of multi-spectral content at different spatial locations across the image.

Fluorescence Microscope System

In some embodiments, the present invention discloses a multi-channel computational fluorescence microscope system, which can capture simultaneously fluorescence caused by multiple fluorescence excitation sources and can analyze the data, including synchronizing and correlating the interaction between various fluorescence elements and also with the surrounding morphologies. The multi-channel fluorescence capability of the microscope can be achieved by partitioning the camera array and the illumination source into multiple imaging channels, with each channel observing a same area of the sample but designed to generate and obtain different fluorescence behavior and interaction. For example, the camera array and the illumination source can include multiple groups of camera units and radiation source units, respectively, with each group of camera units configured to capture multiple channels of information excited by a corresponding group of radiation source units. The groups of camera units can be distributed over a large surface area for imaging a large sample area. The camera units are distributed so that the camera units of each type can capture images of the whole sample area, resulting in generating simultaneously multiple images of the sample with each image carrying different sample information.

In some embodiments, the camera array can include multiple groups of camera units, with each group of camera units having one or more types of camera units, and with each type of camera unit configured to capture a channel of information. For example, a first type of camera unit can be configured to capture a first fluorescence signal, such as by incorporating an emission filter having a band pass wavelength range corresponding to the first fluorescence signal, a second type of camera unit can be configured to capture a second fluorescence signal, and so on. The group of camera units can include a type of camera units that are configured to capture visible light, e.g., without a filter.

In some embodiments, the illumination source can include multiple groups of radiation source units, with each group of radiation source units having one or more types of radiation source units, and with each type of radiation source units configured to generate information related to the channel of information to be captured by a corresponding type of camera units. For example, a first type of radiation source units can be configured to generate a first fluorescence excitation radiation, such as by incorporating a fluorescence excitation filter having a band pass wavelength range corresponding to the first fluorescence excitation radiation. The first fluorescence excitation radiation is corresponded to the first fluorescence signal, e.g., the first fluorescence excitation radiation is capable of exciting the fluorophores in the sample so that the fluorophores can emit the first fluorescence signal. The group of radiation source units can include a second type of radiation source units configured to generate a second type of fluorescence excitation radiation, and so on. The group of radiation source units can also include a type of radiation source units that are configured to generate visible light, e.g., without a filter.

In some embodiments, the present invention discloses a computational fluorescence micro-camera array microscope system to obtain rapid multi-channel fluorescence measurements at microscopic resolution over a large area, with optionally a minimum number, such as 1-20, of image capturing processes. The multi-channel fluorescence technology can open up the possibility to observe the florescence behavior and interactions properties of large biological specimens extending across tens of centimeters at video rates, as they freely move, for example.

In the specification, a radiation source unit having a type of fluorescence excitation radiation can mean a radiation source unit configured to generate or emit radiation within a wavelength range in order to excite a type of fluorophores to undergo fluorescence emission. For example, a radiation source unit configured to generate a first type of fluorescence excitation radiation can be a radiation source unit configured with a first fluorescence excitation filter, with the band pass wavelength range of the first fluorescence excitation filter configured to allow passing of radiation that can excite a first type of fluorophores to undergo fluorescence emission.

The fluorescence excitation filters can be configured to allow the passing of the radiation configured to provide fluorescence excitation to the sample. The fluorescence excitation filters can be band pass filters, e.g., allowing radiation within a range of frequencies (or wavelengths) to pass through, such as radiation having frequencies greater than a low threshold and less than a high threshold. In the context of the present specification, low pass filters and high pass filters are also considered as band pass filters. For example, the low pass filters can allow radiation having frequencies less than a threshold frequency to pass through, e.g., allowing a range of frequencies from zero frequency to the threshold frequency to pass through. The high pass filters can allow radiation having frequencies greater than a threshold frequency to pass through, e.g., allowing a range of frequencies from the threshold frequency to a very high frequency to pass through.

The fluorescence excitation filters can be disposed to cover the radiation source units in the illumination source. Different types of fluorescence excitation filters, e.g., fluorescence excitation filters having different band pass frequencies or wavelengths, can be disposed on different radiation source units, so that some first radiation source units can generate radiation of a first wavelength range, some second radiation source units can generate radiation of a second wavelength range, etc. For example, the different types of fluorescence excitation filters can include two types of fluorescence excitation filters arranged in a periodic array, which can turn the illumination source into multiple groups of radiation source units, with each group of radiation source units having a first radiation source unit generating radiation of a first wavelength range corresponding to the first type of fluorescence excitation filters, and a second radiation source unit generating radiation of a second wavelength range corresponding to the second type of fluorescence excitation filters.

Alternatively, the different types of fluorescence excitation filters can include just one type of fluorescence excitation filters, which can turn the illumination source into multiple groups of radiation source units, with each group of radiation source units having one radiation source unit generating radiation of a wavelength range corresponding to the type of fluorescence excitation filter.

In some embodiments, a fluorescence excitation radiation source unit can mean a radiation source unit configured to generate a type of fluorescence excitation radiation.

In some embodiments, a camera unit configured to capture images of a fluorescence signal can mean a camera unit equipped with an emission filter, in order to capture images formed by the fluorescence signal in a high signal to noise ratio. A camera unit configured to capture visible light images can mean a camera unit not equipped with any filter, in order to capture images formed by radiation in the visible light spectrum, or with a neutral density filter or another type of optical filter to help balance out the optical intensity received across different camera units.

The emission filters can be configured to allow the passing of the fluorescence signal that the sample emits due to the fluorescence excitation. The emission filters can be band pass filters, e.g., including low pass and high pass filters.

The emission filters can be disposed to cover the lenses of the camera units in the camera array. Different types of emission filters, e.g., emission filters having different band pass frequencies or wavelengths, can be disposed on the faces of different camera units, so that some first camera units can capture images caused by radiation of a first wavelength range, some second camera units can capture images caused by radiation of a second wavelength range, etc. For example, the different types of emission filters can include two types of emission filters arranged in a periodic array, which can turn the camera array into multiple groups of camera units, with each group of camera units having a first camera unit configured to capture images caused by radiation of a first wavelength range corresponding to the first type of emission filters, and a second camera unit configured to capture images caused by radiation of a second wavelength range corresponding to the second type of emission filters.

Alternatively, the different types of emission filters can include just one type of emission filters, which can turn the camera array into multiple groups of camera units, with each group of camera units having one camera unit configured to capture images caused by radiation of a wavelength range corresponding to the type of emission filters.

In some embodiments, an image with a fluorescence state can mean an image formed by a fluorescence signal. For example, an image with a first fluorescence state means an image formed by the first type of fluorescence signal, which is emitted by fluorophores being excited by a first fluorescence excitation radiation.

In some embodiments, the multi-channel fluorescence imaging process uses the illumination source to generate one or more types of fluorescence excitation radiation, together with optional visible light. The imaging process then uses the micro-camera array to capture one or more fluorescence signals emitted due to the excitation of the one or more fluorescence excitation radiation. The fluorescence imaging process can quickly capture multiple sets of fluorescence images under controlled excitation illumination patterns.

In some embodiments, a retrofit kit can be used on the micro-camera array microscope (MCAM), to convert the MCAM to a multi-channel fluorescence microscopy system. The conversion can include adding filters, e.g., fluorescence excitation filters for the radiation source units and emission filters for the camera units, together with a modification of the post processing algorithm to calculate and correlate fluorescence imaging data.

In some embodiments, the present invention discloses systems and methods, based on a micro-camera array microscope with a carefully designed set of fluorescence excitation and emission filters, to image a large FOV and simultaneously capture fluorescent activities spanning large areas, and then to computationally combine the detected imagery into a final multi-channel fluorescence composite image. The process can link and synchronize various reactions through the reliability and accuracy of the timestamp between the camera units. The system can be a high resolution microscope that can image multiple fluorescence signals over hundreds of square centimeter FOV with high-fidelity synchronization among fluorescence markers.

When observing biological activities (such as the fluorescent neural activity of model organisms), multiple fluorophores may be necessary to accurately understand the behavior of different cell types, organelles, or other biological structures. The synchronization capability of the present system can ensure exact synchronization of the acquired data across the array of camera units, e.g., capturing several fluorescence signals across a few centimeters of the sample within microsecond accuracy to claim relevance in the interactions of these separate structures.

In some embodiments, a microscope system can include multiple micro-cameras with adequate overlap between the field-of views of adjacent micro-cameras such that each point on the sample is imaged by more than one of the micro-cameras. The cameras are equipped with an array of emission filters, for example, disposed in front of the lenses. The microscope system can also include an illumination source offering both trans-illumination, e.g., through a sample, and epi-illumination, e.g., reflecting from the sample. The illumination source can include LEDs, or other radiation sources, such as a single source of bright LEDs or several LEDs emitting a specific range of excitation wavelengths, or one or more lasers, or one or more laser diodes, or one or more vertical cavity surface emitting lasers. A set of fluorescence excitation filters can be placed in front of one or more of the transmission or epi-illumination light sources for more specificity of the range of optical wavelengths that reach the specimen.

In operation, a new sample is first positioned in the microscope system. The sample can lie between the trans-illumination source and the epi-illumination sources. The sample can be illuminated from the trans-illumination source in transmission, from the epi-illumination source in a reflection-type geometry, or from both transmission and epi illumination sources.

The fluorescence excitation radiation from the illumination sources can excite fluorophores from within the sample of interest, such as exciting a fluorescent protein or aggregate of fluorescent proteins in one location of the sample, leading the sample to emit light at a different wavelength than the excitation light. The emission filters, placed in front of, within or behind the lens of one or more micro-cameras within the microscope system, are chosen so that the excitation wavelengths are blocked and the emission wavelengths of interest are passed through. An image is captured and saved by each and every micro-camera. Between each image capture, the illumination can be re-configured, for example, by a controller of the system, to illuminate the specimen from a different radiation source unit or a different set of radiation source units, such as LEDs or laser diodes. The acquisition settings can also be configured, for example, to record image data from a different subset of micro-cameras or with a different image exposure.

For samples that emit only one type of fluorescence, e.g., one finite range of fluorescence wavelengths, the present system can use only one excitation source wavelength range that activates the fluorescing protein, and emission filters for all the micro-cameras that allows through the same emission wavelength range.

For samples that emit more than one fluorescence emission wavelength range, e.g., the sample contains different types of fluorescent proteins or fluorescent emitters, there can be more than one excitation illumination wavelength range from the epi or trans illumination sources. For example, more than one excitation filter is placed over more than one excitation radiation source units in an alternating configuration. In addition, there can be more than one type of emission filter placed in front of, within or behind, each micro-camera in the camera array. For example, the emission filters can be arranged in an alternating configuration in front of the micro-cameras.

In some embodiments, certain pairs of fluorophores within a specimen of interest can be illuminated with their excitation sources at the same time, and as long as their emission wavelength ranges do not overlap substantially, two emission filters can be chosen to pass only the corresponding fluorophore emission wavelengths at the detector side into the associated micro-cameras. If the field-of-view overlap of adjacent micro-cameras is selected such that each point in the sample passes through at least two micro-cameras, with a first micro-camera having an emission filter for a first type of fluorescence emission, and a second micro-camera having an emission filter for a second type of fluorescence emission, the microscope system can simultaneously detect both fluorescent emission wavelength ranges.

For example, a sample can include green fluorescent protein (GFP) and red fluorescent protein (RFP). Radiation having wavelengths less than 500 nm and centered at 545 nm can be used as fluorescence excitation radiation for GFP and RFP, respectively, when illuminating a sample tagged with both fluorescent proteins. Sets of emission filter centered at 510 nm and centered at 610 nm, which correspond to the emission spectra of GFP and RFP, respectively, can be placed over two subsets of micro-cameras.

In this configuration, the illumination source can excite the GFP and RFP in the sample, while the camera array can capture images of the fluorescence emitted from the GFP and RFP. After the images are captured, the image data can be transmitted to a processor for post-processing, such as with an accompanying algorithm to combine all of the jointly captured image data from all of the micro-cameras into one or more final composite images of the entire specimen. The final composite image can include fluorescence emission intensities from more than one fluorescence emitter type, which can provide a measure of the intensity of more than one spectral range of fluorescence emission at each location across the sample.

In some embodiments, the field of views of the micro-cameras can overlap more than 50% in two directions, such as x and y directions, such that more than half of the resolved points on the object plane for one micro-camera are also resolved by one or more other micro-cameras in the array. This permits a reliable and fast convergence of the fusing algorithm in finding the phase information of the radiation reaching the sample. The fusing algorithm can provide an image reconstruction of the sample, which can offer a measure of sample depth, spectral properties, and the optical phase.

In some embodiments, the field of views of the micro-cameras can overlap more than 50% in just one direction, such as the x direction, and less than 50% in the other direction, e.g., when the micro-cameras in the array are arranged in a rectangular pattern with the spacing between two cameras in one direction smaller than the spacing in the other direction, or when rectangular image sensors are used. The emission filters can be arranged to alternate between each filter type within each column of micro-cameras within the microscope system. For example, the entire column of the camera array has filters for a first type of emission filter, and the next column of the camera array has a second type of emission filters. In this configuration, micro-cameras within adjacent columns can observe two fluorescent states at a common point on the sample, due to the overlapped field of views.

In some embodiments, the emission filters can be mechanically shifted between sequential acquisitions, for example, in the direction that the overlapped field of view of the adjacent micro-cameras is less than 50%. In this shifted configuration, two images are captured by each micro-camera for each illumination pattern, or each with a unique illumination pattern, with the emission filters shifted between each image acquisition. The two captured images can increase the overlapped field of view, for example, to be greater than 50%, to allow for a reliable and fast calculation of the image reconstruction.

In some embodiments, the shifting configuration can be used for more than two types of emission filters, such as for 4 types of emission filters for simultaneously detecting 4 types of fluorescence emission. For example, a repeating set of 4 different emission filters, arranged in a 2×2 pattern, which repeats across the array, can be utilized and scanned in a 2×2 grid to acquire 4 fluorescence emission channels in 4 snapshots.

After capturing and saving images, the multiple fluorescence images or videos are post-processed to extract the fluorescence information from the captured images or videos. For single-fluorescence, all the images stitched together form one continuous field of view. For more than one type of fluorescence, the images corresponding to their respective fluorescence are grouped together to form a continuous field of view, resulting in images with close to or more than one gigapixel.

For example, a system with GFP and RFP produces two high resolution and wide field of view collections of images with timestamps (videos) of the two fluorescence signals. The timestamps of the images acquired by different micro-cameras arranged to image across the entire field of view of interest are accurately matched or synchronized to within microseconds. These videos can be analyzed and inspected on the same analysis device.

In some embodiments, the hardware setup for the microscope system can be optimized for synchronous data transfer and processing. For example, multiple data streams from the cameras can be aggregated into a serial data stream, which can be sent directly to the memory of the processor, for example, through a direct memory access channel. The multiple data streams can use a single clock which can enable exact and synchronous timing of multiple cameras, for example, to less than 10 microseconds, such as less than 1 microsecond. The short timing of the process data can allow the observation and correlation between multiple fluorescence species.

Figure 5A:
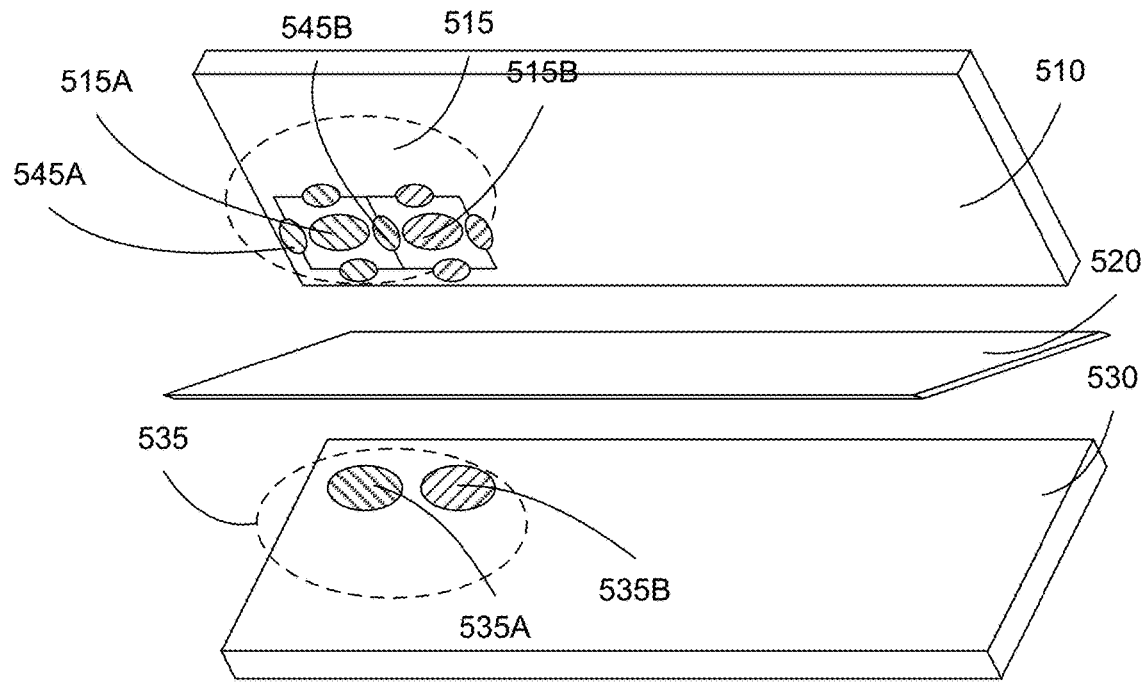
FIGS. 5A-5B illustrate a configuration for a computational fluorescence microscope system according to some embodiments.
Figure 5B:
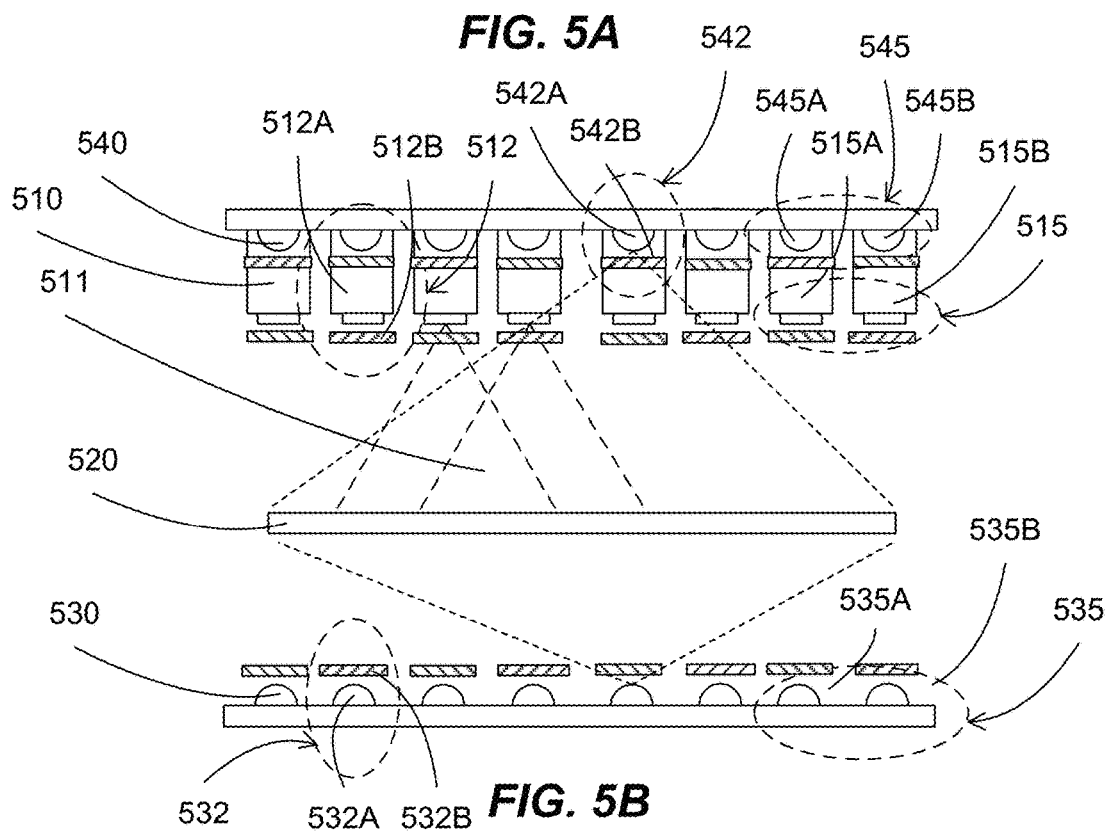

FIGS. 5A-5B illustrate a configuration for a computational fluorescence microscope system according to some embodiments. FIG. 5A shows a perspective view and FIG. 5B shows a cross section view of a computational fluorescence microscope system. The computational fluorescence microscope system can include multiple channels for observing and correlating data between the channels.

A computational fluorescence microscope system can include an array of different emission filter camera units 510 focused on a large sample 520 under the illumination of an array of fluorescence excitation radiation source units 530 and 540 such as filtered LEDs. A controller can be used to control the illumination system to provide different fluorescence excitation illumination patterns to the sample.

Each emission filter camera unit in the camera array can focus on a sample area, with overlapping areas 511 with a nearby emission filter camera unit to allow for accurate image stitching. Each emission filter camera can acquire multiple images under different fluorescence excitation illumination conditions. The captured images can be stitched together to form a high dimension image reconstruction of the sample.

In general, a fluorescence excitation radiation source unit is corresponded to an emission filter camera unit. A radiation source unit can include a band pass filter, e.g., a fluorescence excitation filter, to limit the generated radiation to a range of wavelengths configured to generate fluorescence excitation on the sample. A corresponding camera unit can include a band pass filter, e.g., an emission filter, to capture only the fluorescence signal from the sample caused by the fluorescence excitation. Thus, the fluorescence excitation radiation source unit and the emission filter camera unit operate in pair, with the fluorescence excitation radiation source unit generating the fluorescence excitation radiation needed for the sample to emit the fluorescence signal to be captured by the corresponding camera unit through the emission filter.

For example, a microscope system can be configured to observe one type of fluorescence emission. The radiation source units can include one type of radiation source unit having one type of fluorescence excitation filter. Alternatively, the radiation source units can include one type of fluorescence excitation filter, which is disposed on all radiation source units of the illumination source. The camera units can include one type of camera unit having one type of emission filter. Alternatively, the camera units can include one type of emission filter, which is disposed on all lenses of the camera units of the camera array.

Another microscope system can be configured to observe two types of fluorescence emission. The radiation source units can include two types of radiation source units each having a different type of fluorescence excitation filter. Alternatively, the radiation source units can include two types of fluorescence excitation filter, which are disposed on alternative radiation source units of the illumination source. The camera units can include two types of camera units having two types of emission filter. Alternatively, the camera units can include two types of emission filter, which are disposed on the lenses of the alternate camera units of the camera array.

Another microscope system can be configured to observe one type of fluorescence emission together with a visible illumination. The radiation source units can include two types of radiation source units with one radiation source unit having one type of fluorescence excitation filter and the other radiation source unit without any filter. Alternatively, the radiation source units can include one type of fluorescence excitation filter, which is disposed on alternate radiation source units of the illumination source. The camera units can include two types of camera units with one camera unit having one type of emission filter and the other camera unit without any filter. Alternatively, the camera units can include one type of emission filter, which is disposed on the lenses of the alternate camera units of the camera array.

The fluorescence imaging process from variably illuminated radiation patterns starts by capturing k sets of variably-illuminated images. The variably illuminated radiation patterns include multiple illumination patterns with radiation source units having one or more fluorescence excitation and/or visible light. For example, the illumination patterns can include different configurations of one type of fluorescence excitation radiation source units. Alternatively, the illumination patterns can include different configurations of two types of fluorescence excitation radiation source units.

The illumination patterns can include different configurations of one type of fluorescence excitation radiation source units together with radiation source units without fluorescence excitation filters, e.g., visible light radiation source units.

In general, the illumination source can include k groups of radiation source units, with each group 535 having one or more radiation source units 535A and 535B configured to generate radiation having different fluorescence excitation states. As an example, a group of radiation source units can have 2 radiation source units, with one configured to generate a first fluorescence excitation through a first type of fluorescence excitation filter, and the other configured to generate a second fluorescence excitation through a second type of fluorescence excitation filter. In this diagram, just one group is shown, although in practice there are multiple groups of illumination sources. Other configurations can be used, such as a group of radiation source units having 2, 3, 4, or 5 radiation source units configured to generate radiation with visible light and with one or more different fluorescence excitation states.

A radiation source unit 532 can include a radiation source or a light source 532A with a fluorescence excitation filter 532B. For visible light radiation source unit, there is no filter.

If the radiation source unit having a predetermined fluorescence excitation state in each group of radiation source units is activated one at a time, there can be k illumination patterns of the predetermined fluorescence excitation state for an illumination source having k groups of radiation source units. For example, an illumination source can have 50 groups of radiation source units, with each group of radiation source units having a visible light radiation source unit and a fluorescence excitation radiation source unit. When the groups of radiation source units are activated one at a time, there are 50 illumination patterns, with each pattern including a visible light and a fluorescence excitation radiation. Alternatively, an illumination source can have 50 groups of radiation source units, with each group of radiation source units having a first fluorescence excitation radiation source unit and a second fluorescence excitation radiation source unit. When the groups of radiation source units are activated one at a time, there are 50 illumination patterns, with each pattern including a first fluorescence excitation radiation and a second fluorescence excitation radiation.

In some embodiments, different illumination patterns can be provided by a programmable array of radiation source units, with different groups of radiation source units activated to emit radiation to the sample. The programmable radiation source array can include radiation source units that are at different positions above or below the sample, as well as radiation source units that emit different frequencies (i.e., colors) of radiation and fluorescence excitation states, e.g., through fluorescence excitation filters. The radiation source units can include light emitting diodes (LEDs), individual lasers, laser diodes, spatial light modulators or other electronically controllable light emission elements, with fluorescence excitation filters to generate fluorescence excitation radiation.

The variably-illuminated images can be captured by a camera array, with each camera unit in the camera array capturing an image. The captured images can be sorted based on the captured fluorescence signals from the camera units, e.g., based on the different fluorescence signals caused by the different fluorescence excitation generated by the radiation source units. There can be multiple sets of images, with each set of images including images captured by camera units having the same fluorescence state.

In general, the camera array can include n groups of camera units, with each group 515 having one or more camera units 515A and 515B configured to capture images of different fluorescence signals, for example, through the different types of emission filters. As an example, a group of camera units can have 2 camera units, with one configured to capture a first type of fluorescence signal emitted by the sample due to a first type of fluorescence excitation, and the other configured to capture a second type of fluorescence signal emitted by the sample due to a second type of fluorescence excitation. Other configurations can be used, such as 2, 3, 4, or 5 camera units configured to capture images of visible light and with different types of fluorescence signals.

A camera unit 512 can include a camera 512A with an emission filter 512B. For visible light camera unit, there is no filter, e.g., the camera is configured to capture images caused by the visible light. For a camera unit configured to capture a first type of fluorescence signal, an emission filter having a band pass corresponded to the frequencies of the first type of fluorescence signal can be used.

The camera units in the camera array are all activated at a same time for each illumination pattern to capture images. If there are n groups of camera units with m camera units in each group, there can be m sets of n images. The n images are captured by the camera units with a same fluorescence signal in the camera array. Each set of images in the m sets of images has n images detected for the same fluorescence signal.

For example, a camera array can have 50 groups of camera units, with each group of camera units having a visible light camera unit (e.g., a camera unit without emission filter) and a first type of emission filter camera unit. Under one illumination pattern, there are 2 sets of 50 images. The first set of images includes 50 images captured by the visible light camera units. The second set of images includes 50 images captured by the first type of emission filter camera units.

Alternatively, a camera array can have 50 groups of camera units, with each group of camera units having a first camera unit having a first type of emission filter and a second camera unit having a second type of emission filter. Under one illumination pattern, there are 2 sets of 50 images. The first set of images includes 50 images captured by the first camera units. The second set of images includes 50 images captured by the second camera units.

Figure 6A:
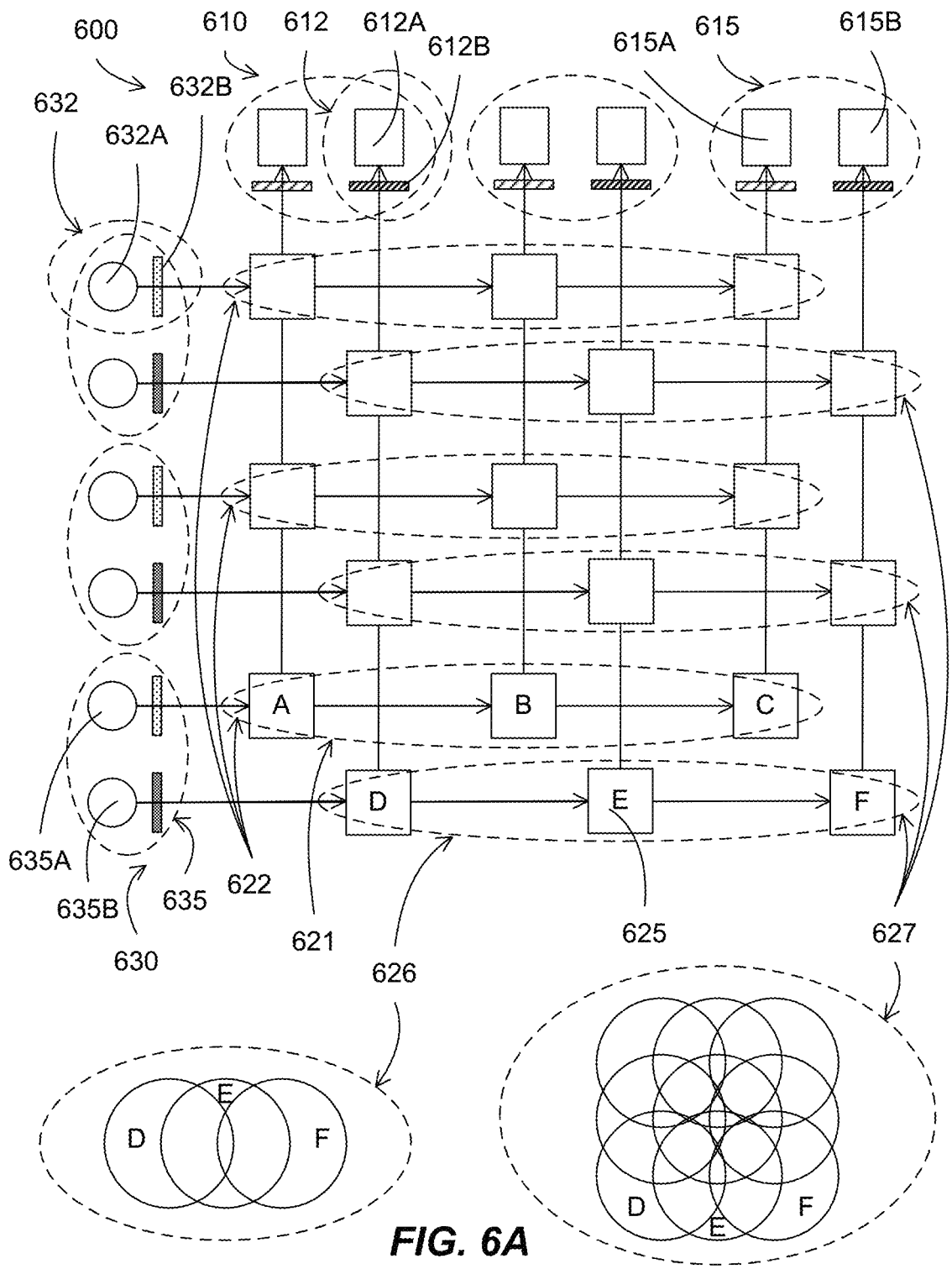
FIGS. 6A-6C illustrate operation schematics of configurations of a computational fluorescence microscope system according to some embodiments.
Figure 6B:
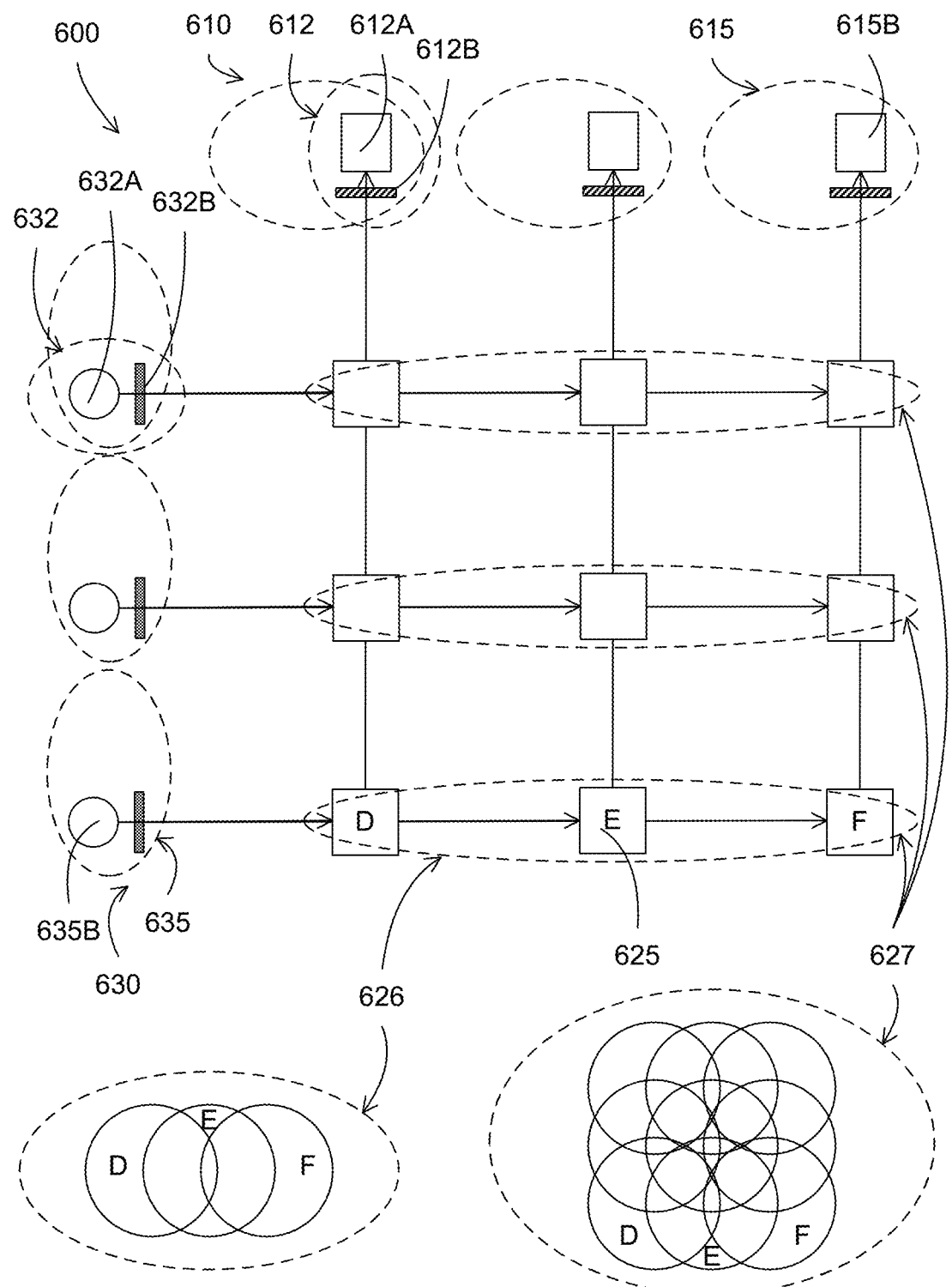
Figure 6C:
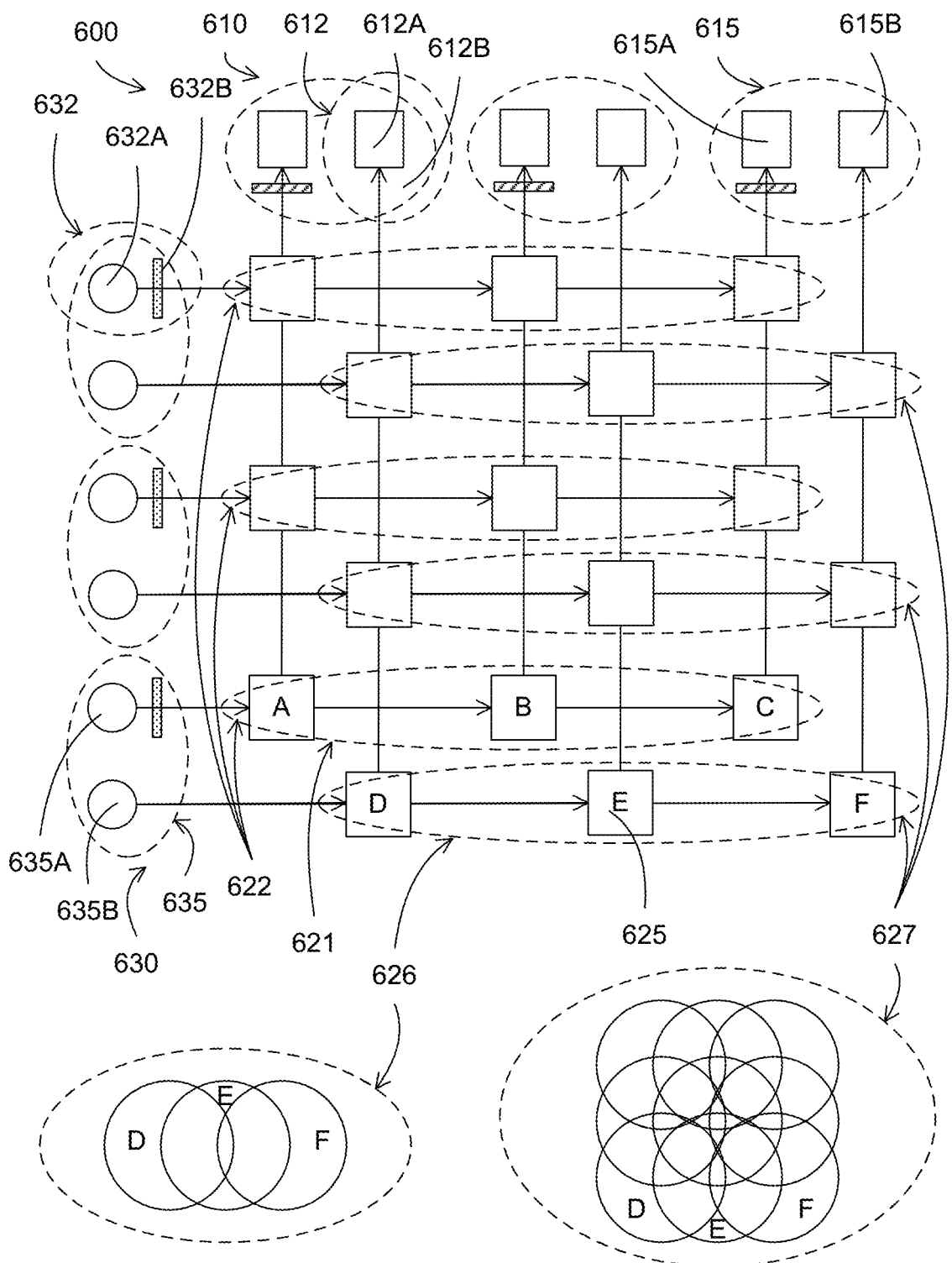

FIGS. 6A-6C illustrate operation schematics of configurations of a computational fluorescence microscope system according to some embodiments. In FIG. 6A, a computational fluorescence microscope system can be configured for two fluorescence channels, e.g., to simultaneously capture information related to two different types of fluorescence.

A microscope system 600 can have an illumination source 630 and a camera array 610 for capturing images of portions of a sample. As shown, the illumination source 630 can include k=3 groups of radiation source units, with each group having p=2 radiation source units having different types of fluorescence excitation filters.

In general, the illumination source can include k groups of radiation source units, with each group 635 having one or more radiation source units 635A and 635B equipped with different types of fluorescence excitation filters. For example, radiation source unit 635A is configured to generate a first fluorescence excitation through a first type of fluorescence excitation filter. Radiation source unit 635B is configured to generate a second fluorescence excitation through a second type of fluorescence excitation filter. In this diagram, just 3 groups are shown, although in practice there can be multiple groups of illumination sources. In this diagram, 2 radiation source units per group of radiation source units are shown, although in practice there can be 1, 3 or more radiation source units per group. In addition, each radiation source unit is shown with a fluorescence excitation filter. In other configurations, there can be radiation source units without any fluorescence excitation filter, e.g., radiation source units configured to generate a spectrum of radiation as determined by the radiation source.

As shown, a radiation source unit 632 can include a radiation source or a light source 632A with a fluorescence excitation filter 632B. In other configurations, the radiation source unit can include only a radiation source without the filter, e.g., the radiation from the radiation source unit is not restricted to the wavelength range of the filter, e.g., a regular radiation source unit generating visible light.

As shown, the camera array 710 can include n=3 groups of camera units, with each group having m=2 camera units having different types of emission filters.

In general, the camera array can include n groups of camera units, with each group 615 having one or more camera units 615A and 615B configured to capture images of different fluorescence signals, for example, through the different types of emission filters. For example, camera unit 615A, with an appropriate first emission filter, is configured to capture a first type of fluorescence signal emitted by the sample due a first type of fluorescence excitation. Camera unit 615B, with an appropriate second emission filter, is configured to capture a second type of fluorescence signal emitted by the sample due a second type of fluorescence excitation. In this diagram, just 3 groups are shown, although in practice there can be multiple groups of camera units. Also in this diagram, 2 camera units per group of camera units are shown, although in practice there can be 1, 3 or more camera units per group. In addition, each camera unit is shown with an emission filter. In other configurations, there can be camera units without any emission filter, e.g., camera units configured to capture a spectrum of radiation as determined by the camera.

As shown, a camera unit 612 can include a camera 612A with an emission filter 612B. In other configurations, the camera unit can include only a camera without the filter, e.g., the radiation captured by the camera unit is not restricted to the wavelength range of the filter, e.g., a regular camera configured to capture visible light images.

In some embodiments, each radiation source unit is configured to cover the whole sample. Each camera unit is configured to capture images of a portion of the sample. Further, a camera unit captures only images corresponding to matching radiation source unit. For example, radiation source unit 635A can irradiate the whole sample. Due to the fluorescence excitation filter of the radiation source unit 635A, the sample can experience a first fluorescence excitation, and thus can emit a first fluorescence signal. The fluorescence signal can be captured by camera units with corresponding emission filters, such as camera units 615A capturing image portion C. Other camera units 615A of other groups can capture other image portions A and B for the whole sample. Similarly, radiation source unit 635B can irradiate the whole sample, with the fluorescence signals captured by camera units 615B in image portion F, together with other image portions D and E captured by other camera units 615B of other groups.

In operation, a first illumination pattern can include a group of radiation source units 635. All camera units capture image of portions of the sample. For example, camera unit 615A or 615B of group of camera units 615 can capture image C or F of a portion of the sample, respectively. The image C or F has the fluorescence signal emitted due to fluorescence excitation from the radiation source unit 635A or 615B, respectively.

All camera units, such as camera unit 615A, in all groups of camera units 615 can capture images A, B, and C of overlapped portions of the sample. Thus, the images A, B, and C captured by n=3 camera units 615A can be assembled, such as stitching together, to form an assembled image 621, e.g., a complete image of the sample, representing a fluorescence state of the sample caused by the excitation from radiation source unit 635A.

Similarly, all camera units, such as camera unit 615B, in all groups of camera units 615 can capture images D, E, and F of overlapped portions of the sample. Thus, the images D, E, and F captured by n=3 camera units 615B can be assembled, such as stitching together, to form an assembled image 626, e.g., a complete image of the sample, representing a fluorescence state of the sample caused by the excitation from radiation source unit 635B.

Thus, under one illumination pattern generated by the group of radiation source units 635, m=2 complete images of the sample are captured. For each complete image, there are n=3 images of portions of the sample captured by the corresponding camera unit in the n=3 groups of camera units.

The process can be repeated for the k=3 groups of radiation source units, with all groups of radiation source units having same individual radiation source units, e.g., each group of radiation source units includes a first radiation source unit 635A and a second radiation source unit 635B.

As a result, the camera array has captured m=2 sets 622 and 627 of assembled or complete images of the sample, with each set of complete images having k=3 assembled or complete images 621 and 626. For each assembled or complete image 621 or 626, there are n=3 images of portions of the sample A, B, C or D, E, F captured by the corresponding camera unit 615A or 615B in the groups 615 of camera units. The first set 622 of assembled or complete images has the first fluorescence state excited by the first radiation source unit 635A and captured by the first camera unit 615A. The second set 627 of assembled or complete images has the second fluorescence state excited by the second radiation source unit 635B and captured by the second camera unit 615B.

Thus, after all illumination patterns of k groups of radiation source units, there are m sets 622 and 627 of assembled or complete images of the sample, with each set having k assembled or complete images 621 and 626. An assembled or complete image 621 or 626 has n=3 images of portions A, B, C or D, E, F of the sample captured by the corresponding camera unit in the groups of camera units.

In some embodiments, the present invention discloses systems and methods of fluorescence imaging from variably-illuminated images in an array of multiple small microscopes (i.e., micro-cameras), tiled together in an array. Using a tightly packed array of micro-cameras, high resolution (1-10 μm) over a large area (hundreds of square centimeters) can be achieved. The fluorescence imaging can be performed by a computational fluorescence micro-camera array microscope system, which can obtain rapid fluorescence measurements at microscopic resolution over a large area with a minimum number of image-capturing processes.

In some embodiments, the computational fluorescence microscope can include an illumination source configured to provide multiple illumination patterns, a camera array configured to capture multiple images under each illumination pattern, and a controller configured to process the image data.

The illumination source can include multiple radiation source units arranged in groups of radiation source units. The groups of radiation source units can be disposed above, below, or both above and below the sample. With the camera array disposed above the sample, the radiation source units disposed below the sample can provide transmissive, absorbing, and scattering radiation to the camera array, and the radiation source units disposed above the sample can provide reflective, absorbing, and scattering radiation to the camera array.

Each group of radiation source units can include one or more radiation source units, such as one or more distinct radiation source units. For example, a radiation source unit in a group of radiation source units can include a radiation source, e.g., a source capable of generating radiation having a wavelength spectrum, such as a visible light source, an infrared light source or an ultraviolet light source such as light emitting diodes (LEDs), individual lasers, laser diodes, spatial light modulators or other electronically controllable light emission elements. Another radiation source unit in a group of radiation source units can include a radiation source, as described above, together with a filter to limit the wavelengths to within the wavelength range determined by the filter. For example, the filter can be a band pass filter, which can allow radiation within a wavelength range to pass through. In the context of the present specification, a band pass filter can include a low pass filter and a high pass filter. In the low pass filter, the pass-through frequency range is less than an upper threshold frequency, e.g., between a zero wavelength to the upper threshold frequency. In the high pass filter, the pass-through frequency range is greater than a lower threshold frequency, e.g., between the lower threshold frequency to a very high frequency.

In some embodiments, the filter is configured to pass radiation configured to generate fluorescence excitation on the sample, and thus is called a fluorescence excitation filter in the present specification, in order to distinguish with other filters. There can be different types of fluorescence excitation filters, e.g., different fluorescence excitation filters that are configured to generate different modes (e.g., wavelengths) of fluorescence excitation on the sample. In terms of physical filters, the different types of fluorescence excitation filters are different filters having different pass-through ranges of wavelengths. For example, a first type of fluorescence excitation filter has a first pass-through wavelength range that radiation in this wavelength range is capable of generating a first type of fluorescence excitation on the sample. A second type of fluorescence excitation filter has a second pass-through wavelength range, which is different from the first wavelength range, that radiation in this wavelength range is capable of generating a second type of fluorescence excitation on the sample.

In some embodiments, the radiation source units are arranged in a periodic array, for example, as a top periodic array and/or a bottom periodic array. The individual radiation source units can be disposed uniformly or evenly in the periodic array. Alternatively, the radiation source units can form clusters, e.g., a group of radiation source units can clustered together. For example, the different types of radiation source units can be clustered together, e.g., the distance between the radiation source units within a group of radiation source units is smaller than to a radiation source unit in a different group.

The controller can be configured to generate multiple illumination patterns from the illumination source, e.g., from the radiation source units. Each illumination pattern can include radiation from one or more radiation source units, such as from one or more individual radiation source units or from one or more groups of radiation source units. In the case of fluorescence imaging, different radiation source units in one or more groups of radiation source units can be activated at once, for example, to generate two types of fluorescence excitation from radiation source units equipped with different types of fluorescence excitation filters, e.g., generating radiation in two different wavelength ranges, with radiation in each wavelength range configured to perform a different type of fluorescence excitation on the sample. Alternatively, different radiation source units in one or more groups of radiation source units can be activated at once to generate one or more types of fluorescence excitation from radiation source units equipped with different types of fluorescence excitation filters, and/or to generate visible light from radiation source units without filters.

The radiation from different illumination patterns can provide radiation with different path lengths to the sample, so that each point on the sample can receive radiation with multiple path lengths. The different path lengths can allow the reconstruction of phase information using intensity information from the multiple path length radiation.

The camera array can include multiple camera units arranged in groups of camera units. The groups of camera units can be disposed above the sample. Each group of camera units can include one or more camera units, such as one or more distinct camera units. For example, a camera unit in a group of camera units can include a camera, e.g., an optical sensor capable of capturing images due to radiation in a wavelength range, such as images caused by visible light, infrared light, or ultraviolet light. Another camera unit in a group of camera units can include a camera, as described above, together with a filter to limit the wavelengths reaching the camera to be within the wavelength range determined by the filter. For example, the filter can be a band pass filter, which can allow radiation within a wavelength range to pass through.

In some embodiments, the filter is configured to pass radiation emitted by the sample due to a fluorescence excitation, e.g., the fluorescence signal emitted as a result of the fluorescence excitation. The filter for the camera units to capture the fluorescence signals can be called an emission filter in the present specification, in order to distinguish with other filters. There can be different types of emission filters, e.g., different emission filters that are configured to capture different modes of fluorescence signals emitted by the sample. In terms of physical filters, the different types of emission filters are different filters having different pass-through ranges of wavelengths. For example, a first type of emission filter has a first pass-through wavelength range to filter out radiation outside the wavelength range of a first type of fluorescence signal emitted by the sample, e.g., to improve the signal to noise ratio by allowing the camera units to capture only the first type of fluorescence signal. A second type of fluorescence excitation filter has a second pass-through wavelength range, which is different from the first wavelength range, to filter out radiation outside the wavelength range of a second type of fluorescence signal emitted by the sample, e.g., to improve the signal to noise ratio by allowing the camera units to capture only the second type of fluorescence signal.

The camera units are positioned so that each camera unit is configured to capture images of an area of the sample, e.g., different camera units are configured to capture images of different areas. The areas captured by different camera units can be partially overlapped, e.g., adjacent camera units can have an overlapped field of view. The overlapped field of view can be greater than 50% for image reconstruction (e.g., phase calculation for the captured images), or can be less than 50% for image stitching (e.g., matching features for assembling a larger image from smaller images). The multiple camera units with overlapped field of view can allow the microscope system to capture images of large sample, by stitching and assembling images of portions of the sample.

The controller can be configured to control the camera units to capture images from the sample under each illumination pattern from the illumination source. Each camera unit can capture images corresponding to radiation generated from matching radiation source units. For example, radiation generated from one or more radiation source units without any filter can be captured by camera units without any filter, since the wavelength range of the radiation sources matches the wavelength range of the cameras, meaning the wavelength ranges are similar. Similarly, radiation generated from one or more radiation source units having a same type, such as a first type, of fluorescence filters can be captured by camera units having a first type of emission filter, since the wavelength range of the radiation sources matches the wavelength range of the cameras, meaning the wavelength range of the fluorescence filter is configured to pass the first type of fluorescence excitation radiation, and the wavelength range of the emission filter is configured to pass the first type of fluorescence signal emitted due to the first type of fluorescence excitation.

By capturing images from multiple different illumination patterns, phase information can be reconstructed from the multiple captured intensity-only images. With a large overlapped field of view, such as greater than 50%, the image reconstruction process can be reliable and can provide an image reconstruction with additional information of the sample.

If the groups of camera units have more than one type of camera units, such as two camera units with different types of emission filters, or a camera unit with an emission filter and a camera unit without filter, the controller can be configured to separate the images according to the types of the camera units. For example, images captured by a first type of camera units are separated and assembled to form a first assemble image for the first type of camera units for each illumination pattern. Similarly, images captured by a second type of camera units are separated and assembled to form a second assembled image for the second type of camera units for each illumination pattern. The assembled images can be formed by stitching the overlapped images together.

After multiple illumination patterns, the system can have multiple first and second, and others, assembled images, captured by the first and second, and others, types of camera units, separated and stitched together. The assembled images can be grouped together to form multiple sets of assembled images, with each set of assembled images corresponded to a type of camera units. For example, a first set of assembled images can include all the assembled images from the first type of camera units, and a second set of assembled images can include all the assembled images from the second type of camera units. There can be other sets of assembled images, if there are other types of radiation source units and corresponding camera units. Each set of assembled images can be fused together, e.g., undergo an image reconstruction process, to form an image reconstruction of the sample, which carries more information than the individual assembled images, such as having phase information in addition to intensity information. Thus, the controller can be configured to use a fusing algorithm based on overlapped field of views of two or more adjacent camera units configured to capture multiple images of a same band of wavelengths.

The illumination source and the camera array can allow illumination-controlled fluorescence imaging, which includes controlling the fluorescence excitation wavelengths and the incoming radiation to the camera units, together with the ability to capture multiple fluorescence images simultaneously. The captured images can be post processed to obtain fluorescence properties of the sample. For example, the controller can be configured to calculate a fluorescence property of the sample for the images captured by the camera units with the emission filters based on the image reconstructions of the sample. Further, the controller can be configured to correlating a fluorescence property of the sample for the images captured by the camera units based on the image reconstructions of the sample. Also, the controller can be configured to correlate between the fluorescence signal and the position on the sample can be performed for the images captured by the camera units with the emission filters and by the camera units without the filters.

In some embodiments, the radiation source units and the camera units are configured to operate in pair. For example, a radiation source unit can be configured to generate radiation that can be captured directly by a corresponding camera unit, as in the case of radiation in the visible light spectrum. A radiation source unit can be configured to generate radiation that can perform a first mode of fluorescence excitation on a sample, e.g., through a first type of fluorescence filter. The first mode of fluorescence excitation can cause the sample to emit a first type of fluorescence signals, which can be captured by a corresponding camera unit, e.g., through a first type of emission filter to capture the first type of fluorescence signal while filtering out unwanted radiation such as radiation in the visible light spectrum.

In some embodiments, the system can be configured with different types of radiation source units and corresponding types of camera units. The different types of radiation source units can include radiation source units having fluorescence excitation filters and radiation source units without filters. The different types of camera units can include camera units having emission filters and camera units without filters. For example, a radiation source unit can include a first type of fluorescence excitation filter and a camera unit can include a corresponding first type of emission filter. Another radiation source unit can be without filter and another camera unit can also be without filter.

In some embodiments, the camera units can be arranged in one or more periodic arrays, for example, separated by a gap between the arrays to accommodate the radiation source units. The individual camera units can be disposed uniformly or evenly in the periodic arrays.

For multiple types of camera units, such as camera units having different types of emission filters and camera units without filters, the camera units can form a checkerboard configuration, e.g., having the different camera units arranged alternatively in all rows and columns. Alternatively, the camera units can form a columnar configuration, e.g., having the different camera units arranged alternatively in all rows with same camera units in rows, or in all columns with same camera units in columns.

In some embodiments, a mode of fluorescence can include fluorescence from green fluorescence protein (GFP), which includes various types of protein that exhibit green to cyan fluorescence when exposed to light in the blue to ultraviolet range. Thus, a type of fluorescence excitation filter can be a band pass filter for the radiation in the blue (450-495 nm) to ultraviolet (100-400 nm) range, such as for radiation having wavelengths less than 400 nm, less than 450 nm, less than 500 nm, wavelength ranges between 450 and 100 nm, or wavelength ranges between 500 and 100 nm. A corresponding type of emission filter can be a band pass filter for the radiation in the green (550 nm) to the cyan (500 nm) range, such as for radiation having wavelength ranges between 490 and 560 nm, wavelength ranges between 500 and 550 nm, wavelength ranges having a center wavelength of 510 nm and a bandpass of 20 nm, 30 nm, or 40 nm, wavelength ranges having a center wavelength of 550 nm and a bandpass of 20 nm, 30 nm, or 40 nm, or wavelength ranges having a center wavelength of 500 nm and a bandpass of 20 nm, 30 nm, or 40 nm.

In some embodiments, a mode of fluorescence can include fluorescence from red fluorescence protein (RFP), which includes various types of protein that exhibit red to orange fluorescence, or orange, red, or far-red fluorescence, when exposed to light with shorter wavelengths, such as light in the green (550 nm) to ultraviolet (400 nm) range. Thus, a type of fluorescence excitation filter can be a band pass filter for the radiation in the green (495-570 nm) to ultraviolet (100-400 nm) range, such as for radiation having wavelengths less than 500 nm, less than 520 nm, less than 545 nm, wavelength ranges between 500 and 100 nm, wavelength ranges between 545 and 650 nm, or wavelength ranges having a center wavelength of 545 nm.

A corresponding type of emission filter can be a band pass filter for the radiation in the red to orange (590-750 nm), orange (590-620 nm), red (620-750 nm), or far red (680-750 nm) range, such as for radiation having wavelength ranges between 590 and 750 nm, wavelength ranges between 590 and 630 nm, wavelength ranges between 620 and 750 nm, wavelength ranges between 680 and 750 nm, wavelength ranges having a center wavelength of 610 nm and a bandpass of 20 nm, 30 nm, or 40 nm, wavelength ranges having a center wavelength of 600 nm and a bandpass of 20 nm, 30 nm, or 40 nm, or wavelength ranges having a center wavelength of 650 nm and a bandpass of 20 nm, 30 nm, or 40 nm.

In some embodiments, a mode of fluorescence can include fluorescence from other fluorescence protein, such as yellow fluorescence protein or cyan fluorescence protein.

In some embodiments, the system can be configured with a first type of radiation source units having fluorescence excitation filters suitable for green, red, or other color fluorescence protein and a camera unit can include a corresponding type of emission filter. The system can be configured with radiation source units without filters, and corresponding camera units without filters.

Alternatively, the different types of radiation source units can include radiation source units having different types of fluorescence excitation filters. The different types of camera units can include camera units having different types of emission filters. For example, a radiation source unit can include a first type of fluorescence excitation filter and a camera unit can include a corresponding first type of emission filter. Another radiation source unit can include a second type of fluorescence excitation filter and another camera unit can include a corresponding second type of emission filter. For example, the multiple modes of fluorescence can include a combination of fluorescence from green fluorescence protein, red fluorescence protein, yellow fluorescence protein, cyan fluorescence protein, with the fluorescence excitation filters and emission filters having wavelength ranges as discussed above.

In some embodiments, the system can be configured with two or more types of radiation source units having fluorescence excitation filters selected from a combination of color fluorescence protein, such as from green, red, orange, yellow or cyan fluorescence protein. The system can also be configured with one or more corresponding types of camera units having a corresponding type of emission filter.

In some embodiments, the filters, e.g., the fluorescence excitation filters for the radiation source units, and the emission filters for the camera units, can be integrated with the radiation source units and the camera units. For example, each radiation source unit can have a fluorescence excitation filter incorporated as a lens for the radiation source unit. Similarly, each camera unit can have an emission filter incorporated as a lens for the camera unit.

In some embodiments, the filters can be configured to multiple units, e.g., a sheet of fluorescence excitation filters can be used for covering multiple radiation source units, and a sheet of emission filters can be used for covering multiple camera units. For example, in a system having one type of camera units and radiation source units, a sheet of emission filters can be disposed to provide filters for all the camera units. A top sheet of fluorescence excitation filters can be disposed to provide filters for all the radiation source units disposed above the sample. A bottom sheet of fluorescence excitation filters can be disposed to provide filters for all the radiation source units disposed under the sample.

In a system having multiple types of camera units and radiation source units, multiple sheets of filters can be used. For example, multiple sheets of emission filters can be disposed to provide filters for the camera units, with a sheet of first type of emission filters covering the first type of camera units, a sheet of second type of emission filters covering the second type of camera units, and so on. Similarly, multiple sheets of fluorescence excitation filters can be disposed to provide filters for the radiation source units, with a sheet of first type of fluorescence excitation filters covering the first type of radiation source units, a sheet of second type of fluorescence excitation filters covering the second type of radiation source units, and so on.

For example, for system having 2 types of camera units disposed in a checkerboard configuration, a first sheet of the first type of emission filters can have a checkerboard configuration for covering the first type of camera units. A second sheet of the second type of emission filters can also have a checkerboard configuration for covering the second type of camera units.

Similarly, for system having 2 types of radiation source units disposed in a checkerboard configuration, a first sheet of the first type of fluorescence excitation filters can have a checkerboard configuration for covering the first type of radiation source units. A second sheet of the second type of fluorescence excitation filters can also have a checkerboard configuration for covering the second type of radiation source units.

For system having 2 types of camera units disposed in a columnar configuration, a first sheet of the first type of emission filters can have a columnar configuration, e.g., having multiple columns of filter material, for covering the first type of camera units. A second sheet of the second type of emission filters can also have a columnar configuration, e.g., having multiple columns of filter material, for covering the second type of camera units.

Similarly, for a system having 2 types of radiation source units disposed in a columnar configuration, a first sheet of the first type of fluorescence excitation filters can have a columnar configuration, e.g., having multiple columns of filter material, for covering the first type of radiation source units. A second sheet of the second type of fluorescence excitation filters can also have a columnar configuration, e.g., having multiple columns of filter material, for covering the second type of radiation source units.

In some embodiments, the sheets of fluorescence excitation filters and emission filters can be configured to be movable. The filter sheets can move between two different positions, with a first position for covering a first type of the units, and the second position covering a second type of the units. By moving between the positions, the units can swap their characteristics, e.g., the first type becomes the second type and vice versa.

For example, a first sheet and a second sheet of different fluorescence excitation/emission filters can cover the first type and the second type of radiation source/camera units, respectively. The first and second sheets of filters can be configured to move to a new position, in which the first sheet and the second sheet of filters can cover the second type and the first type of radiation source/camera units, respectively. Extra filter material can be needed at the edges of the sheets, for example, to cover the radiation source/camera units at the edges.

In some embodiments, the present invention discloses a retrofit kit to convert a computational microscope system into a computational fluorescence microscope system. The retrofit kit can include sets of filters for the radiation source units and the camera units, and a modification to the controller to operate and process the captured images.

For example, for systems with one type of fluorescence imaging, the sets of filters can include sets of fluorescence excitation filters for the radiation source units, above, below, or above and below the sample. The sets of filters can include a set of emission filters for the camera units. The sets of fluorescence excitation filters can be positioned so that radiation from the radiation source units will pass through the filters before reaching the sample. The sets of emission filters can be positioned so that radiation from the sample, such as the fluorescence signal, will pass through the filters before reaching the camera units. The controller can be modified to calculate fluorescence properties based on the captured images.

For systems with multiple types of fluorescence imaging, the sets of filters can include multiple sets of fluorescence excitation filters, each set with a different type of filters, for the radiation source units, above, below, or above and below the sample. The sets of filters can include multiple sets of emission filters, each set with a different type of filters, for the camera units. Each set of filters can be positioned for an appropriate type of radiation source or camera units. For example, for systems having two types of camera units in a checkerboard configuration, a first set of emission filters in a checkerboard configuration can be positioned to cover alternate camera units. For systems having two types of camera units in a columnar configuration, a first set of emission filters in a columnar configuration can be positioned to cover alternate camera units.

The controller can be modified to perform the fusing algorithm based on the new configuration of the camera units. The controller can be modified to calculate fluorescence properties based on the captured images.

In FIG. 6B, a computational fluorescence microscope system can be configured for one channel of fluorescence, e.g., the camera units and the radiation source units are equipped with one type of emission filters and fluorescence excitation filters, respectively. The illumination source 630 can include k=3 groups of radiation source units, with each group having p=1 radiation source unit having a type of fluorescence excitation filter. The camera array 610 can include n=3 groups of camera units, with each group having m=1 camera unit having a corresponding type of emission filter.

In FIG. 6C, a computational fluorescence microscope system can be configured for one channel of fluorescence together with one channel for visible light. The illumination source 630 can include k=3 groups of radiation source units, with each group having p=2 radiation source units with a first radiation source unit having a type of fluorescence excitation filter and a second radiation source unit without filters. The camera array 610 can include n=3 groups of camera units, with each group having m=2 camera units with a first camera unit having a corresponding type of emission filter and a second camera unit without filters.

Figure 7:
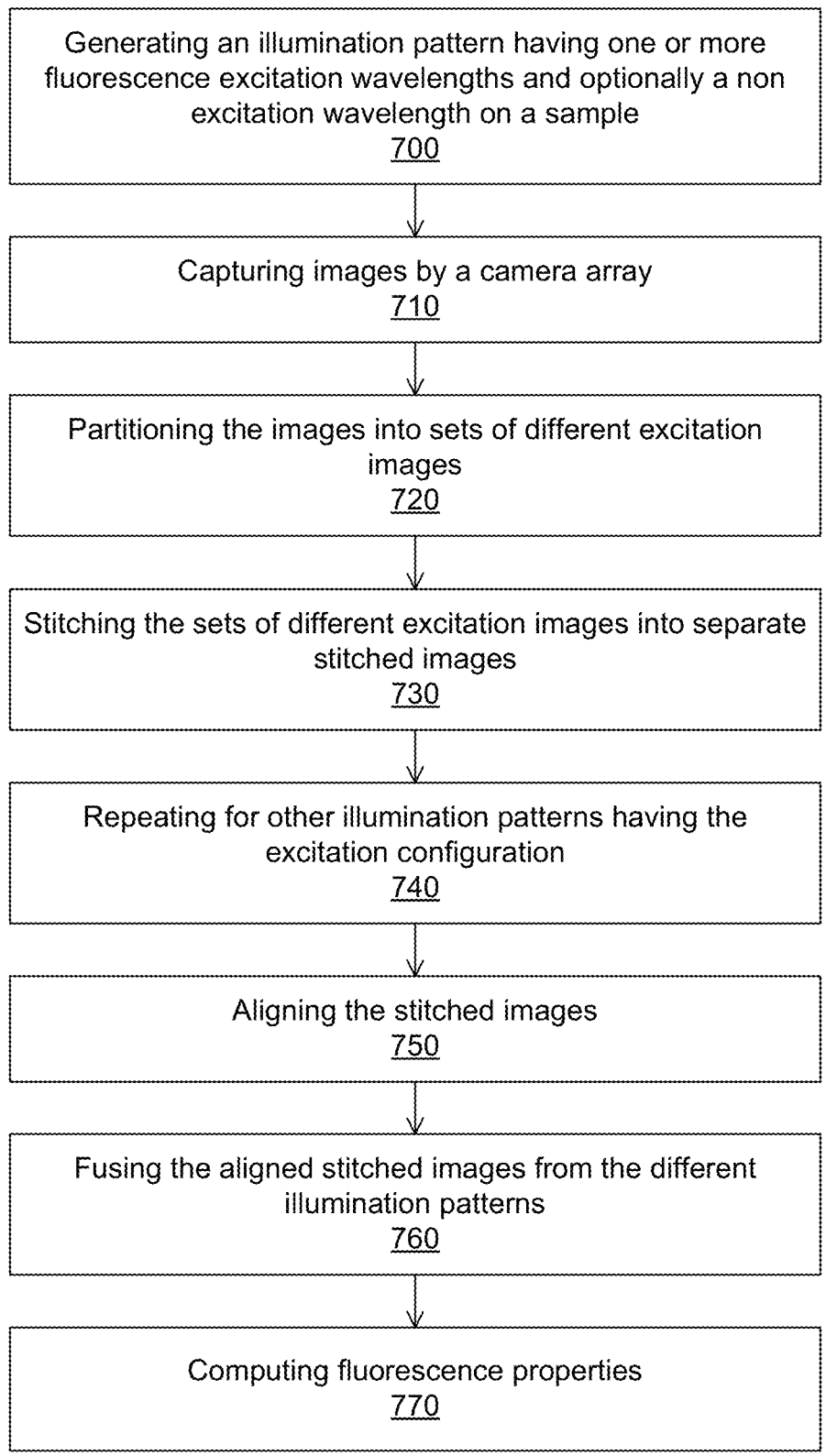
FIG. 7 illustrates a flow chart for operating a computational fluorescence microscope system according to some embodiments.

FIG. 7 illustrates a flow chart for operating a computational fluorescence microscope system according to some embodiments. The microscope system can include a camera array and an illumination source, which are controlled by one or more controllers, such as a camera controller, an illumination controller, and a system controller. There are filters, such as fluorescence excitation filters and emission filters for selective radiation source units and the camera units, respectively, in the microscope system.

In operation, multiple illumination patterns can be generated in sequence, with the camera units capturing images of the sample under each illumination pattern. An illumination pattern can include radiation from one or more groups of radiation source units with each group having one or more radiation source units equipped with one or more types of fluorescence filter. Thus, each illumination pattern can include one or more type of radiation, e.g., radiation having one or more wavelength ranges, such as a visible spectrum for visible light image, a blue spectrum for green fluorescence, and a green spectrum for red fluorescence.

The camera units in the camera array can capture images of portions of the sample. The images are sorted based on the fluorescence signals (and the absence of fluorescence signal for the visible light images), which are determined by the emission filters (and the absence of emission filter for the visible light images) on the camera units. The images having a same fluorescence signal, e.g., captured by camera units having a same type of emission filter for fluorescence excitation from radiation source units having a corresponding type of fluorescence excitation filter, are stitched together to form an assembled image of the sample. There can be n×m images of the sample, if there are n×m camera units, grouping into n groups of camera units and m types of emission filter and non-filter for each group of camera unit.

The process can be repeated for other illumination patterns. If there are a total of k illumination patterns, there are m sets of k assembled images of the sample, with each assembled image having n images.

The sets of assemble images of the sample can be processed, such as fused together to form high dimensional image reconstructions of the sample, with different fluorescence signals and visible light. Fluorescence properties of the sample can be calculated from the image reconstructions.

Operation 700 generates an illumination pattern having one or more fluorescence excitation wavelengths and optionally a non excitation wavelength on a sample. The illumination pattern can be generated by one or more groups of radiation source units with each group of radiation source units including one or more radiation source units having different types of fluorescence excitation filter and optionally one or more radiation source units without filters. For example, an illumination pattern can include one type of fluorescence excitation radiation. An illumination pattern can include two or more types of fluorescence excitation radiation. An illumination pattern can include one or more types of fluorescence excitation radiation and visible light radiation. The illumination pattern can reach and interact with the sample, for example, to generate fluorescence excitation on the sample to emit fluorescence signals. In the case of no filter, the illumination can be partially or totally absorbed by the sample, being transmissive or reflective by the sample, depending on the location of the light sources, being scattered by the sample, or a combination of two or more interaction, such as partially absorbed and partially transmissive.

Operation 710 captures images of the sample by the camera units in a camera array of the microscope system. For example, n×m images can be taken for a camera array having n×m camera units, which are partitioned into n groups of camera units with each group having m camera units with different types of emission filter and/or without filter. The images can be overlapped, meaning adjacent camera units can capture an overlapping portion of the image areas. The camera units can be positioned so that the camera units with same types of emission filter cover the whole sample, e.g., every area of the sample are captured by one or more camera units having the same type of emission filter or without filters. For example, n camera units in the n groups of camera units are configured to capture the whole sample image, e.g., the sample area of interest. Thus, in general, for each illumination pattern, there are m whole images, e.g., m assembled images with each assembled image assemble from n camera units.

Operation 720 partitions the n×m images, e.g., the n×m images can be sorted according to the camera types of emission filter, to provide m groups of n images with each group of images detecting a same type of fluorescence signal.

Operation 730 stitches the images together to form multiple assembled images, with each assembled image representing the sample area of interest. For example, the n images in a group (of the m groups) having a same type of emission filter and also the same type of fluorescence filter can be stitched together to form an assembled or complete image of the sample. There are m assembled or complete images of the sample.

Operation 740 repeats to generate k different illumination patterns, and capturing and partitioning into m sets of k groups of n images with each set of image groups detecting a same type of fluorescence signal, with each group of images under a different illumination pattern.

Operation 750 aligns the assembled or complete images from the different illumination patterns for each set of k groups of n images. After the alignment, there are m sets with each set having k assembled or complete images aligned together to show different captured fluorescence signals or to show captured visible light images.

Operation 760 fuses the aligned assembled images from the different illumination patterns. For example, the k assembled or complete images for each fluorescence state or lack of fluorescence state (e.g., visible light) can be fused to form a high dimensional image reconstruction of the sample for the detected fluorescence signal. There can be m high dimensional image reconstructions of the sample, each for a detected fluorescence signal or for a visible light.

Operation 770 computes fluorescence properties of the sample, for example, based on the image reconstructions of the sample. For example, correlation between two different types of fluorescence signal can be calculated. Alternatively, correlation between the fluorescence signal and the position of the sample base on the visible image can be calculated.

In some embodiments, the method can further include moving the filters to exchange the types of the filters for the camera units. The camera units can capture images under the exchanged filter types for the same illumination pattern. The images can be combined with the images captured previously under the non-exchanged camera units and under the same illumination pattern. The combined images can be fused to form an image reconstruction, with twice the number of captured images.

Illumination Source

In some embodiments, the illumination source can include multiple groups of radiation source units, with each radiation source unit including one or more different types of radiation source units, for example, due to the different types of fluorescence excitation filter.

Figure 8:
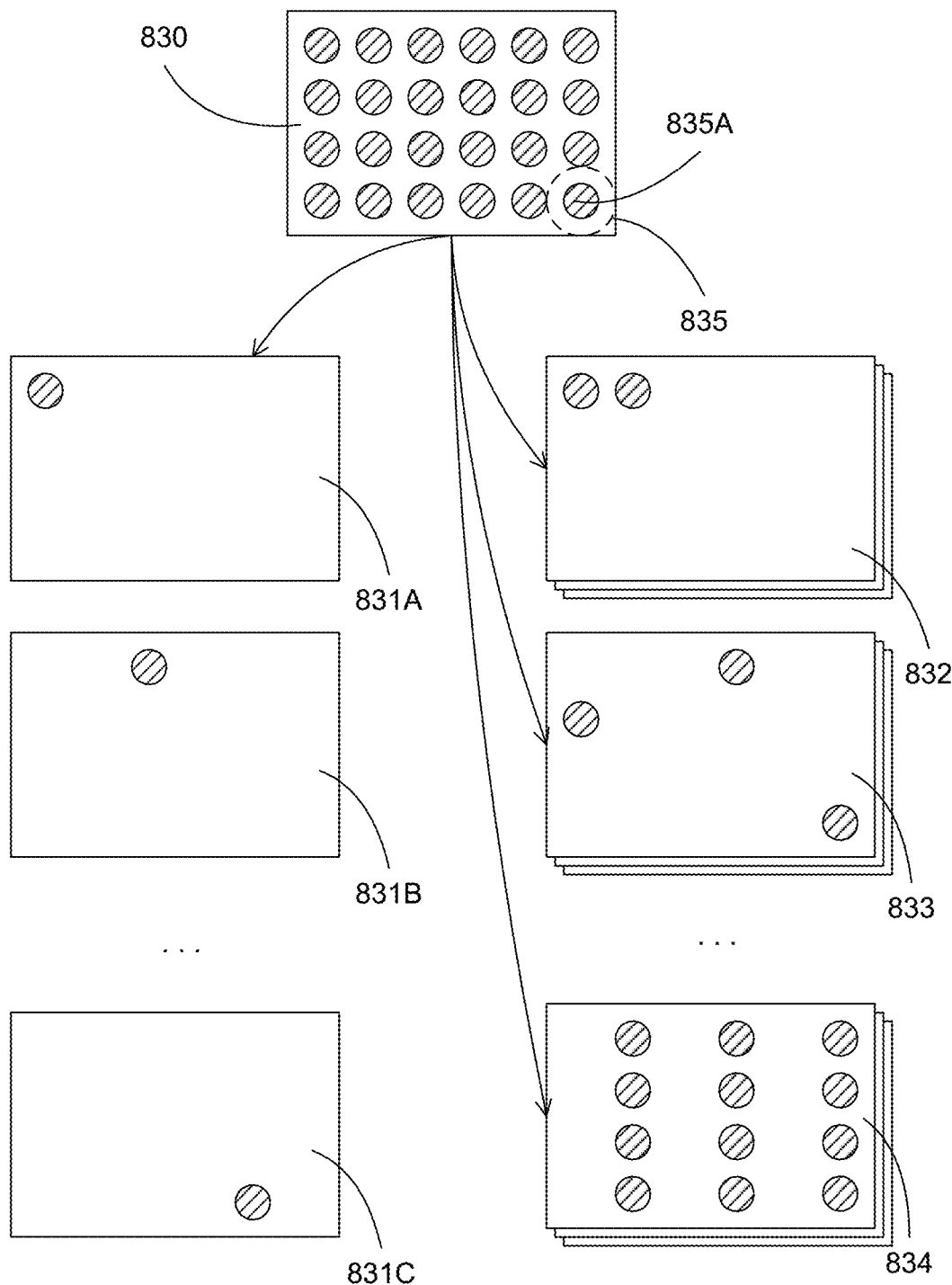
FIG. 8 illustrates an illumination source according to some embodiments.

FIG. 8 illustrates an illumination source according to some embodiments. The illumination source 830 can be used as a bottom illumination source. Configurations for top illumination source can be similar. The illumination source 830 can include multiple groups 835 of radiation source units, with each group 835 having one radiation source unit 835A. The radiation source units 835A can include a radiation source and a type of fluorescence excitation filter, in order to limit the radiation to the wavelength range determined by the filter. Alternatively, the radiation source units 835A can include a radiation source without any filter, to provide radiation having the radiation spectrum determined by the radiation source.

The illumination source 830 can be controlled to generate multiple illumination patterns. For example, a set of multiple illumination patterns can be illumination patterns each having radiation from one radiation source unit. For illumination source having k radiation source units, a first illumination pattern 831A can include one radiation source unit at a first location. A second illumination pattern 831B can include one radiation source unit at a second location. A k illumination pattern 831C can include one radiation source unit at a k location.

Another set of multiple illumination patterns can be illumination patterns each having radiation from two or more radiation source units. For example, radiation from different two radiation source units can form illumination patterns 832. Radiation from different three radiation source units can form illumination patterns 833. Radiation from different k radiation source units can form illumination patterns 834.

Figure 9A:
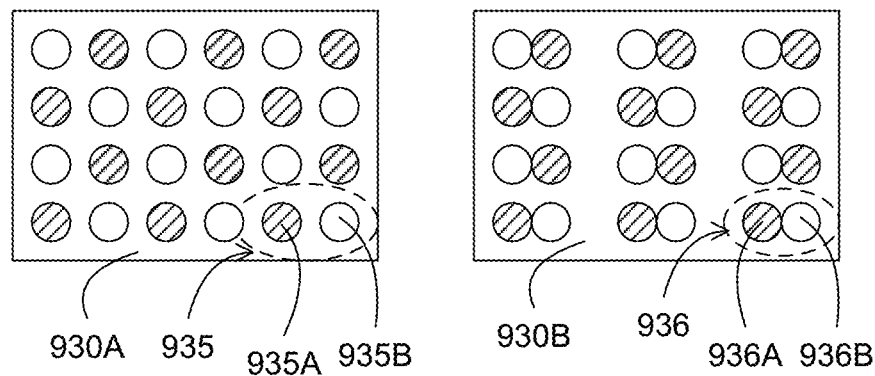
FIGS. 9A-9B illustrate illumination sources according to some embodiments.
Figure 9B:
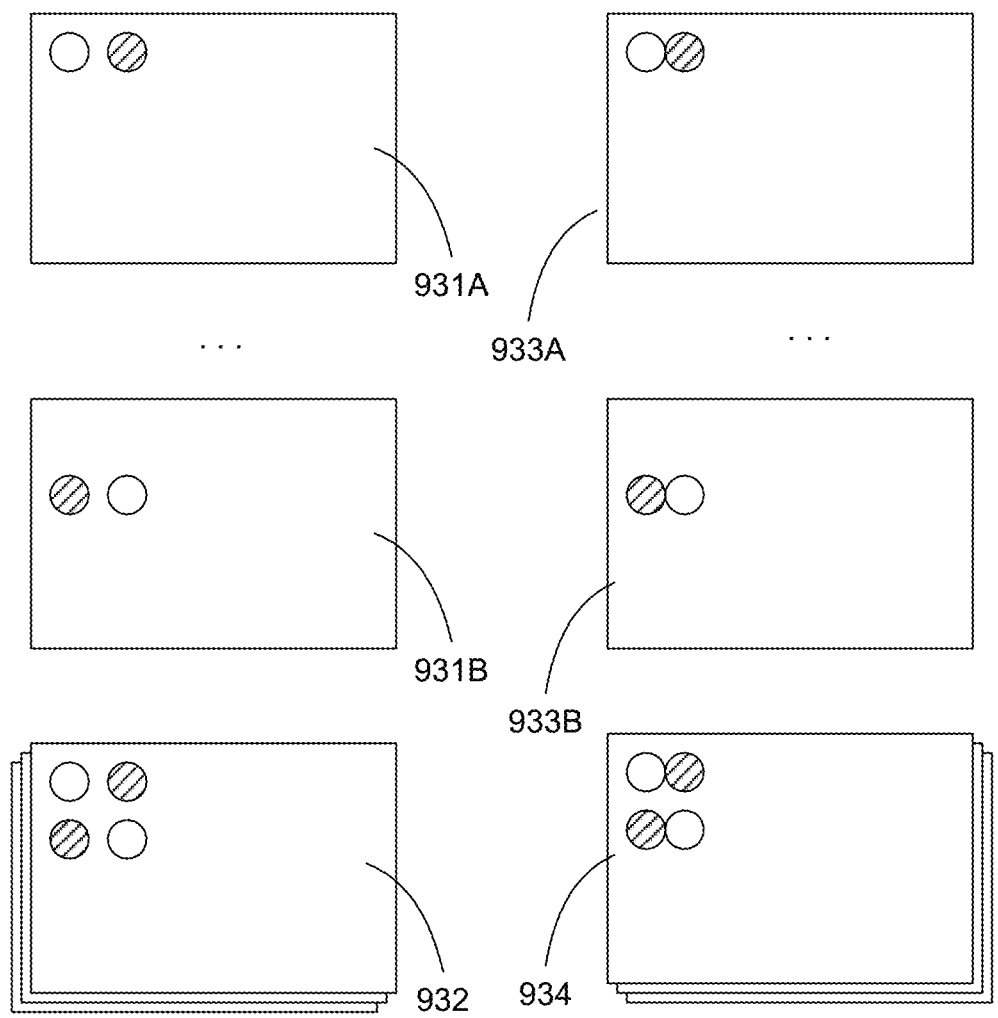

FIGS. 9A-9B illustrate illumination sources according to some embodiments. In FIG. 9A, an illumination source 930A can include multiple radiation source units evenly distributed. The illumination source 930A can include multiple groups 935 of radiation source units with each group having 2 radiation source units 935A and 935B. An illumination source 930B can include multiple radiation source units forming clusters. The illumination source 930B can include multiple groups 936 of radiation source units with each group having 2 radiation source units 936A and 936B clustered together.

The illumination source 930A or 930B can be disposed under the sample of the microscope, which can provide transmissive light to the sample. The illumination source 930A or 930B can be disposed on top of the sample, with form factor modification to accommodate the camera array.

As shown, a group 935 or 936 includes 2 different radiation source units 935A and 935B or 936A and 936B, respectively. For example, the radiation source unit 935A can be an unfiltered radiation source unit, and the radiation source unit 935B can be a filtered radiation source unit. There can be other configurations for the group of radiation source units, such as the group of radiation source units having 2 different filtered radiation source units.

The unfiltered radiation source unit can include a radiation source without any filter, and can be configured to generate radiation with the spectrum of the radiation source. The filtered radiation source unit can include a radiation source with a type of fluorescence excitation filter, and thus can be configured to generate radiation with the wavelength or frequency spectrum determined by the type of the fluorescence filter. Different filtered radiation source units can include radiation source units with different types of fluorescence excitation filter, e.g., fluorescence excitation filters having different wavelength or frequency spectrums.

FIG. 9B shows different illumination patterns generated by the illumination source 930A or 930B. There can be multiple illumination patterns with each pattern including radiation from a group of radiation source units, such as illumination patterns 931A to 931B for illumination source 930A, or 933A to 933B for illumination source 930B. There can be multiple illumination patterns with each pattern including radiation from two groups of radiation source units, such as illumination patterns 932 for illumination source 930A, or 934 for illumination source 930B.

FIGS. 10A-10C illustrate illumination sources according to some embodiments. An illumination source can have different arrangements of the radiation source units, such as evenly distributed or clustering together. A group of radiation source units in an illumination source can include one or more different radiation source units, such as 1, 2, 3, or 4 radiation source units.

FIG. 10A(a) and FIG. 10A(b) show 2 different configurations for an illumination source with each group of radiation source units having 2 different radiation source units, such as an unfiltered radiation source unit and a filtered radiation source unit, or two different filtered radiation source units.

FIG. 10B(a)-FIG. 10B(d) show 4 different configurations for an illumination source with each group of radiation source units having 3 different radiation source units, such as an unfiltered radiation source unit and two different filtered radiation source units, or three different filtered radiation source units.

FIG. 10C(a)-FIG. 10C(b) show 2 different configurations for an illumination source with each group of radiation source units having 4 different radiation source units, such as an unfiltered radiation source unit and three different filtered radiation source units, or four different filtered radiation source units.

FIGS. 11A-11C illustrate flow charts for generating illumination patterns according to some embodiments. In FIG. 11A, operation 1100 generates multiple illumination patterns in sequence, with each pattern including radiation from one or more radiation source units. The radiation source units are configured either to generate a fluorescence excitation on a sample or to illuminate the sample.

In FIG. 11B, operation 1120 generates multiple illumination patterns in sequence, with each pattern including radiation from one or more radiation source units. Each radiation source unit is configured either to generate different fluorescence excitation on a sample or to illuminate the sample.

In FIG. 11C, operation 1140 generates multiple illumination patterns in sequence. A first group of patterns can include radiation from one or more first radiation source units. Each first radiation source unit is configured either to generate a same first fluorescence excitation on a sample or to illuminate the sample. A second group of patterns can include radiation from one or more second radiation source units. Each second radiation source unit is configured either to generate a same second fluorescence excitation different from the first fluorescence excitation or to illuminate the sample.

Camera Array

FIGS. 12A-12D illustrate camera arrangements according to some embodiments. The camera units are all of the same type, e.g., either all are camera units without filter or camera units with a same type of emission filter. The camera units are arranged with an overlapped field of view, for example, for stitching or for fusing adjacent images. In general, a stitching process can require a small amount of overlap as compared to a fusing process. For example, a stitching overlap can be less than 50% overlap, such as 20-30% overlap, in order to find common features in the overlapped areas for joining the adjacent images. A fusing overlap can be more than 50% overlap, such as between 50 and 70% overlap, in order to ensure the process of finding solutions for the waves from the radiation sources reaching the cameras. A smaller overlap, e.g., less than 50%, such as 30-50%, can also enable the fusing process, but with more computational resources. Too small an overlap, e.g., less than 10%, can run the risk of not finding solutions for the fusing process.

In some embodiments, the camera units can have non overlapped field of views, for example, to observe individual areas of a sample, For example, a sample can include an array of wells of a microplate. Each well is different from other wells, such as having a different type of sample, or a different condition such as a different concentration. The array of wells can provide a trend or effect. Each camera unit can be configured to look at a separate well and does not need to overlap because the goal is not stitching. If overlap is not required, the sample can be moved closer to the camera units to obtain higher resolution and better fluorescence sensitivity.

Figure 12A:
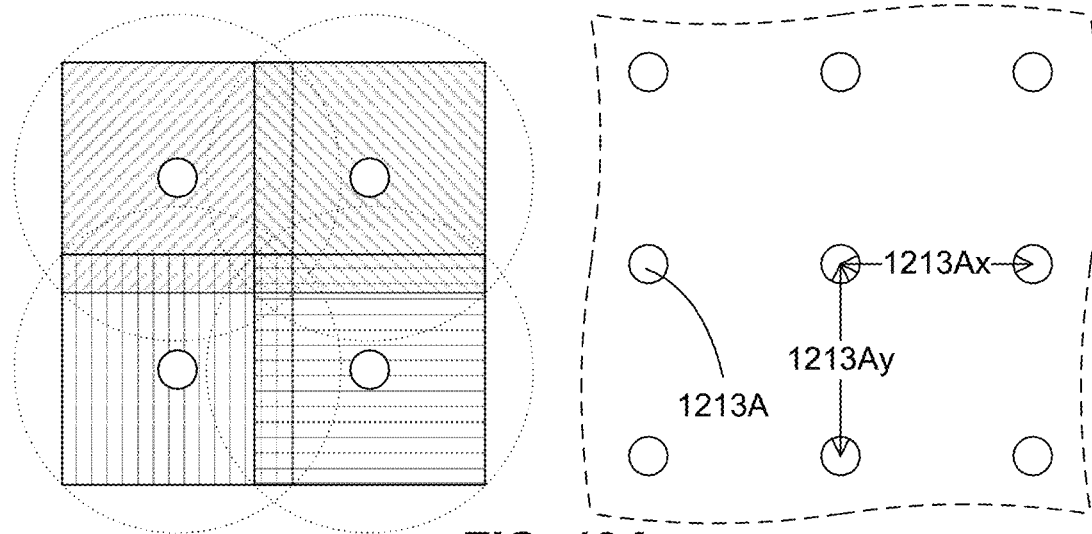

In FIG. 12A, a camera array can include multiple camera units 1213A. The camera units can be disposed in a square pattern, e.g., with the separation 1213Ax in one direction, such as the x direction, similar or the same as the separation 1213Ay in another direction, such as the y direction. The separations 1213Ax and 1213Ay are configured to provide a small overlapped field of view of two adjacent camera units, e.g., less than 50%, such as 20%, for stitching. The overlap amount of less than 20% can be adequate for stitching, but not optimum for fusing.

Figure 12B:
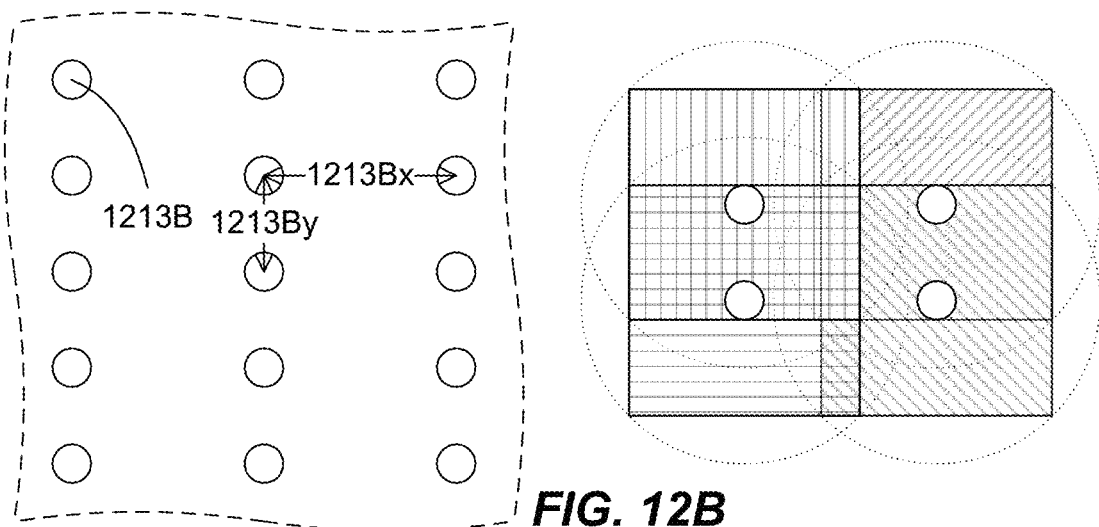

In FIG. 12B, a camera array can include multiple camera units 1213B. The camera units can be disposed in a rectangular pattern, e.g., with the separation 1213Bx in one direction, such as the x direction, being about twice the separation 1213By in another direction, such as the y direction. The separation 1213Bx is configured to provide a small overlapped field of view of two adjacent camera units, e.g., less than 50%, such as 20%, for stitching. The separation 1213By is configured to provide a larger overlapped field of view of two adjacent camera units, e.g., more than 50%, such as 60%, for fusing. The camera configuration can be suitable for fusing in the y direction, with a small separation distance 1213By. The small separation 1213By can assist the fusing process in the x direction, where the separation 1213Bx is large. The fusing algorithm can be configured to account for the difference in separations, e.g., overlapped field of views, in two different directions.

Figure 12C:
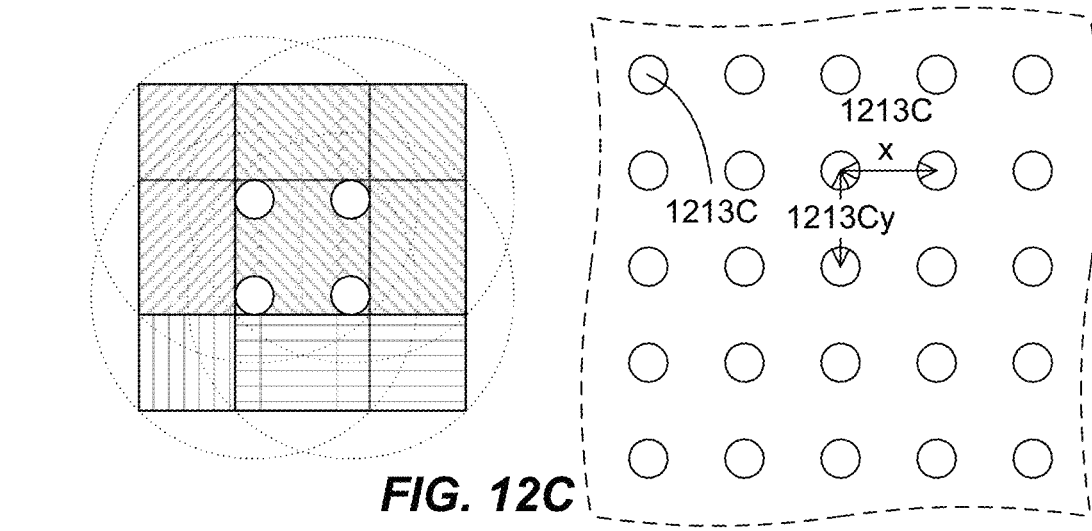

In FIG. 12C, a camera array can include multiple camera units 1213C. The camera units can be disposed in a square pattern, e.g., with the separation 1213Cx in one direction, such as the x direction, being similar or the same as the separation 1213Cy in another direction, such as the y direction. The separations 1213Cx and 1213Cy are configured to provide a large overlapped field of view of two adjacent camera units, e.g., greater than 50%, such as 60%, for fusing. The camera configuration can be suitable for fusing in both x and y directions, with small separation distances 1213Cx and 1213Cy. The fusing algorithm can be simplified by the similarity in the separations, e.g., overlapped field of views, in two different directions.

In FIG. 12D, a camera array can include multiple camera units 1213D. The camera units can be disposed in a square pattern, e.g., with the separation 1213Dx in one direction, such as the x direction, which can be similar or different as the separation 1213Dy in another direction, such as the y direction. The separations 1213Dx and 1213Dy are configured to be non overlapped, e.g., there is no overlapped field of view of two adjacent camera units.

FIGS. 13A-13D illustrate flow charts for forming camera arrangements according to some embodiments. In FIG. 13A, operation 1300 forms a camera array, with 2 adjacent cameras in the camera array in 2 directions having an overlapped field of view. The overlapped field of view is configured for stitching images captured by the 2 adjacent cameras.

In FIG. 13B, operation 1320 forms a camera array, with 2 adjacent first cameras in the camera array in a first direction having a first overlapped field of view. The first overlapped field of view is configured for stitching images captured by the 2 adjacent first cameras.

The camera array also includes 2 adjacent second cameras in the camera array in a second direction having a second overlapped field of view. The second overlapped field of view is configured for fusing images captured by the 2 adjacent second cameras. The fused images comprise better resolution than individual images used for fusing.

In FIG. 13C, operation 1340 forms a camera array, with 2 adjacent cameras in the camera array in 2 directions having an overlapped field of view. The overlapped field of view is configured for fusing images captured by the 2 adjacent cameras. The fused images comprise better resolution than the individual images without fusing.

In FIG. 13D, operation 1360 forms a camera array, with 2 adjacent cameras in the camera array in 2 directions having a non-overlapped field of view. The non overlapped field of view can be configured for better resolution and better fluorescence sensitivity from each camera unit.

Figures 14A, 14B:
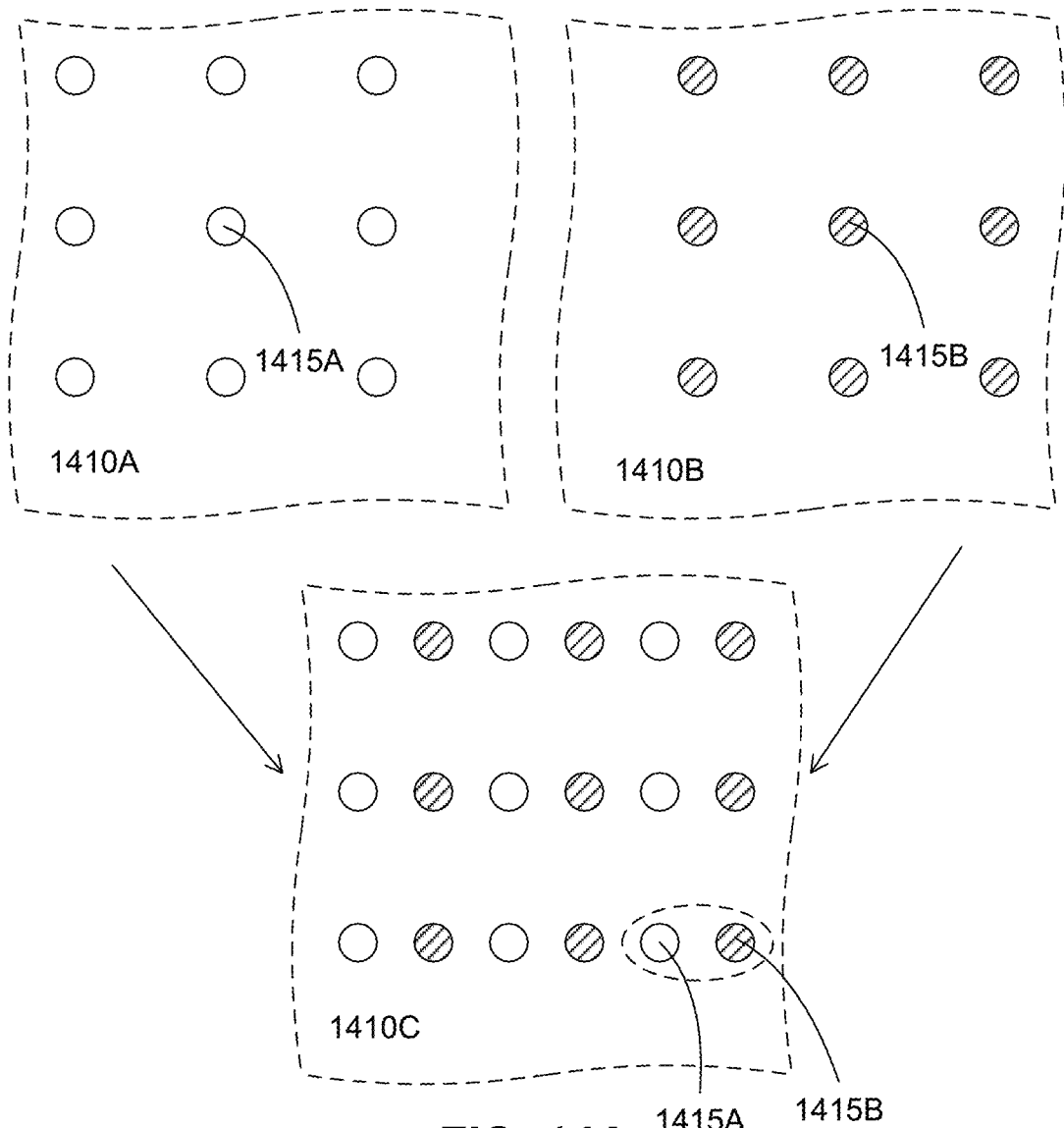
FIGS. 14A-14B illustrate a camera arrangement according to some embodiments.

FIGS. 14A-14B illustrate a camera arrangement according to some embodiments. In FIG. 14A, a camera array 1410C can include multiple groups of camera units, with each group of camera units having two camera units of two different types.

A group of camera units can include two filtered camera units with different types of emission filter, e.g., a first camera unit 1415A having a first type of emission filter and a second camera unit 1415B having a second type of emission filter. Alternatively, a group of camera units can include a filtered camera unit and an unfiltered camera unit, e.g., a first camera unit 1415A having a first type of emission filter and a second camera unit 1415B having no filter.

Thus, the camera array 1410C can be partitioned into two sub camera arrays, with a first sub camera array 1410A including multiple first camera units 1415A and the second sub camera array 1410B including multiple second camera units 1415B. Camera units 1415A or 1415B in each sub camera array 1410A or 1410B, respectively, are arranged with an overlapped field of view, for example, for stitching or for fusing adjacent images. As shown, the camera units in the sub camera arrays are arranged with a stitchable overlapped field of view, e.g., having less than 50% overlap, such as 20-40% overlap. The stitchable overlapped field of views of the sub camera arrays can allow the images captured by each sub camera array to be stitchable to form an assembled or complete image of the sample.

The joining of the sub camera arrays 1410A and 1410B can be along a direction of the camera units in a sub camera array, e.g., placing camera units of a second camera array between two adjacent camera units of the first sub camera array, such as in x direction. The camera array 1410C thus can have a rectangular configuration, with a camera unit at each vertex of a rectangle.

FIG. 14B shows a process to form a camera array from two sub camera array having stitchable camera units. Operation 1400 forms a camera array. The camera array can include 2 sets of cameras, with 2 adjacent cameras in each set of cameras in 2 directions having a stitchable overlapped field of view.

Figures 15A, 15B:
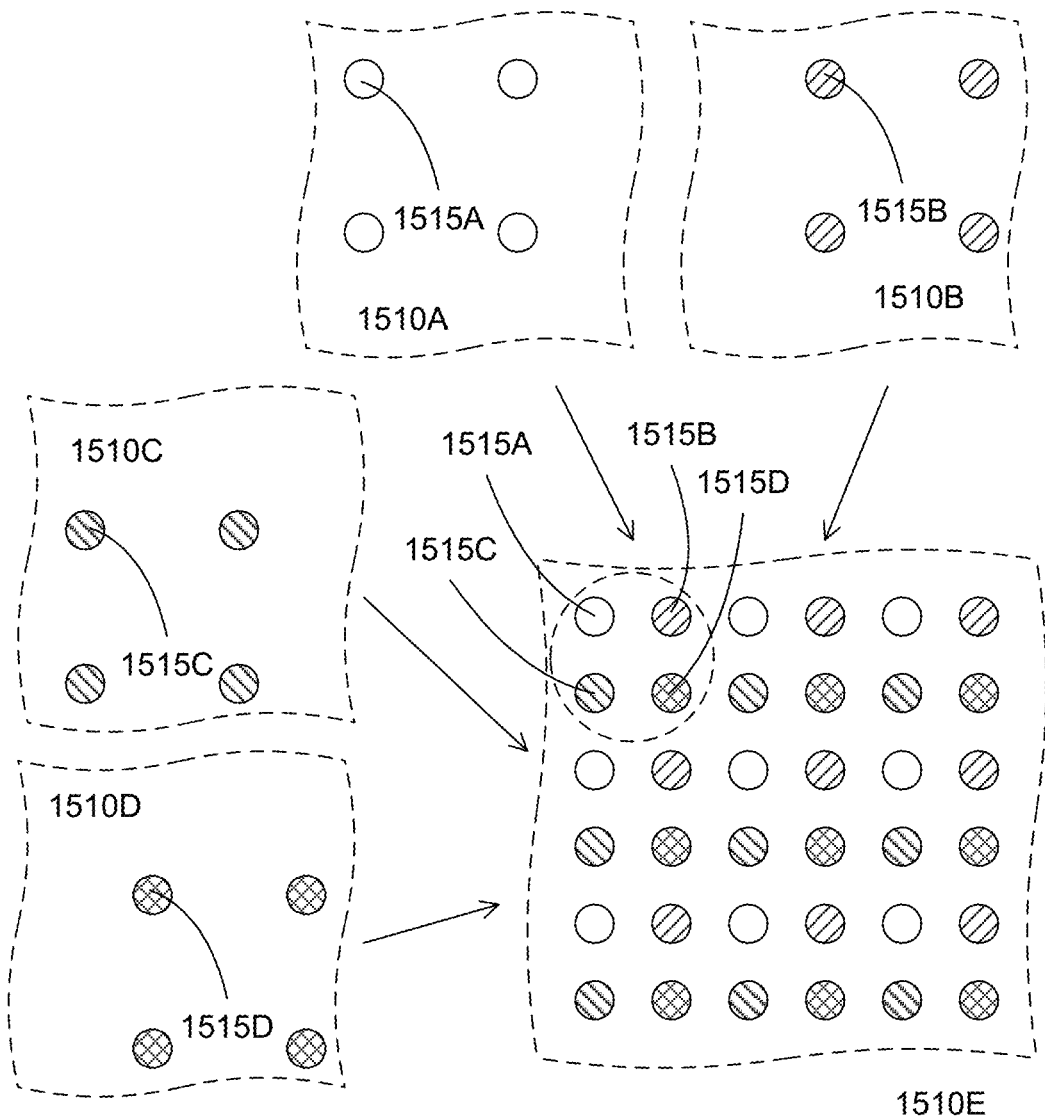
FIGS. 15A-15B illustrate a camera arrangement according to some embodiments.

FIGS. 15A-15B illustrate a camera arrangement according to some embodiments. In FIG. 15A, a camera array 1510E can include multiple groups of camera units, with each group of camera units having two camera units of two different types.

A group of camera units can include 4 filtered camera units with different types of emission filter, e.g., a first camera unit 1515A having a first type of emission filter, a second camera unit 1515B having a second type of emission filter, a third camera unit 1515C having a third type of emission filter, and a fourth camera unit 1515D having a fourth type of emission filter. Alternatively, a group of camera units can include 3 filtered camera unit and an unfiltered camera unit, e.g., a first camera unit 1515A having a first type of emission filter, a second camera unit 1515B having a second type of emission filter, a third camera unit 1515C having a third type of emission filter, and a fourth camera unit 1515D having no filter.

Thus, the camera array 1510E can be partitioned into 4 sub camera arrays, with a first sub camera array 1510A including multiple first camera units 1515A, a second sub camera array 1510B including multiple second camera units 1515B, a third sub camera array 1510C including multiple third camera units 1515C, and a fourth sub camera array 1510D including multiple fourth camera units 1515D. Camera units 1515A or 1515B or 1515C or 1515D in each sub camera array 1510A or 1510B or 1510C or 1510D, respectively, are arranged with an overlapped field of view, for example, for stitching or for fusing adjacent images. As shown, the camera units in the sub camera arrays are arranged with a stitchable overlapped field of view, e.g., having less than 50% overlap, such as 20-40% overlap. The stitchable overlapped field of views of the sub camera arrays can allow the images captured by each sub camera array to be stitchable to form an assembled or complete image of the sample.

The joining of the sub camera arrays 1510A, 1510B, 1510C, and 1510D can be along two directions of the camera units in a sub camera array, e.g., placing camera units of the second, third, and fourth sub camera arrays between two adjacent camera units and at center of 4 camera units of the first sub camera array. The camera array 1510D thus can have a square configuration, with the distance between 2 adjacent cameras being half of the original square configuration.

FIG. 15B shows a process to form a camera array from two sub camera array having stitchable camera units. Operation 1500 forms a camera array. The camera array can include 2 sets of cameras, with 2 adjacent cameras in each set of cameras in 2 directions having a stitchable overlapped field of view.

FIGS. 16A-16C illustrate a camera arrangement according to some embodiments. In FIG. 16A, a camera array 1610C can include multiple groups of camera units, with each group of camera units having two camera units of two different types.

A group of camera units can include two filtered camera units with different types of emission filter, e.g., a first camera unit 1615A having a first type of emission filter and a second camera unit 1615B having a second type of emission filter. Alternatively, a group of camera units can include a filtered camera unit and an unfiltered camera unit, e.g., a first camera unit 1615A having a first type of emission filter and a second camera unit 1615B having no filter.

Thus, the camera array 1610C can be partitioned into two sub camera arrays, with a first sub camera array 1610A including multiple first camera units 1615A and the second sub camera array 1610B including multiple second camera units 1615B. Camera units 1615A or 1615B in each sub camera array 1610A or 1610B, respectively, are arranged with an overlapped field of view, for example, for stitching or for fusing adjacent images. As shown, the camera units in the sub camera arrays are arranged with a fusable overlapped field of view, e.g., having greater than 50% overlap, such as 50-70% overlap. The fusable overlapped field of views of the sub camera arrays can allow the images captured by each sub camera array to be fused to form an image reconstruction of the sample with higher resolution due to the inclusion of light phase in addition to light intensity.

The joining of the sub camera arrays 1610A and 1610B can be at a center of the camera units in a sub camera array, e.g., placing camera units of a second sub camera array at the center of 4 camera units forming a square of the first sub camera array. The camera array 1610C thus can have a 45 degree tilted square configuration.

In FIG. 16B, the camera array 1610 can be rotated 45 degrees to form a square camera array 1610D.

FIG. 16C shows a process to form a camera array from two sub camera array having fusable camera units. Operation 1600 forms a camera array. The camera array can include 2 sets of cameras, with 2 adjacent cameras in each set of cameras in 2 directions having a fusable overlapped field of view or a non overlapped field of view.

Figures 17A, 17B:
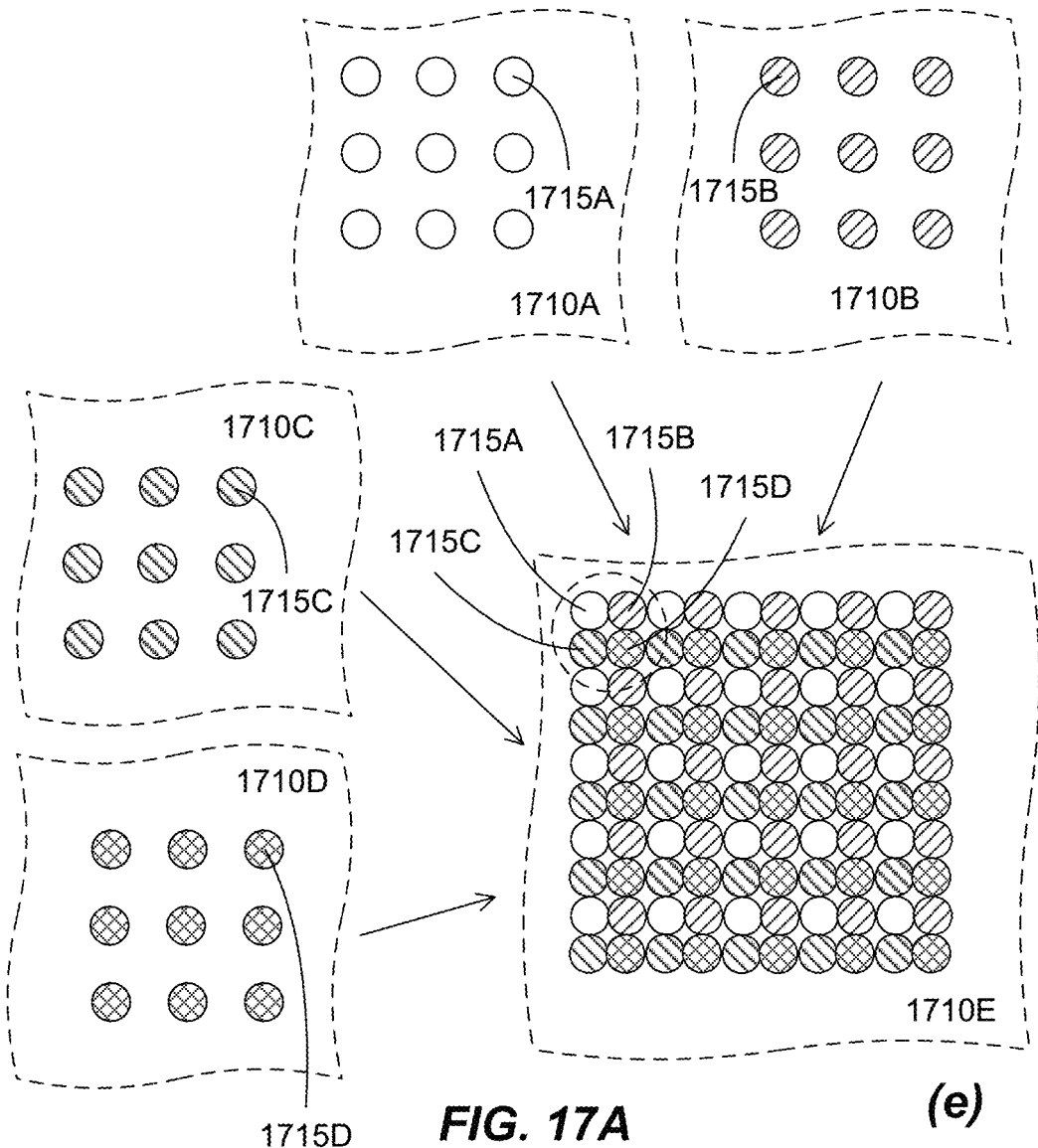
FIGS. 17A-17B illustrate a camera arrangement according to some embodiments.

FIGS. 17A-17B illustrate a camera arrangement according to some embodiments. In FIG. 17A, a camera array 1710E can include multiple groups of camera units, with each group of camera units having two camera units of two different types.

A group of camera units can include 4 filtered camera units with different types of emission filter, e.g., a first camera unit 1715A having a first type of emission filter, a second camera unit 1715B having a second type of emission filter, a third camera unit 1715C having a third type of emission filter, and a fourth camera unit 1715D having a fourth type of emission filter. Alternatively, a group of camera units can include 3 filtered camera unit and an unfiltered camera unit, e.g., a first camera unit 1715A having a first type of emission filter, a second camera unit 1715B having a second type of emission filter, a third camera unit 1715C having a third type of emission filter, and a fourth camera unit 1715D having no filter.

Thus, the camera array 1710E can be partitioned into 4 sub camera arrays, with a first sub camera array 1710A including multiple first camera units 1715A, a second sub camera array 1710B including multiple second camera units 1715B, a third sub camera array 1710C including multiple third camera units 1715C, and a fourth sub camera array 1710D including multiple fourth camera units 1715D. Camera units 1715A or 1715B or 1715C or 1715D in each sub camera array 1710A or 1710B or 1710C or 1710D, respectively, are arranged with an overlapped field of view, for example, for stitching or for fusing adjacent images. As shown, the camera units in the sub camera arrays are arranged with a fusable overlapped field of view, e.g., having greater than 50% overlap, such as 50-70% overlap. The fusable overlapped field of views of the sub camera arrays can allow the images captured by each sub camera array to be fused to form an image reconstruction of the sample with better resolution.

The joining of the sub camera arrays 1710A, 1710B, 1710C, and 1710D can be along two directions of the camera units in a sub camera array, e.g., placing camera units of the second, third, and fourth sub camera arrays between two adjacent camera units and at center of 4 camera units of the first sub camera array. The camera array 1710D thus can have a square configuration, with the distance between 2 adjacent cameras being half of the original square configuration.

FIG. 17B shows a process to form a camera array from two sub camera array having fusable camera units. Operation 1700 forms a camera array. The camera array can include 2 sets of cameras, with 2 adjacent cameras in each set of cameras in 2 directions having a fusable overlapped field of view.

Figures 18A, 18B:
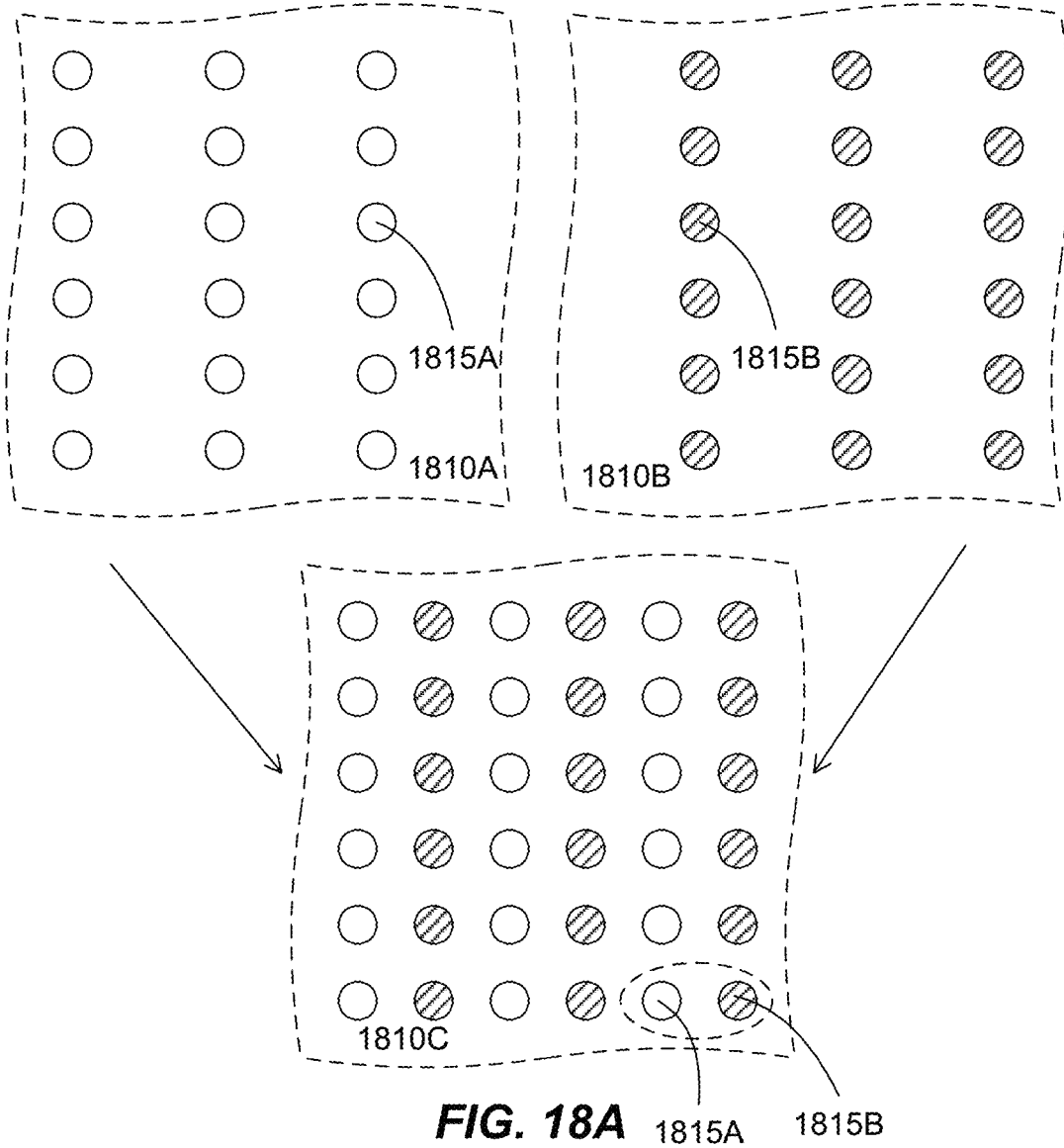
FIGS. 18A-18B illustrate a camera arrangement according to some embodiments.

FIGS. 18A-18B illustrate a camera arrangement according to some embodiments. In FIG. 18A, a camera array 1810C can include multiple groups of camera units, with each group of camera units having two camera units of two different types.

A group of camera units can include two filtered camera units with different types of emission filter, e.g., a first camera unit 1815A having a first type of emission filter and a second camera unit 1815B having a second type of emission filter. Alternatively, a group of camera units can include a filtered camera unit and an unfiltered camera unit, e.g., a first camera unit 1815A having a first type of emission filter and a second camera unit 1815B having no filter.

Thus, the camera array 1810C can be partitioned into two sub camera arrays, with a first sub camera array 1810A including multiple first camera units 1815A and the second sub camera array 1810B including multiple second camera units 1815B. Camera units 1815A or 1815B in each sub camera array 1810A or 1810B, respectively, are arranged with an overlapped field of view, for example, for stitching or for fusing adjacent images. As shown, the camera units in the sub camera arrays are arranged with a stitchable overlapped field of view, e.g., having less than 50% overlap, such as 20-40% overlap in one direction, such as the x direction. The stitchable overlapped field of views of the sub camera arrays can allow the images captured by each sub camera array to be stitchable to form an assembled or complete image of the sample in the x direction. The camera units in the sub camera arrays are arranged with a fusable overlapped field of view, e.g., having greater than 50% overlap, such as 50-70% overlap in another direction, such as the y direction. The fusable overlapped field of views of the sub camera arrays can allow the images captured by each sub camera array to be fused to form an image reconstruction of the sample in the y direction, or can be extended to both x and y directions.

The joining of the sub camera arrays 1810A and 1810B can be along a direction of the camera units in a sub camera array, e.g., placing camera units of a second sub camera array between two adjacent camera units of the first sub camera array, such as in x direction. The camera array 1810C thus can have a square configuration, with a camera unit at each vertex of a square.

FIG. 18B shows a process to form a camera array from two sub camera array having stitchable and fusable camera units in two different directions. Operation 1800 forms a camera array. The camera array can include 2 sets of cameras. Two adjacent cameras in each set of cameras in a first direction can have a stitchable overlapped field of view. Two adjacent cameras in each set of cameras in a second direction can have a fusable overlapped field of view.

FIGS. 19A-19B illustrate a camera arrangement according to some embodiments. The camera units are all camera units without filter. The camera units are arranged with an overlapped field of view, for example, for stitching or for fusing adjacent images.

In FIG. 19A, a camera array can include multiple camera units 1915A and 1915B. The camera units can be disposed in a square pattern, e.g., with the separation in one direction, such as the x direction, being similar or the same as the separation in another direction, such as the y direction. The separations are configured to provide a large overlapped field of view of two adjacent camera units, e.g., greater than 50%, such as 60%, for fusing. The camera configuration can be suitable for fusing in both x and y directions.

A set of two types of emission filter can be disposed the camera units, turning the unfiltered camera units into filtered camera units. The set of filter can include columns of a first type of emission filter 1935A and a second type of emission filter 1935B. Thus, the filters can convert the unfiltered camera array into a camera array having multiple columns of two types of camera units.

The illumination source can be configured to provide corresponding types of fluorescence excitation, such as through another set of two types of fluorescence excitation filter.

Images captured by the camera array having the set of two types of emission filter and the set of two types of fluorescence excitation filter can have a stitchable overlap in a row direction, e.g., the direction having alternate types of emission filter due to the large separation between 2 adjacent camera units along the row direction. The images captured by the camera array can have a fusable overlap in a column direction, e.g., the direction having a same type of emission filter due to the small separation between 2 adjacent camera units along the column direction.

In some embodiments, the set of two types of emission filter can be shifted along the row direction, which can swap the camera units, e.g., the camera units having the first type of emission filter now become the camera units having the second type of emission filter, and vice versa. Another set of images capture by the camera array under the shifted filters can have similar stitchable and fusable characteristics as under the unshifted filter. By combining the shifted and unshifted images, the images are fusable, since now the overlapping field of views in both x and y directions are small enough to permit reliable fusing.

In some embodiments, the two types of emission filter can be two different types of emission filter, e.g., the camera units become two different filtered camera units. Alternatively, the two types of emission filter can be one type of emission filter, e.g., the camera units become filtered camera units and unfiltered camera units. The shifting process can be similar, e.g., shifting the one type of emission filters to swap the camera units between filtered and unfiltered camera units.

The set of fluorescence filter can be shifted or can be stationary.

In FIG. 19B, operation 1900 forms a camera array, with 2 adjacent cameras in 2 directions having a fusable overlapped field of view. A filter can be disposed on the camera array. The filter is configured to change a capture characteristic of a row or column of cameras by shifting in the column or row direction, respectively.

Figures 20A, 20B:
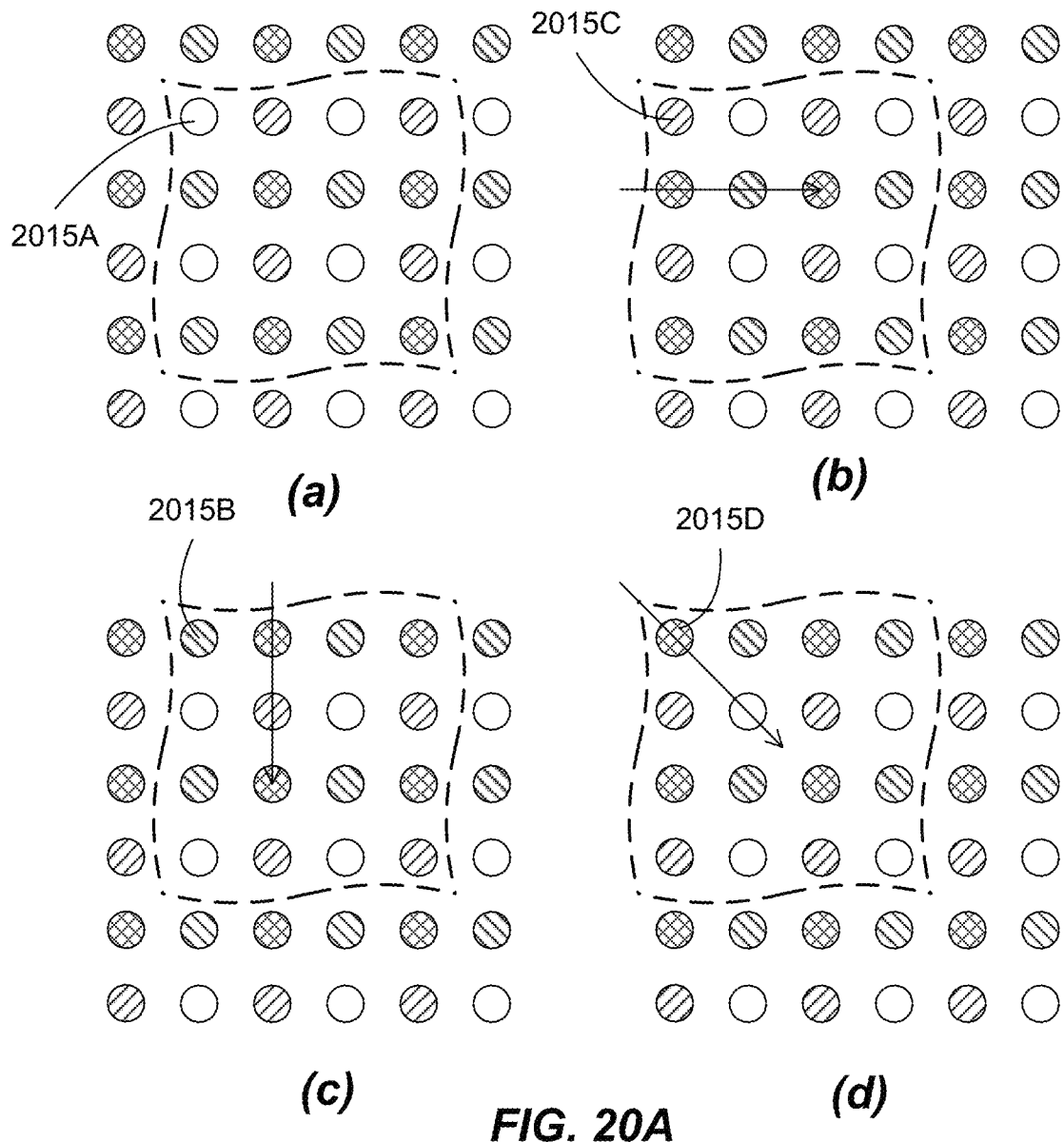
FIGS. 20A-20B illustrate a camera arrangement according to some embodiments.

FIGS. 20A-20B illustrate a camera arrangement according to some embodiments. The camera units are all camera units without filter. The camera units are arranged with an overlapped field of view, for example, for stitching or for fusing adjacent images.

In FIG. 20A, a camera array can include multiple camera units 2015A, 2015B, 2015C, and 2015D. The camera units can be disposed in a square pattern, e.g., with the separation in one direction, such as the x direction, being similar or the same as the separation in another direction, such as the y direction. The separations are configured to provide a large overlapped field of view of two adjacent camera units, e.g., greater than 50%, such as 60%, for fusing. The camera configuration can be suitable for fusing in both x and y directions.

A set of 4 types of emission filters can be disposed with the camera units, turning the unfiltered camera units into the filtered camera units. The set of filters can include a checkerboard pattern for the 4 types of emission filter. Thus, the filters can convert the unfiltered camera array into a camera array having multiple groups of 4 types of camera units disposed in a regular array.

The illumination source can be configured to provide corresponding types of fluorescence excitation, such as through another set of 4 types of fluorescence excitation filter.

Images captured by the camera array having the set of two types of emission filter and the set of two types of fluorescence excitation filter can have a stitchable overlap in row and column directions.

In some embodiments, the set of 4 types of emission filter can be shifted in 3 directions, such as along the row direction, along the column direction, and along a cross direction, which can swap the camera units, e.g., the camera units having the first type of emission filter sequentially become the camera units having the second, third, and fourth type of emission filter. Three other set of images capture by the camera array under the shifted filters can have similar stitchable characteristics as under the unshifted filter. By combining the shifted and unshifted images, the images are fusable, since now the overlapping field of views in both x and y directions are small enough to permit reliable fusing.

The set of fluorescence filter can be shifted or can be stationary.

In some embodiments, the 4 types of emission filter can be 4 different types of emission filter, e.g., the camera units become 4 different filtered camera units. Alternatively, the 4 types of emission filter can be 3 type of emission filter, e.g., the camera units become 3 types of filtered camera units and unfiltered camera units. The shifting process can be similar, e.g., shifting the emission filters to swap the camera units between filtered and unfiltered camera units.

In FIG. 20B, operation 2000 forms a camera array, with 2 adjacent cameras in 2 directions having a fusable overlapped field of view. A filter can be disposed on the camera array. The filter is configured to change a capture characteristic of a set of cameras by shifting in 3 directions.

Multi-Channel Fluorescence Microscope System

In some embodiments, the present invention discloses a computational fluorescence microscope system for capturing one type of fluorescence signal, which is emitted from a sample under the fluorescence excitation of a corresponding radiation.

Figure 21A:
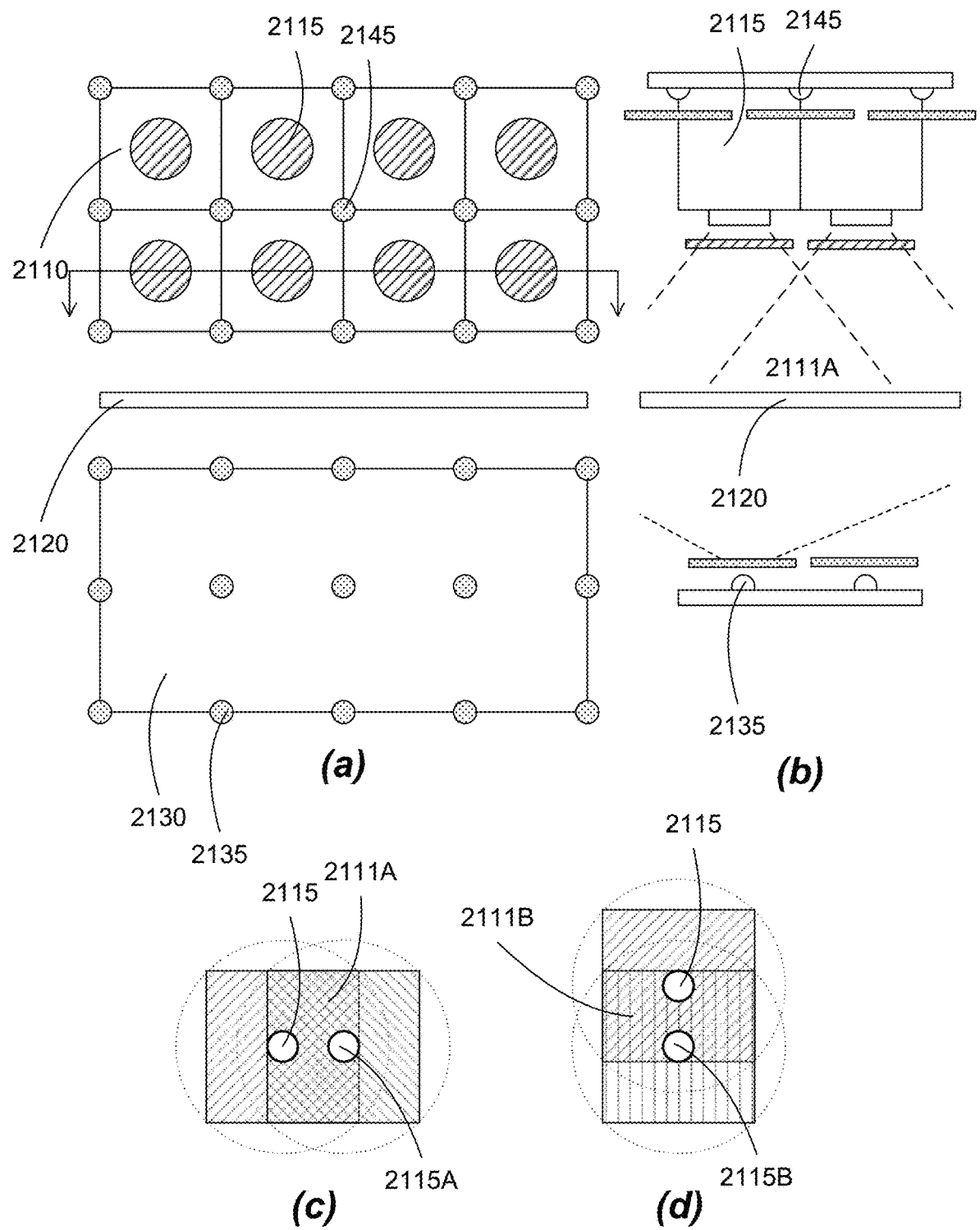
FIGS. 21A-21C illustrate a configuration for a computational fluorescence microscope system according to some embodiments.
Figure 21B:
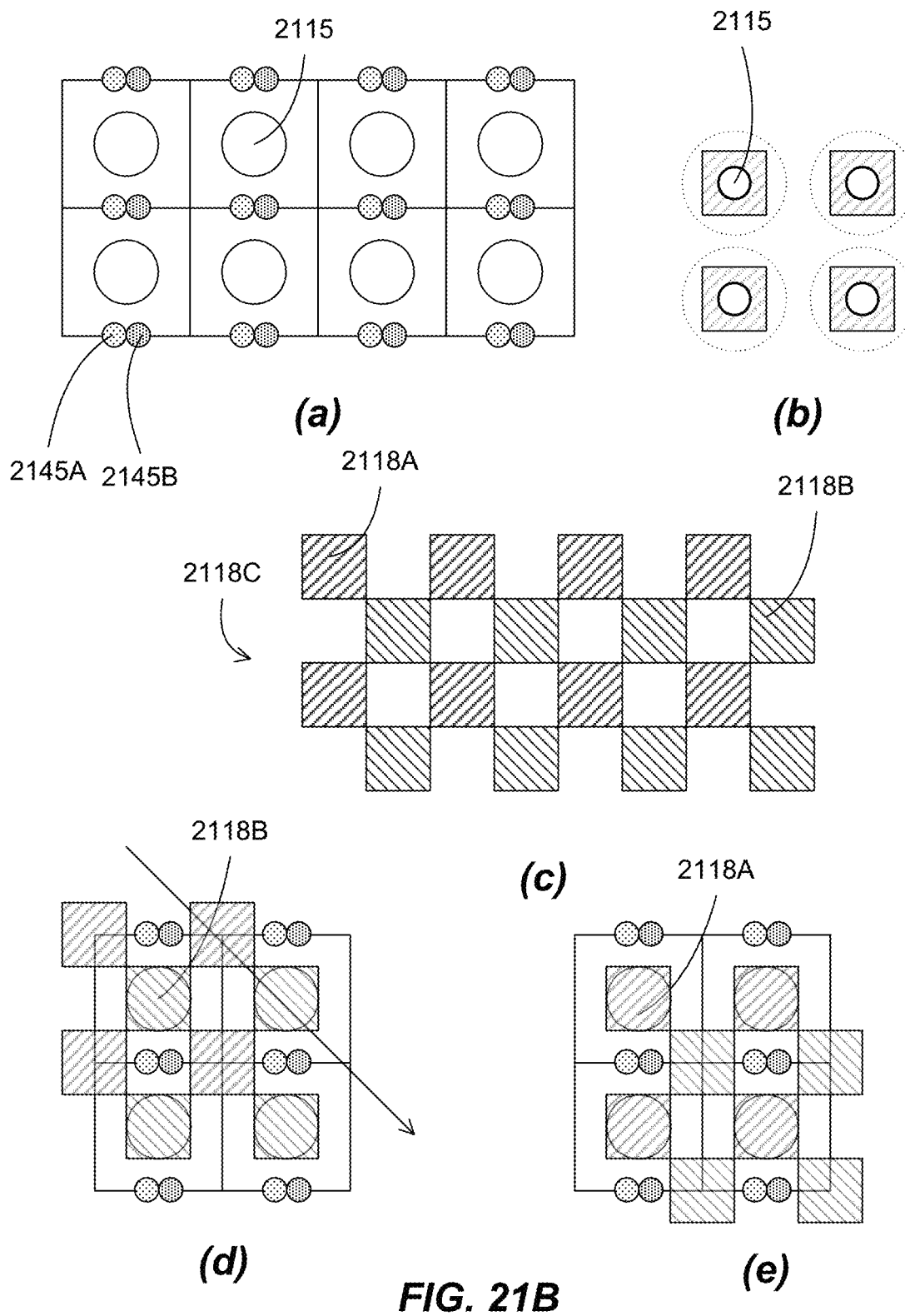
Figure 21C:
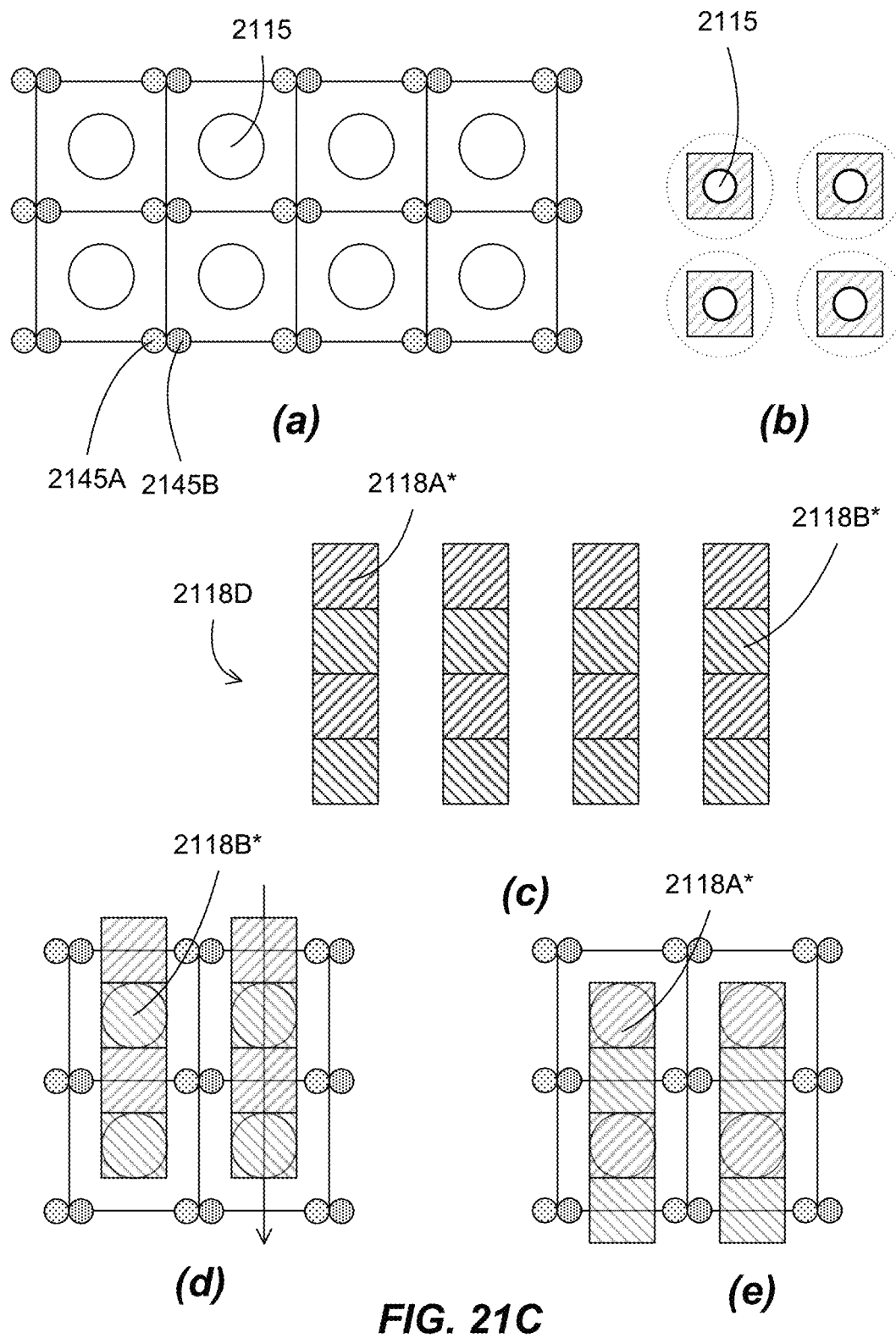

FIGS. 21A-21C illustrate a configuration for a computational fluorescence microscope system according to some embodiments. FIGS. 21A(a)-21A(b) show component views of a computational fluorescence microscope system and FIGS. 21A(c)-21A(d) show detail views of the overlap of adjacent camera units.

A computational fluorescence microscope system can have an illumination source 2130 and 2140 and a camera array 2110 for capturing images of a sample 2120 or a portion of the sample. A controller can be used to control the illumination system to provide different fluorescence excitation illumination patterns to the sample.

The computational fluorescence microscope system can be configured with one type of emission filter for the camera units, resulting in one type of camera units, e.g., camera units capable of capturing fluorescence signals passing through the type of emission filter. The computational fluorescence microscope system can be configured with one type of corresponding fluorescence excitation filter for the radiation source units of the illumination source, resulting in one type of radiation source units, e.g., radiation source units capable of irradiating radiation in a wavelength range design to perform fluorescence excitation on the sample. The fluorescence excitation filter and the emission filter are related to each other, e.g., the wavelength range of the fluorescence excitation filter is designed to pass radiation that perform fluorescence excitation on the sample, with the fluorescence excitation causing the sample to emit fluorescence signals that can pass through the emission filter to be captured by the camera units. Thus, the wavelength range of the emission filter corresponds to the emitted fluorescence signals.

The illumination source can include k groups of radiation source units, with each group having one radiation source unit 2135 as bottom illumination source and 2145 as top illumination source. The radiation units are configured to generate radiation to perform fluorescence excitation on the sample, through a type of fluorescence excitation filter. The radiation source units can include light emitting diodes (LEDs), individual lasers, laser diodes, spatial light modulators or other electronically controllable light emission elements, with fluorescence excitation filters to generate fluorescence excitation radiation.

The camera array can include n groups of camera units, with each group having one camera units 2115 configured to capture images of the fluorescence signals emitted by the sample due to the fluorescence excitation caused by the radiation source units. The camera units can be equipped with a type of emission filter having wavelength range suitable for the fluorescence signal to pass through, e.g., a band pass filter with the principle wavelength of the fluorescence signals at the center of the band pass filter. Further, a camera unit captures only images corresponding to matching radiation source unit, e.g., the emission filter on the camera units is corresponded to the fluorescence excitation filter on the radiation source units.

In some embodiments, each radiation source unit is configured to cover the whole sample. Each camera unit is configured to capture images of a portion of the sample, with overlapping areas 2111 with nearby emission filter camera unit to allow for stitching or fusing. For example, a camera unit 2115A adjacent to camera units 2115 in an x direction can have an overlapped field of view 2111A. A camera unit 2115B adjacent to camera units 2115 in a y direction can have an overlapped field of view 2111B. The overlapped filed of views 2111A and 2111B can be the same or can be different, depending on the configuration of the camera units in the camera array.

In some embodiments, the adjacent camera units can be disposed close to each other to have an overlapped field of view suitable for fusing, e.g., to ensure a solution for the process of calculating the image reconstruction of the sample based on multiple captured images under multiple illumination patterns. The overlapped field of view can be greater than 50%, such as between 50-60%, 50-70%, or 50-80%.

FIGS. 21B(a)-21B(e) show a configuration of a computational fluorescence microscope system. FIG. 21B(a) shows multiple camera units 2115 and an illumination source having radiation source units 2145A and 2145B. The camera units can be non overlapped, or can be overlapped for stitching or for fusing.

FIG. 21B(c) shows a set of filters 2118C, which can have multiple first filters 2118A and multiple second filters 2118B, arranged in an interleaved configuration, e.g., in a checkerboard configuration. FIG. 21B(d) shows a configuration in which the set of filters 2118C covers the camera units so that each camera unit can capture images through the second filters 2118B. A first illumination can be used, and the camera units can capture images, such as images of first fluorescence signal through the filters 2118B. The first fluorescence signal can be excited by radiation source units having corresponding fluorescence excitation filters, such as by radiation source units 2145B, e.g., the first illumination pattern can include radiation generated from radiation source units 2145B.

In FIG. 21B(e), the set of filters is moved, to exchange the second filters 2118B with the first filters 2118A, e.g., the first filters now cover the lenses of the camera units, so that each camera unit can capture images through the first filters 2118A. A second illumination can be used, and the camera units can capture images, such as images of second fluorescence signal through the filters 2118A. The second fluorescence signal can be excited by radiation source units having corresponding fluorescence excitation filters, such as by radiation source units 2145A, e.g., the second illumination pattern can include radiation generated from radiation source units 2145A.

In some embodiments, a combination illumination pattern can be used for both cases, e.g., for the camera units to capture images through filters 2118A and 2118B. The combination illumination pattern can include radiation that can excite the sample to emit both first and second fluorescence signals, e.g., ca combination of first and second illumination patterns. For example, the combination can be generated by radiation source units 2145A and 2145B. With filters 2118A in place, the camera units only capture the second fluorescence signal. Similarly, with filters 2118B in place, the camera units only capture the first fluorescence signal.

FIGS. 21C(a)-21C(e) show another configuration of a computational fluorescence microscope system. FIG. 21C(a) shows multiple camera units 2115 and an illumination source having radiation source units 2145A and 2145B. The camera units can be non overlapped, or can be overlapped for stitching or for fusing.

FIG. 21C(c) shows a set of filters 2118D, which can have multiple first filters 2118A and multiple second filters 2118B, arranged in an interleaved configuration, e.g., in an alternate row configuration, or in any other configuration such as an alternate column configuration. FIG. 21C(d) shows a configuration in which the set of filters 2118D covers the camera units so that each camera unit can capture images through the second filters 2118B.

In FIG. 21C(e), the set of filters is moved, to exchange the second filters 2118B with the first filters 2118A, e.g., the first filters now cover the lenses of the camera units, so that each camera unit can capture images through the first filters 2118A.

FIGS. 22A-22D illustrate flow charts for a computational fluorescence microscope system according to some embodiments. The microscope system is configured to capture images of one type of fluorescence signal.

In FIG. 22A, operation 2200 forms an image system. The image system can include an array of radiation sources and an array of cameras. The radiation sources are configured to generate radiation having wavelengths configured to generate fluorescence excitation on the sample. The cameras are configured to capture the fluorescence signal emitted from the sample due to the fluorescence excitation.

In FIG. 22B, operation 2220 illuminates a sample with a first pattern, with the pattern having radiation having wavelengths configured to generate fluorescence excitation on the sample. A basic component of the computational microscope is the multiple patterns, with each pattern generated by different radiation source units in order to provide different path lengths to the sample. The different path lengths can be used to reconstruct the phase information of the image of the sample, using the image intensity captured by the camera units.

For example, a first pattern can include the radiation provided by a first radiation source unit. Subsequent patterns can include the radiation provided by other radiation source units, with each subsequent pattern including radiation from one radiation source units.

Operation 2221 captures images corresponded to the first pattern. Under the first pattern, all camera units can capture images of the sample, e.g., each camera unit capturing a portion of the sample, with overlap. Thus, under one pattern, a complete image of the sample is captured, with overlap. The complete image includes n image portions, with n being the number of camera units.

Operation 2222 stitches the images into an assembled image. The image portions can be stitched together to form an assembled image of the sample, e.g., a complete image of the sampled formed by stitching the image portions together. The stitching process can be used due to the overlapping area of the image portions. The stitching process can include identifying features in each image portions. By matching the features, the image portions can be stitched together.

Operation 2223 repeats for other patterns with the same excitation wavelengths. The process can be repeated for other patterns. For example, another pattern can include radiation generated from another radiation source unit. The different locations of the radiation source units can be used to calculate phase information for the image reconstruction process.

After k patterns, the system can form k assembled images of the sample, with each assembled image including n image portions, with k being the number of patterns, and n being the number of camera units.

Operation 2224 fuses the assembled images. The assembled images carry the intensities maps of the sample, captured under different radiation pathways. An inverse algorithm, e.g., the fusing algorithm, can be used to calculate the phase information of the captured images based on the multiple assembled images and the position information of the radiation source units. After being processed through the fusing algorithm, the multiple assembled images can generate an image reconstruction of the sample, which can have better resolution due to the phase information.

Operation 2225 computes fluorescence properties from the fused image. The images captured by the camera units are configured for the fluorescence signal, and thus, fluorescence properties of the sample can be determined from the captured images, or from the image reconstruction of the sample.

In FIG. 22C, operation 2240 forms an image system. The image system can include an array of radiation sources and an array of cameras. The radiation sources are configured to generate radiation having wavelengths configured to generate two types of fluorescence excitation on the sample. The cameras are configured to be covered by movable emission filters for sequentially capturing the two types of fluorescence signals emitted from the sample due to the two types of fluorescence excitation.

In FIG. 22D, operation 2260 positions emission filters to covering a camera array with a first type of emission filters. Operation 2261 illuminates a sample with a first illumination pattern, with the first illumination pattern including radiation having wavelengths configured to generate a first type of fluorescence excitation on the sample. Operation 2262 captures images corresponded to the first illumination pattern. Operation 2223 shifts the emission filters to cover the camera array with a second type of emission filters. Operation 2224 illuminates a sample with a second illumination pattern, with the second illumination pattern including radiation having wavelengths configured to generate a second type of fluorescence excitation on the sample. Operation 2225 captures images corresponded to the second illumination pattern. Fluorescence properties can be calculated from the captured images.

In some embodiments, the present invention discloses a retrofit kit for a computational microscope system to turn the computational microscope system into a computational fluorescence microscope system. The retrofit kit can include a set of fluorescence excitation filters for the radiation source units and a set of corresponding emission filters for the camera units.

Figure 23A:
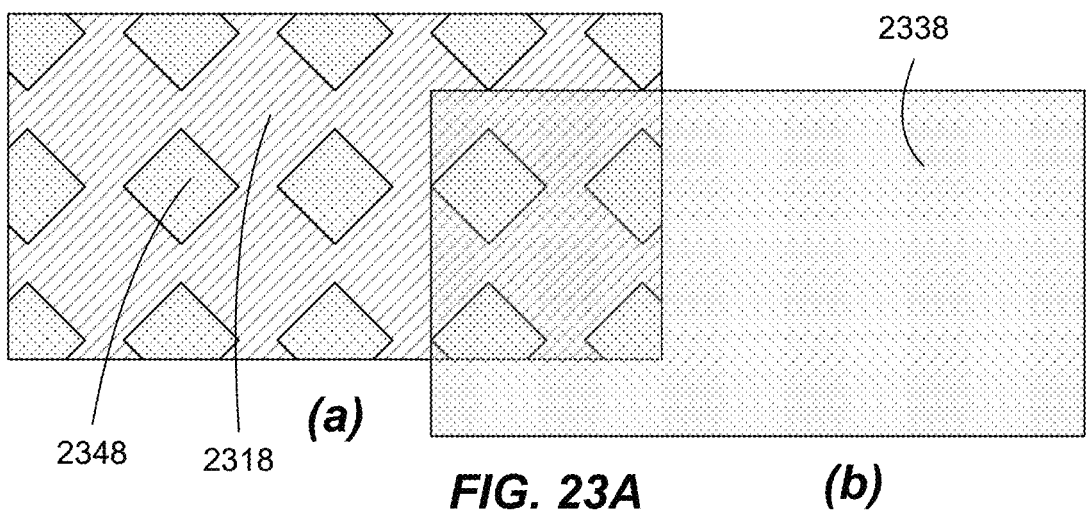
FIGS. 23A-23B illustrate a configuration for a computational fluorescence microscope system according to some embodiments.
Figure 23B:
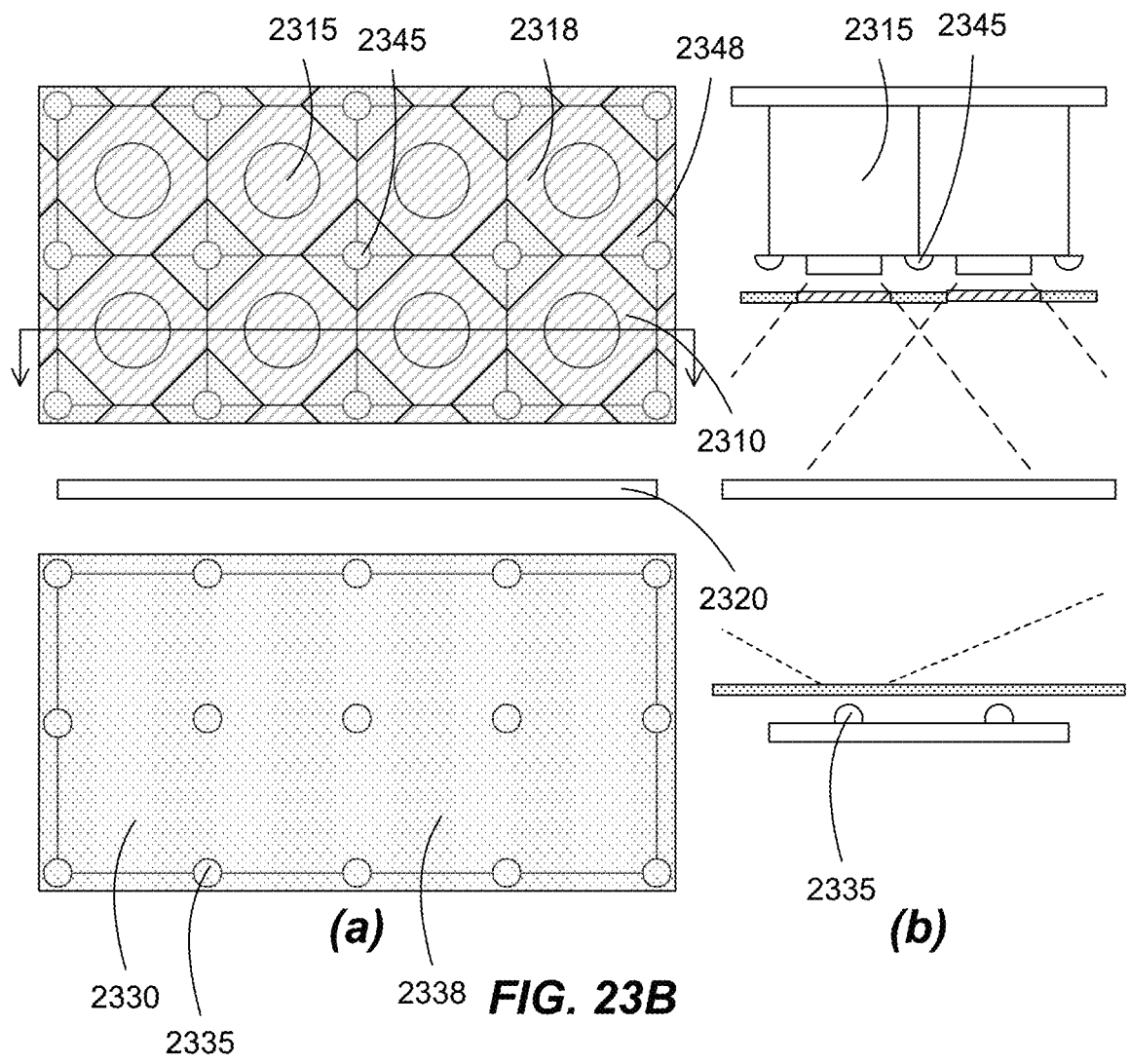

FIGS. 23A-23B illustrate a configuration for a computational fluorescence microscope system according to some embodiments. FIG. 23A shows a retrofit kit and FIG. 23B shows a computational fluorescence microscope system with the retrofit kit.

In FIG. 23A, a retrofit kit can include a set 2318 of emission filter for the camera units. The set 2318 of emission filter can be configured to be placed on the lenses of the camera units, to limit the radiation captured by the camera units to the wavelength range determined by the emission filter. The set of emission filter can include one or more large plates for covering multiple camera units. Alternatively, the set of emission filter can include multiple individual covers for individual camera units.

The retrofit kit can include sets 2338 and 2348 of fluorescence excitation filter for the radiation source units. For example, a set 2338 can be used for the bottom radiation source units, and a set 2348 can be used for the top radiation source units. Alternatively, the retrofit can only include a top set 2348 or a bottom set 2338. The set of fluorescence excitation filters is configured to be placed on the radiation source units to limit the radiation generated by the radiation source units to the wavelength range determined by the fluorescence excitation filters. The set of fluorescence excitation filters can include one or more large plates for covering multiple radiation source units. Alternatively, the set of fluorescence excitation filters can include multiple individual covers for individual radiation source units.

In some embodiments, the top set 2348 of fluorescence excitation filters can be integrated with the set 2318 of emission filters, to provide filters for the camera units and the radiation source units near the camera units.

In FIG. 23B, a retrofit kit can be assembled on a computational microscope system to form a computational fluorescence microscope system. The computational fluorescence microscope system can have an illumination source 2330 and/or 2340 and a camera array 2310 for capturing images of a sample 2320 or a portion of the sample 2320. A controller can be used to control the illumination system to provide different fluorescence excitation illumination patterns to the sample.

The set 2318 of emission filters can be placed on the camera units 2315 to form filtered camera units, e.g., camera units having the emission filter to be capable of capturing fluorescence signals passing through the emission filter.

The sets 2338 and 2348 of fluorescence excitation filter can be placed on the radiation source units 2335 and 2345, respectively, to form filtered radiation source units, e.g., radiation source units having the fluorescence excitation filter to be capable of generating radiation having the wavelength range determined by the fluorescence excitation filter.

After being retrofitted with the sets of filters, the controller can be modified to calculate and correlating fluorescence properties. Operation for the retrofitted microscope is similar to the operation of the original microscope system.

FIGS. 24A-24B illustrate flow charts for retrofitting a microscope system according to some embodiments. The microscope system is configured to capture images of one type of fluorescence signal.

In FIG. 24A, operation 2400 forms a retrofit assembly for a computational imaging system, with the computational imaging system including an array of radiation sources and an array of cameras. The retrofit assembly can include a set of first filters configured to enable the radiation sources to generate radiation having wavelengths configured to generate fluorescence excitation on a sample. The retrofit assembly can also include a set of second filters configured to enable the cameras to capture the fluorescence signal emitted from the sample due to the fluorescence excitation.

In FIG. 24B, operation 2420 places a set of first filters on radiation sources of an array of radiation sources of a computational imaging system, with the set of first filters configured to enable the radiation sources to generate radiation having wavelengths configured to generate fluorescence excitation on a sample of the computational imaging system.

Operation 2430 places a set of second filters on cameras of an array of cameras of the computational imaging system, with the set of second filters configured to enable the cameras to capture the fluorescence signal emitted from the sample due to the fluorescence excitation.

In some embodiments, the present invention discloses a computational fluorescence microscope system for capturing two types of images, such as two types of fluorescence images, or one type of fluorescence image and a visible light image. The camera array can be formed by adding new camera units of the second type between the camera units of the first type.

Figures 25A, 25B:
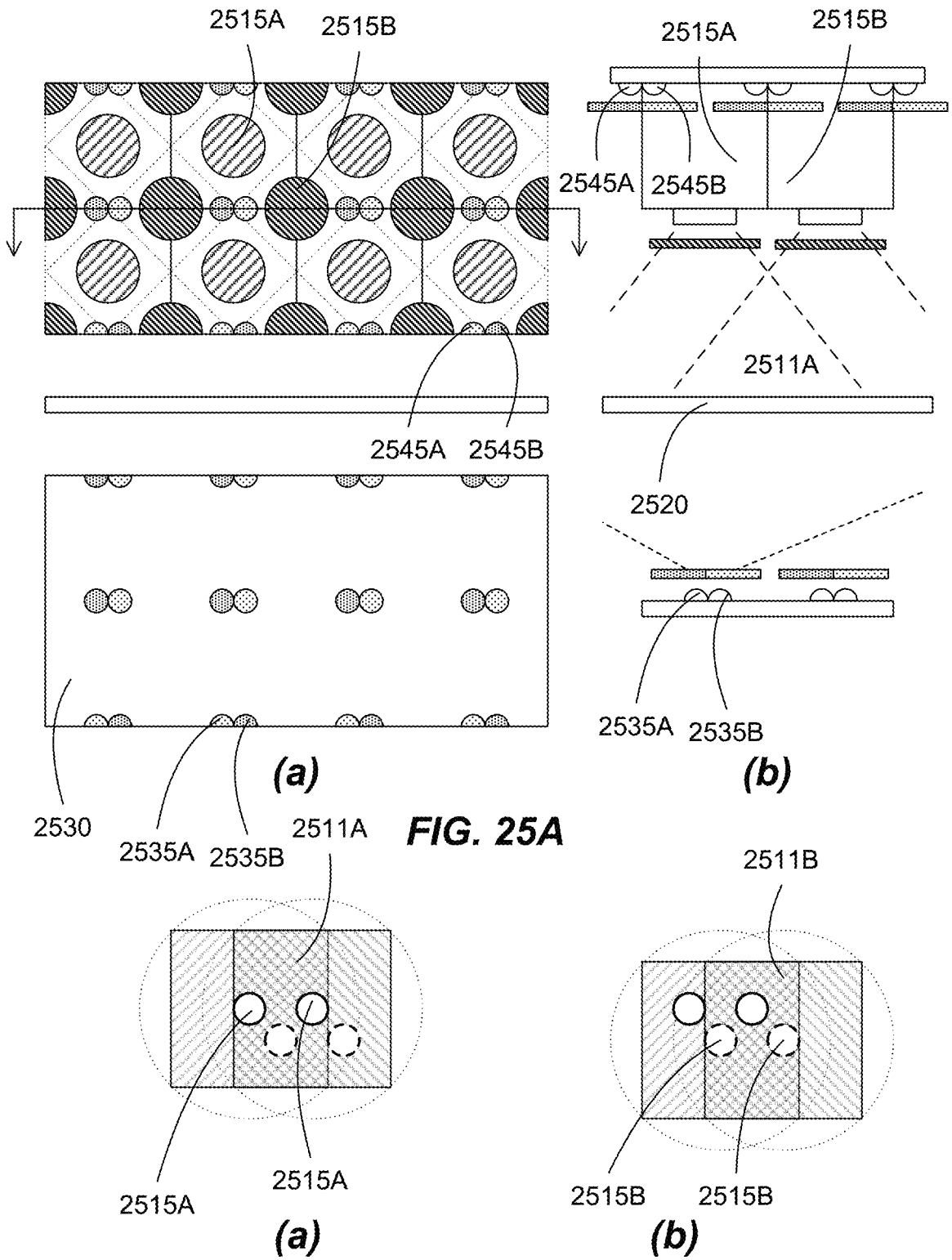
FIGS. 25A-25B illustrate a configuration for a computational fluorescence microscope system according to some embodiments.

FIGS. 25A-25B illustrate a configuration for a computational fluorescence microscope system according to some embodiments. FIG. 25A shows a component view of a computational fluorescence microscope system and FIG. 25B shows a detail view of the overlap of adjacent camera units.

A computational fluorescence microscope system can have an illumination source 2530 and 2540 and a camera array 2510 for capturing images of a sample 2520 or a portion of the sample. A controller can be used to control the illumination system to provide different fluorescence excitation illumination patterns to the sample.

The computational fluorescence microscope system can be configured with two types of emission filter for the camera units, or one type of emission filter for a portion, such as half, of the camera units. The computational fluorescence microscope system can be configured with two types of corresponding fluorescence excitation filter for the radiation source units of the illumination source, or one type of corresponding fluorescence excitation filter for a portion, such as half, of the radiation source units.

The illumination source can include k groups of radiation source units, with each group having two radiation source units 2535A and 2535B as bottom illumination source and 2545A and 2545B as top illumination source. As shown, the two radiation source units of each group of radiation source units are clustered together. Alternatively, all radiation source units can be evenly distributed.

The camera array can include n groups of camera units, with each group having two camera units 2515A and 2515B configured to capture images of the different fluorescence signals emitted by the sample due to the different fluorescence excitation caused by the radiation source units through the different types of fluorescence excitation filters.

In some embodiments, the radiation source units 2535A, 2535B and 2545A, 2545B are equipped with two different types of fluorescence excitation filters, in order to generate two types of radiation capable of fluorescence exciting the sample in two different fluorescence modes. The different types of filters mean filters having different wavelength ranges, such as filters having different band pass ranges.

The camera units 2515A and 2515B are equipped with two different types of corresponding emission filters, in order to capture two types of fluorescence signals emitted by the sample due to the different fluorescence modes.

In some embodiments, the radiation source units 2535A, 2535B and 2545A, 2545B are equipped with one type of fluorescence excitation filters, in order to generate one type of radiation capable of fluorescence exciting the sample in a fluorescence mode. The other radiation source units are without filter, e.g., configured to generate a large range of visible wavelengths determined by the radiation source units.

The camera units 2515A and 2515B are equipped with one type of corresponding emission filters, in order to capture one type of fluorescence signal emitted by the sample due to the fluorescence mode. The other camera units are without filter, e.g., configured to capture images through the large range of visible wavelengths determined by the camera units.

In some embodiments, the camera units are configured so that the camera units of one type can have a fusable overlapped field of view for adjacent camera units, e.g., greater than 50%, such as between 50-60%, 50-70%, or 50-80%. For example, two camera units 2515A can have an overlap 2511A greater than 50%. Two camera units 2515B can also have an overlap 2511B greater than 50%. The camera array can be formed by placing the second type of camera units at the center of the square formed by 4 camera units of the first type, to form a face center configuration of the camera units.

In some embodiments, the present invention discloses a computational fluorescence microscope system for capturing two types of images, such as two types of fluorescence images, or one type of fluorescence image and a visible light image. The camera array can be formed by making alternate camera units becoming camera units of the second type.

FIGS. 26A-26B illustrate a configuration for a computational fluorescence microscope system according to some embodiments. FIG. 26A shows a component view of a computational fluorescence microscope system and FIG. 26B shows a detail view of the overlap of adjacent camera units.

A computational fluorescence microscope system can have an illumination source 2630 and 2640 and a camera array 2610 for capturing images of a sample 2620 or a portion of the sample. A controller can be used to control the illumination system to provide different fluorescence excitation illumination patterns to the sample.

The computational fluorescence microscope system can be configured with two types of emission filter for the camera units, together with two types of corresponding fluorescence excitation filter for the radiation source units of the illumination source. Alternatively, the computational fluorescence microscope system can be configured with one type of emission filter for a portion, such as half, of the camera units, together with one type of corresponding fluorescence excitation filter for a portion, such as half, of the radiation source units.

The illumination source can include k groups of radiation source units, with each group having two radiation source units 2635A and 2635B as bottom illumination source and 2645A and 2645B as top illumination source. The camera array can include n groups of camera units, with each group having two camera units 2615A and 2615B configured to capture images of the different fluorescence signals emitted by the sample due to the different fluorescence excitation caused by the radiation source units through the different types of fluorescence excitation filters.

In some embodiments, the camera units are configured so that the camera units of one type can have an overlapped field of view for adjacent camera units less than that of a conventional computational microscope system, but still adequate for the fusing algorithm. For example, the overlap can be greater than 50%, such as between 50-60% or 50-70%. The overlap can be around 50%, such as between 40-60% or between 40-70%.

For example, two camera units 2615A can have an overlap 2611A greater than 50%. Two camera units 2615B can also have an overlap 2611B greater than 50%. The camera array can be formed by alternatively placing the second type of camera units at the place of the first type of camera units, to form a checkerboard configuration of the camera units.

If the overlap between adjacent camera units different from that of a conventional computational microscope system, the controller can be modified with a modified fusing algorithm, which considers the new overlap area between two adjacent camera units.

FIGS. 27A-27B illustrate flow charts for a computational fluorescence microscope system according to some embodiments. The microscope system is configured to capture images of two types, either of two types of fluorescence modes, or one type of fluorescence mode and one type of visible mode.

In FIG. 27A, operation 2700 forms a computational imaging system, with the computational imaging system having an array of radiation sources and an array of cameras. The radiation sources can include multiple sets of radiation sources, with each set of radiation sources configured to generate radiation having a different band of wavelengths with each band configured to generate a different fluorescence excitation on the sample. The cameras can include multiple sets of cameras, with each set of cameras configured to capture fluorescence signals emitted from the sample due to the fluorescence excitation based on a band of wavelengths. Two adjacent cameras in each set of cameras in two directions can have a fusable overlapped field of view.

In FIG. 27B, operation 2720 forms a computational imaging system, with the computational imaging system having an array of radiation sources and an array of cameras. The radiation sources can include multiple sets of radiation sources, with a first set of radiation sources configured to illuminate a sample, and a second set of radiation source configured to generate radiation having a band of wavelengths configured to generate a fluorescence excitation on the sample. The cameras can include multiple sets of cameras, with a first set of cameras configured to capture images illuminated by the first set of radiation sources, and a second set of cameras configured to capture fluorescence signals emitted from the sample due to the fluorescence excitation based on the band of wavelengths. Two adjacent cameras in each set of cameras in two directions can have a fusable overlapped field of view.

FIGS. 28A-28D illustrate flow charts for operating a computational fluorescence microscope system according to some embodiments. The microscope system is configured to capture images of two types, either of two types of fluorescence modes, or one type of fluorescence mode and one type of visible mode.

In FIG. 28A, operation 2800 illuminates a sample with a sequence of patterns, with each pattern including radiation having first wavelengths configured to generate first fluorescence excitation on the sample, and with each pattern further including radiation having second wavelengths configured to generate second fluorescence excitation on the sample.

In FIG. 28B, operation 2820 illuminates a sample with a sequence of patterns, with each pattern including radiation having first wavelengths configured to generate first fluorescence excitation on the sample, and with each pattern further including radiation having second wavelengths configured to illuminating the sample.

In FIG. 28C, operation 2840 illuminates a sample with a sequence of patterns, with a first pattern including radiation having first wavelengths configured to generate first fluorescence excitation on the sample, and with a second pattern including radiation having second wavelengths configured to generate second fluorescence excitation on the sample.

In FIG. 28D, operation 2860 illuminates a sample with a sequence of patterns, with a first pattern including radiation having first wavelengths configured to generate first fluorescence excitation on the sample, and with a second pattern including radiation having second wavelengths configured to illuminating the sample.

Figure 29:
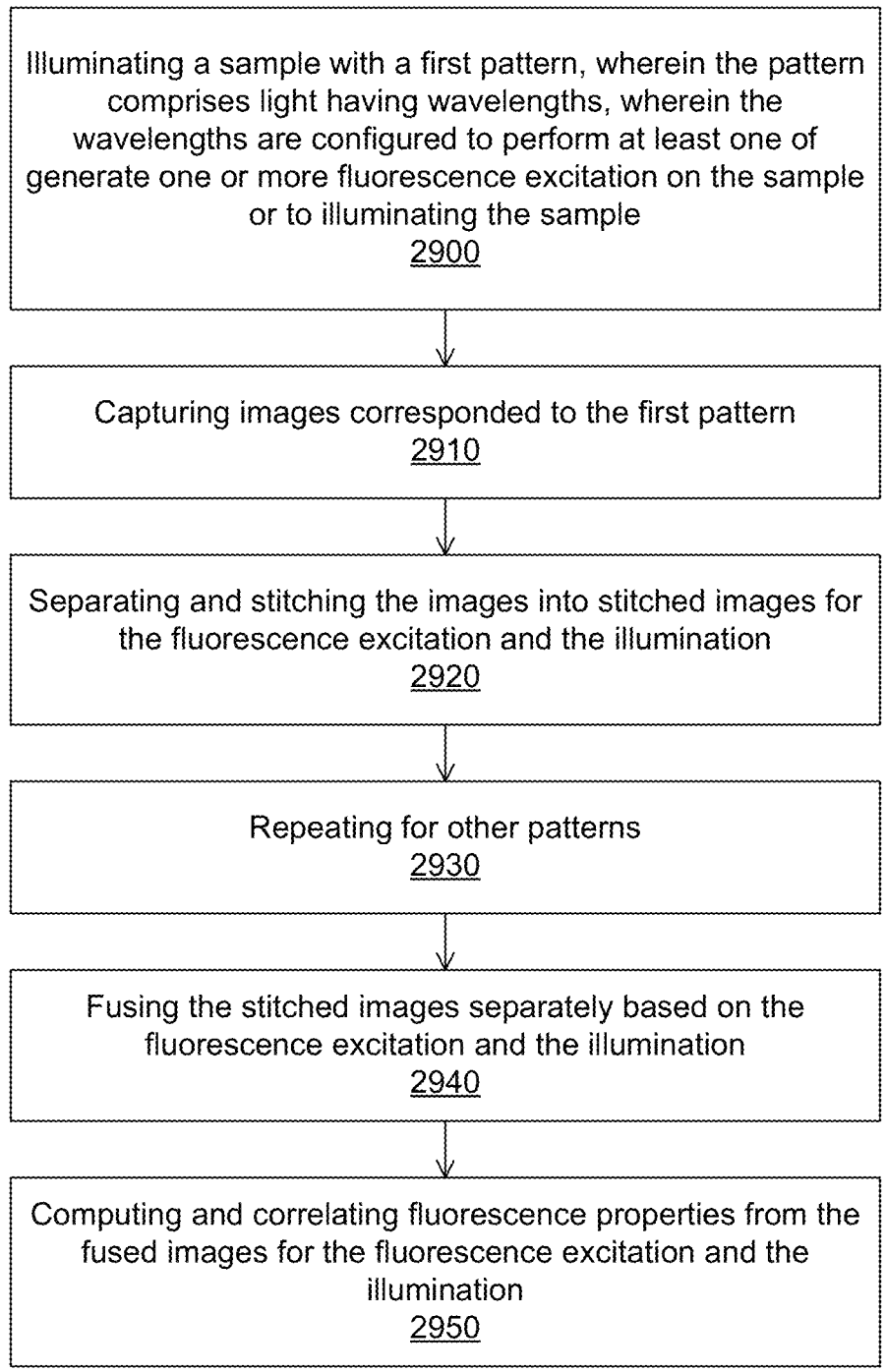
FIG. 29 illustrates a flow chart for a computational fluorescence microscope system according to some embodiments.

FIG. 29 illustrates a flow chart for a computational fluorescence microscope system according to some embodiments. The microscope system is configured to capture images of two types, either of two types of fluorescence modes, or one type of fluorescence mode and one type of visible light mode.

In FIG. 29, operation 2900 illuminates a sample with a first pattern, with the pattern having radiation having wavelengths configured to perform at least one of generating one or more fluorescence excitation on the sample or illuminating the sample.

The first pattern can include the radiation provided by a first group of radiation source units. Subsequent patterns can include the radiation provided by other groups of radiation source units, such as each subsequent pattern including radiation from one other group of radiation source units.

A group of radiation source units can include two different types of radiation source units. In some embodiments, the two different types of radiation source units can include two different radiation source units configured to generate radiation through two different types of fluorescence excitation filters. In some embodiments, the two different types of radiation source units can include a first radiation source unit configured to generate radiation through a type of fluorescence excitation filter and a second radiation source unit configured to generate radiation without any filter.

Operation 2910 captures images corresponded to the first pattern. The camera array can include multiple groups of camera units, with each group of camera units having 2 different types of camera units. The types of camera units in a group of camera units correspond to the types of radiation source units in a group of radiation source units.

For example, when a group of radiation source units includes two different radiation source units configured to generate radiation through two different types of fluorescence excitation filters, a group of camera units also includes two different camera units configured to capture images through two different types of emission filters. When a group of radiation source units includes a first radiation source unit configured to generate radiation through a type of fluorescence excitation filter and a second radiation source unit configured to generate radiation without through any filter, a group of camera units also includes a first camera unit configured to capture images through a type of emission filter and a second camera unit configured to capture images without through any filter.

Under the first pattern, all camera units can capture images of the sample, e.g., each camera unit capturing a portion of the sample, with overlap. Thus, under one pattern, two complete overlapped images of the sample are captured, with each complete image captured by a type of camera units. Each complete image includes n image portions, with n being the number of groups of camera units.

Operation 2920 separates and stitches the images into an assembled image. The image portions captured by the camera units are first separated based on the types of camera units, e.g., images captured by a first type of camera units are grouped together and images captured by a second type of camera units are grouped together. After separating, the image portions in each group can be stitched together to form an assembled image of the sample, e.g., a complete image of the sampled formed by stitching the image portions together. There are two different assembled images, one for each type of camera units.

Operation 2930 repeats for other patterns. The process can be repeated for other patterns. For example, another pattern can include radiation generated from another group of radiation source units, e.g., a first radiation from a first type of radiation source unit and a second radiation from a second type of radiation source unit.

After k patterns, the system can form 2 sets of k assembled images of the sample, with each assembled image including n image portions, with k being the number of patterns, and n being the number of camera units.

Operation 2940 fuses the assembled images. Each set of k assembled images can be fused together to form an image reconstruction of the sample. There can be 2 image reconstructions. For example, the two image reconstruction can include a first image reconstruction for a first type of fluorescence signal and a second image reconstruction for a second type of fluorescence signal. Alternatively, the two image reconstruction can include a first image reconstruction for a type of fluorescence signal and a second image reconstruction for a visible image of the sample.

Operation 2950 computes fluorescence properties from the fused image. The images captured by the camera units are configured for the fluorescence signal, and thus, fluorescence properties of the sample can be determined from the captured images, or from the image reconstruction of the sample.

In some embodiments, the present invention discloses a retrofit kit for computational microscope system to turn the computational microscope system into a computational fluorescence microscope system suitable for two types of image captures. The retrofit kit can include a set of fluorescence excitation filter for the radiation source units and a set of corresponding emission filter for the camera units.

Figure 30A:
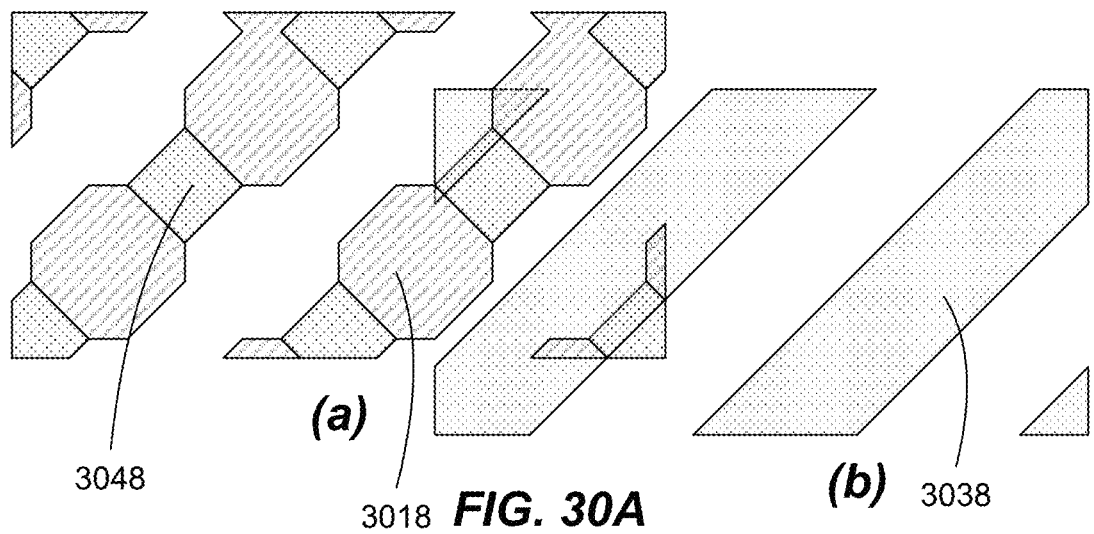
FIGS. 30A-30B illustrate a configuration for a computational fluorescence microscope system according to some embodiments.
Figure 30B:
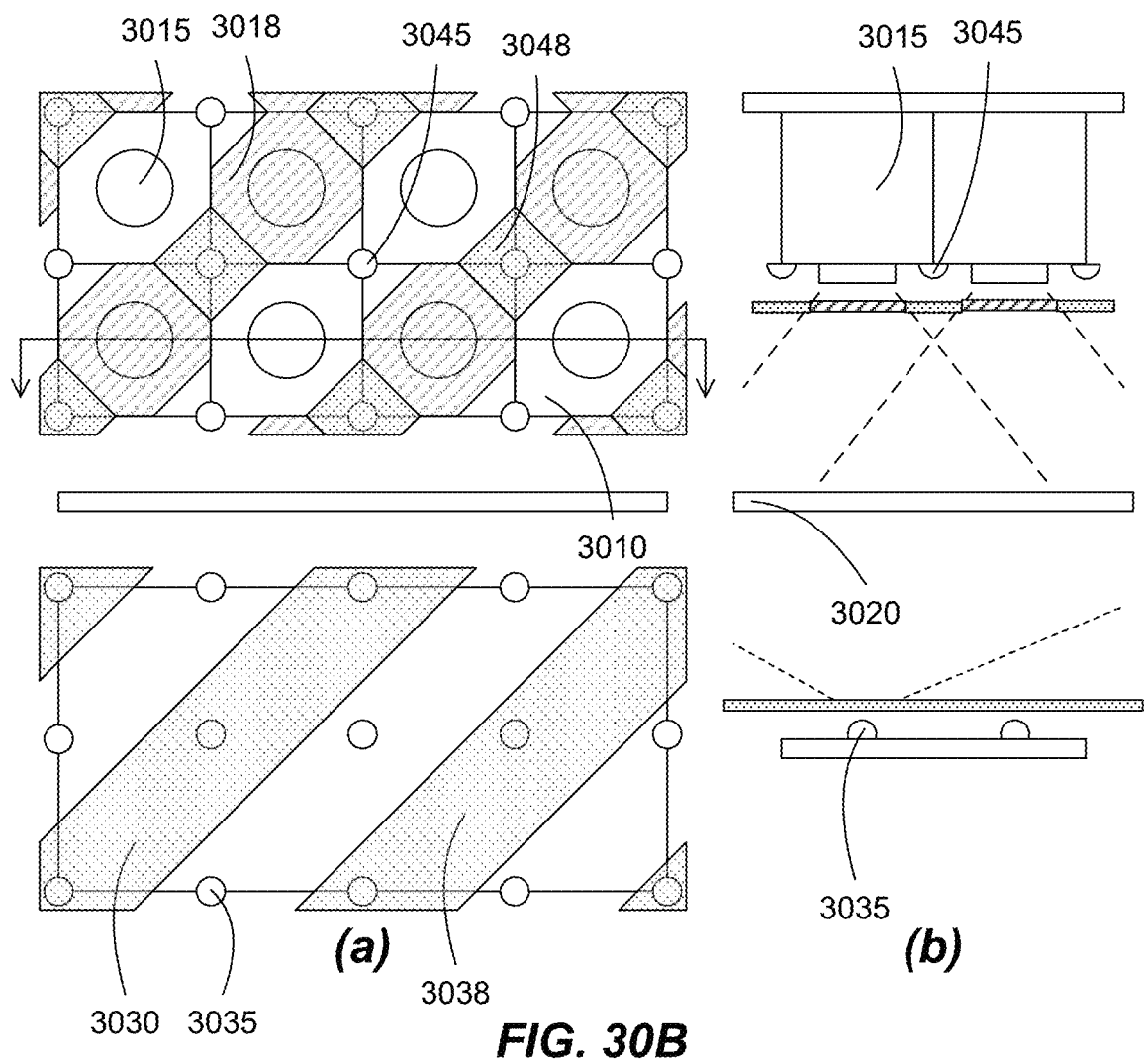

FIGS. 30A-30B illustrate a configuration for a computational fluorescence microscope system according to some embodiments. FIG. 30A shows a retrofit kit and FIG. 30B shows a computational fluorescence microscope system with the retrofit kit.

In FIG. 30A, a retrofit kit can include a set 3018 of emission filter for the camera units. The set 3018 of emission filter can be configured to be placed on the lenses of the camera units, to limit the radiation captured by the camera units to the wavelength range determined by the emission filter. The set of emission filter can include one or more large plates for covering multiple camera units. Alternatively, the set of emission filter can include multiple individual covers for individual camera units.

As shown, the set 3018 of emission filter is configured to cover a portion, such as half, of the camera units in an alternating configuration. Other configurations can be used, such as an alternating column configuration. As shown, the camera units without the emission filter are configured to capture a large range of visible light. Alternatively, the set of emission filter can be configured to cover all camera units, with a first portion, e.g., half, covered by a first type of emission filters and a second portion, e.g., the remaining half, covered by a second type of emission filters.

The retrofit kit can include sets 3038 and 3048 of fluorescence excitation filter for the radiation source units. For example, a set 3038 can be used for the bottom radiation source units, and a set 3048 can be used for the top radiation source units. Alternatively, the retrofit can only include a top set 3048 or a bottom set 3038. The set of fluorescence excitation filter is configured to be placed on the radiation source units to limit the radiation generated by the radiation source units to the wavelength range determined by the fluorescence excitation filter. The set of fluorescence excitation filter can include one or more large plates for covering multiple radiation source units. Alternatively, the set of fluorescence excitation filter can include multiple individual covers for individual radiation source units.

As shown, the sets 3038 and 3048 of fluorescence excitation filter are configured to cover a portion, such as half, of the radiation source units in an alternating configuration. Other configurations can be used, such as an alternating column configuration. As shown, the radiation source units without the fluorescence excitation filter are configured to generate a large range of visible light. Alternatively, the set of fluorescence excitation filter can be configured to cover all radiation source units, with a first portion, e.g., half, covered by a first type of fluorescence excitation filters and a second portion, e.g., the remaining half, covered by a second type of fluorescence excitation filters.

In some embodiments, the top set 3048 of fluorescence excitation filter can be integrated with the set 3018 of emission filter, to provide filters for the camera units and the radiation source units near the camera units.

In FIG. 30B, a retrofit kit can be assembled on a computational microscope system to form a computational fluorescence microscope system. The computational fluorescence microscope system can have an illumination source 3030 and/or 3040 and a camera array 3010 for capturing images of a sample 3020 or a portion of the sample 3020. A controller can be used to control the illumination system to provide different fluorescence excitation illumination patterns to the sample.

The set 3018 of emission filter can be placed on the camera units 3015 to form filtered camera units, e.g., camera units having the emission filter to be capable of capturing fluorescence signals passing through the emission filter.

The sets 3038 and 3048 of fluorescence excitation filter can be placed on the radiation source units 3035 and 3045, respectively, to form filtered radiation source units, e.g., radiation source units having the fluorescence excitation filter to be capable of generating radiation having the wavelength range determined by the fluorescence excitation filter.

After being retrofitted with the sets of filters, the controller can be modified. For example, the controller can be modified to form illumination patterns with each pattern including radiation from two different radiation source units. Further, the controller can be modified to adjust the fusing algorithm based on the new overlap of the camera units in the new configuration. Further, the controller can be modified to calculate and correlating fluorescence properties.

FIGS. 31A-31B illustrate flow charts for retrofitting a microscope system according to some embodiments. The microscope system is configured to capture images of two types of images.

In FIG. 31A, operation 3100 forms a retrofit assembly for a computational imaging system, with the computational imaging system having an array of radiation sources and an array of cameras. The retrofit assembly can include a set of first filters configured to enable checkerboard alternate radiation sources to generate radiation having wavelengths configured to generate fluorescence excitation on a sample. The retrofit assembly can include a set of second filters configured to enable checkerboard alternate cameras to capture the fluorescence signals emitted from the sample due to the fluorescence excitation. The retrofit assembly can include a modification of fuse algorithm to account for a new overlapped field of view of adjacent checkerboard alternate cameras.

In FIG. 31B, operation 3120 forms a retrofit assembly for a computational imaging system, with the computational imaging system having an array of radiation sources and an array of cameras. The retrofit assembly can include two sets of first and second filters configured to enable checkerboard alternate radiation sources to generate radiation having wavelengths configured to generate two different fluorescence excitation on a sample. The retrofit assembly can include two sets of third and fourth filters configured to enable checkerboard alternate cameras to capture the fluorescence signals emitted from the sample due to the different fluorescence excitation. The retrofit assembly can include a modification of fuse algorithm to account for a new overlapped field of view of adjacent checkerboard alternate cameras.

Figure 32:
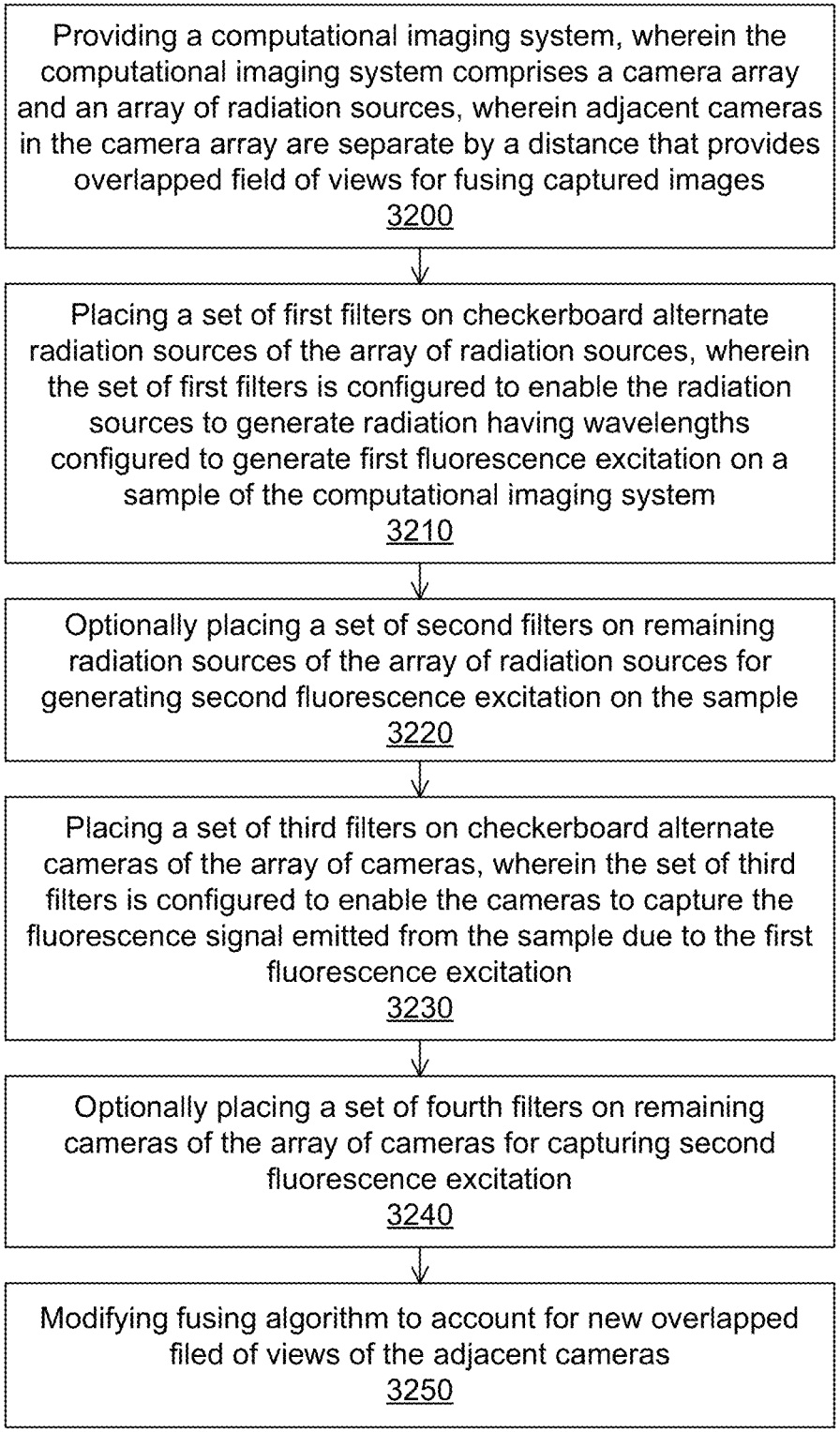
FIG. 32 illustrates a flow chart for retrofitting a computational microscope system according to some embodiments.

FIG. 32 illustrates a flow chart for retrofitting a computational microscope system according to some embodiments. Operation 3200 provides a computational imaging system, with the computational imaging system having a camera array and an array of radiation sources, and with adjacent cameras in the camera array separate by a distance that provides overlapped field of views for fusing captured images.

Operation 3210 places a set of first filters on checkerboard alternate radiation sources of the array of radiation sources, with the set of first filters configured to enable the radiation sources to generate radiation having wavelengths configured to generate first fluorescence excitation on a sample of the computational imaging system.

Operation 3220 optionally places a set of second filters on remaining radiation sources of the array of radiation sources for generating second fluorescence excitation on the sample.

Operation 3230 places a set of third filters on checkerboard alternate cameras of the array of cameras, with the set of third filters configured to enable the cameras to capture the fluorescence signal emitted from the sample due to the first fluorescence excitation.

Operation 3240 optionally places a set of fourth filters on remaining cameras of the array of cameras for capturing second fluorescence excitation.

Operation 3250 modifies a fusing algorithm to account for new overlapped filed of views of the adjacent cameras.

In some embodiments, the present invention discloses a computational fluorescence microscope system for capturing two types of images, such as two types of fluorescence images, or one type of fluorescence image and a visible light image. The camera array can be formed by making alternate columns of camera units becoming camera units of the second type.

Figures 33A, 33B:
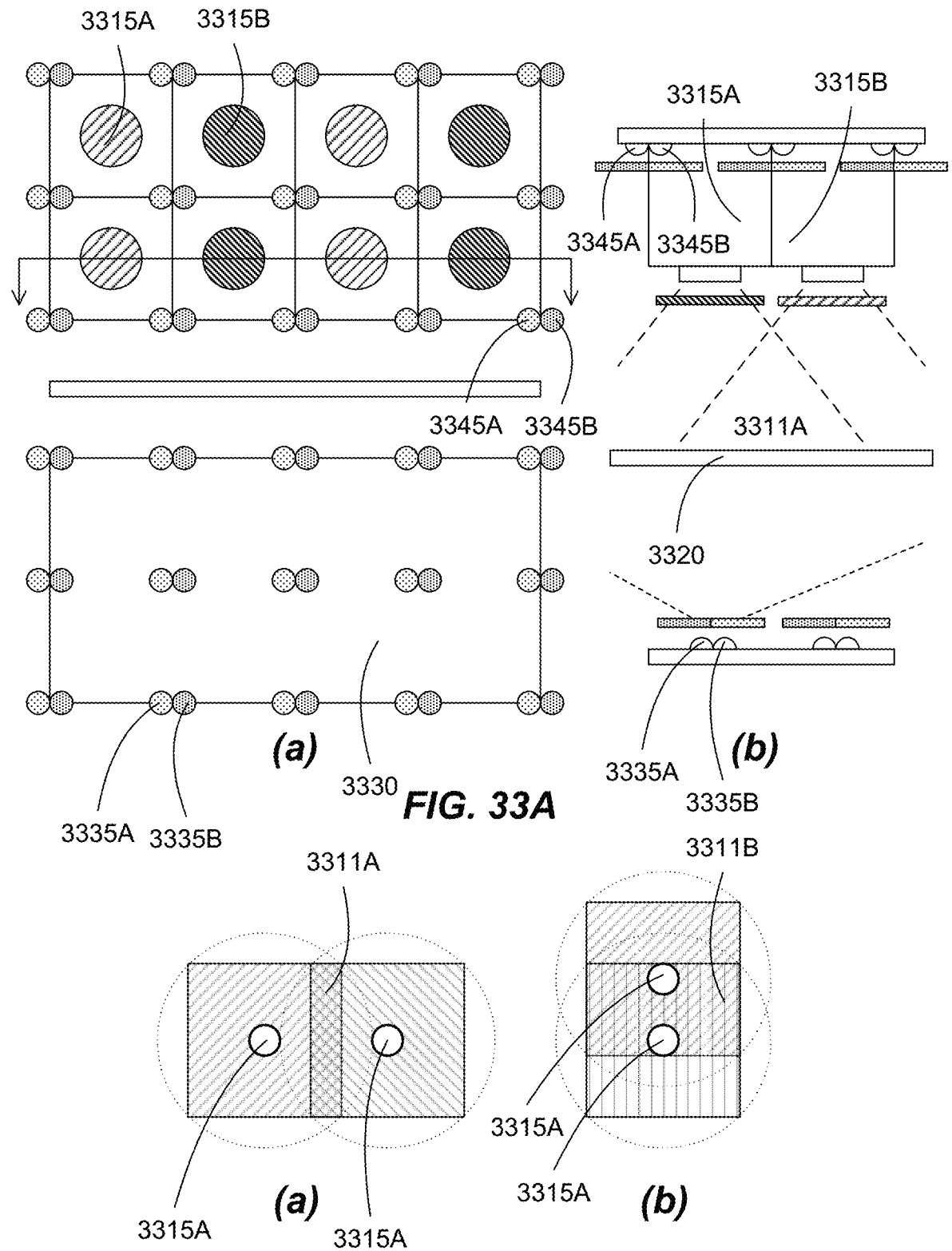
FIGS. 33A-33B illustrate a configuration for a computational fluorescence microscope system according to some embodiments.

FIGS. 33A-33B illustrate a configuration for a computational fluorescence microscope system according to some embodiments. FIG. 33A shows a component view of a computational fluorescence microscope system and FIG. 33B shows a detail view of the overlap of adjacent camera units.

A computational fluorescence microscope system can have an illumination source 3330 and 3340 and a camera array 3310 for capturing images of a sample 3320 or a portion of the sample. A controller can be used to control the illumination system to provide different fluorescence excitation illumination patterns to the sample.

The computational fluorescence microscope system can be configured with two types of emission filter for the camera units, together with two types of corresponding fluorescence excitation filter for the radiation source units of the illumination source. Alternatively, the computational fluorescence microscope system can be configured with one type of emission filter for a portion, such as half, of the camera units, together with one type of corresponding fluorescence excitation filter for a portion, such as half, of the radiation source units.

The illumination source can include k groups of radiation source units, with each group having two radiation source units 3335A and 3335B as bottom illumination source and 3345A and 3345B as top illumination source. The camera array can include n groups of camera units, with each group having two camera units 3315A and 3315B configured to capture images of the different fluorescence signals emitted by the sample due to the different fluorescence excitation caused by the radiation source units through the different types of fluorescence excitation filters.

In some embodiments, the camera units are configured so that the camera units of one type can have different overlapped field of views in different directions. For example, the overlap in one direction can be greater than 50%, such as between 50-60%, 50-70%, or 50-80%. The overlap in one direction can be less than 50%, such as between 20-50%, 20-40%, or 20-30%. As a specific example, two camera units 3315A can have an overlap 3311A less than 50% in the x direction. Two camera units 3315A can also have an overlap 3311B greater than 50% in the y direction. The camera array can be formed by alternatively placing columns of the second type of camera units at alternate positions on the camera array, to form alternate columnar configuration of the camera units.

The controller can be provided with a modified fusing algorithm, which considers the difference in overlap areas in different directions.

FIG. 34 illustrates a flow chart for forming a computational microscope according to some embodiments. Operation 3400 forms a computational imaging system, with the computational imaging system having an array of radiation sources and an array of cameras.

The radiation sources can include multiple sets of radiation sources. Either each set of radiation sources is configured to generate radiation having a different band of wavelengths with each band configured to generate a different fluorescence excitation on the sample, or a first set of radiation sources is configured to illuminate a sample, wherein a second set of radiation source is configured to generate radiation having a band of wavelengths configured to generate a fluorescence excitation on the sample.

The cameras can include multiple sets of cameras, wherein the multiple sets of cameras are arranged in columns. Either each set of cameras is configured to capture fluorescence signals emitted from the sample due to the fluorescence excitation based on a band of wavelengths, or a first set of cameras is configured to capture images illuminated by the first set of radiation sources, wherein a second set of cameras is configured to capture fluorescence signals emitted from the sample due to the fluorescence excitation based on the band of wavelengths.

The camera units can have different overlapped field of views in different directions. For example, adjacent cameras in each set of cameras in a first direction along the columns of cameras can have a fusable overlapped field of view. And adjacent cameras in each set of cameras in a second direction across the columns comprise a stitchable overlapped field of view. The computational imaging system can have a fusing algorithm to fuse images captured from each set of cameras.

Figure 35:
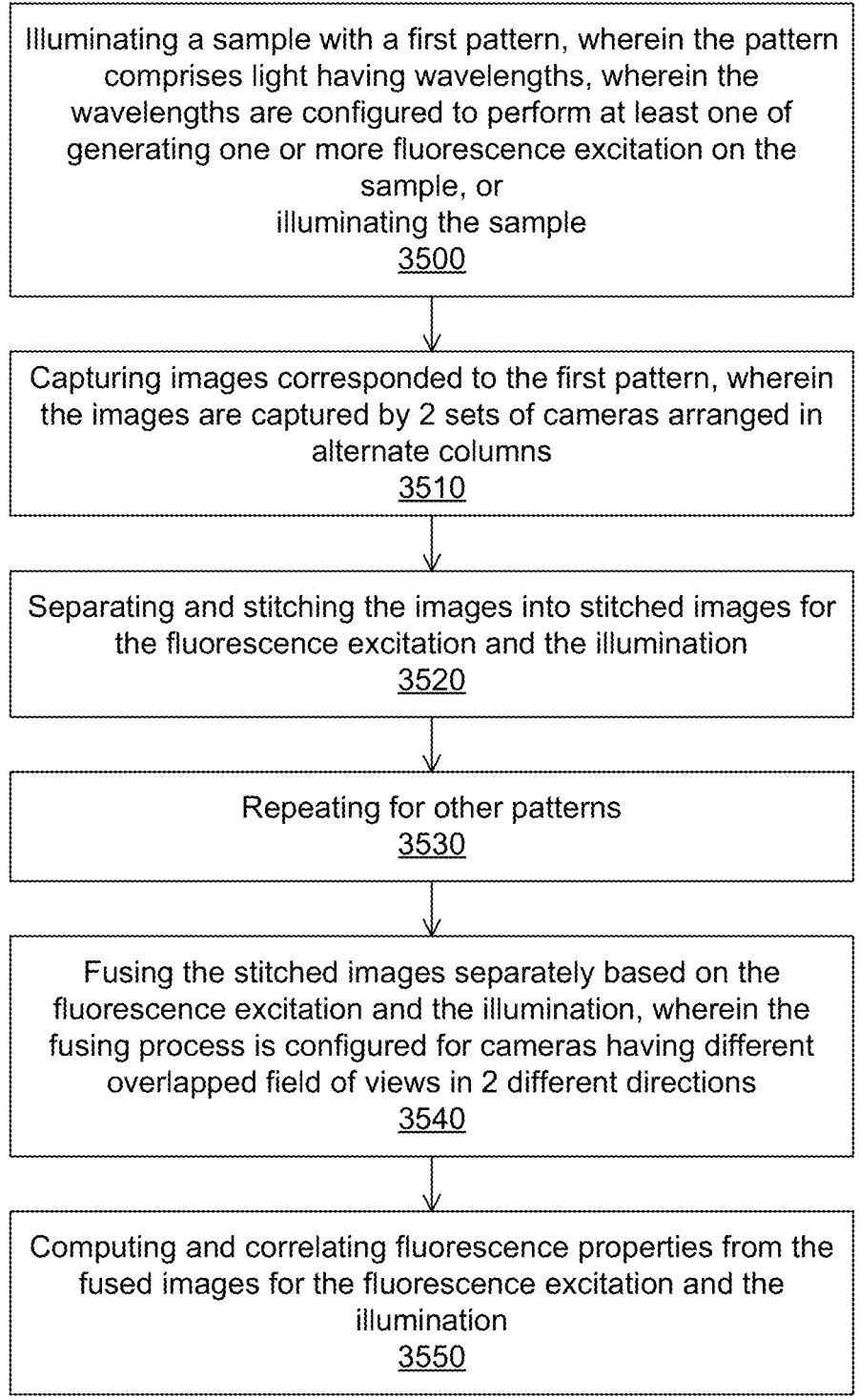
FIG. 35 illustrates a flow chart for operating a computational microscope according to some embodiments.

FIG. 35 illustrates a flow chart for operating a computational microscope according to some embodiments. Operation 3500 illuminates a sample with a first pattern, with the pattern having radiation having wavelengths, with the wavelengths configured to perform at least one of generating one or more fluorescence excitation on the sample, or illuminating the sample. Operation 3510 captures images corresponding to the first pattern, with the images captured by 2 sets of cameras arranged in alternate columns. Operation 3520 separates and stitches the images into assembled images, Operation 3530 repeats for other patterns. Operation 3540 fuses the assembled images separately, with the fusing process configured for cameras having different overlapped field of views in 2 different directions. Operation 3550 computes and correlates fluorescence properties from the fused images for the fluorescence excitation and the illumination.

In some embodiments, the present invention discloses a retrofit kit for computational microscope system to turn the computational microscope system into a computational fluorescence microscope system suitable for two types of image captures. The retrofit kit can include a set of fluorescence excitation filter for the radiation source units and a set of corresponding emission filter for the camera units.

Figure 36A:
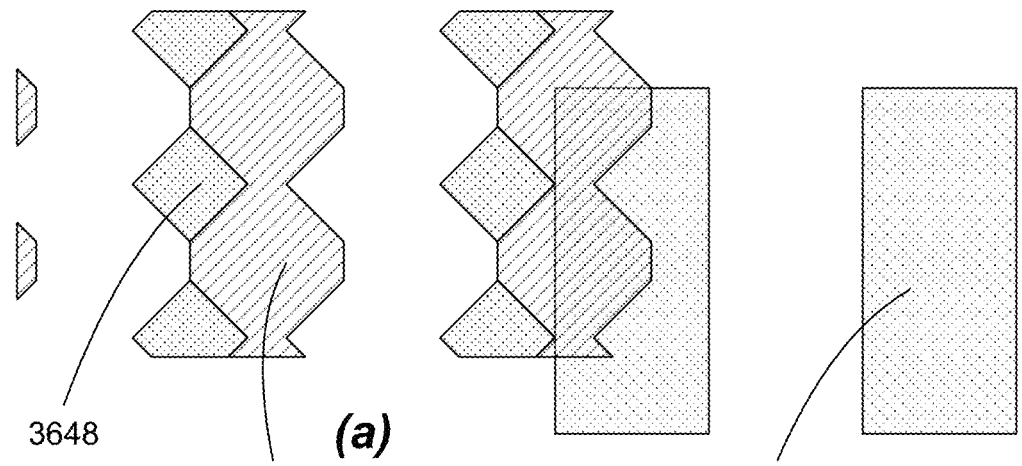
FIGS. 36A-36B illustrate a configuration for a computational fluorescence microscope system according to some embodiments.
Figure 36B:
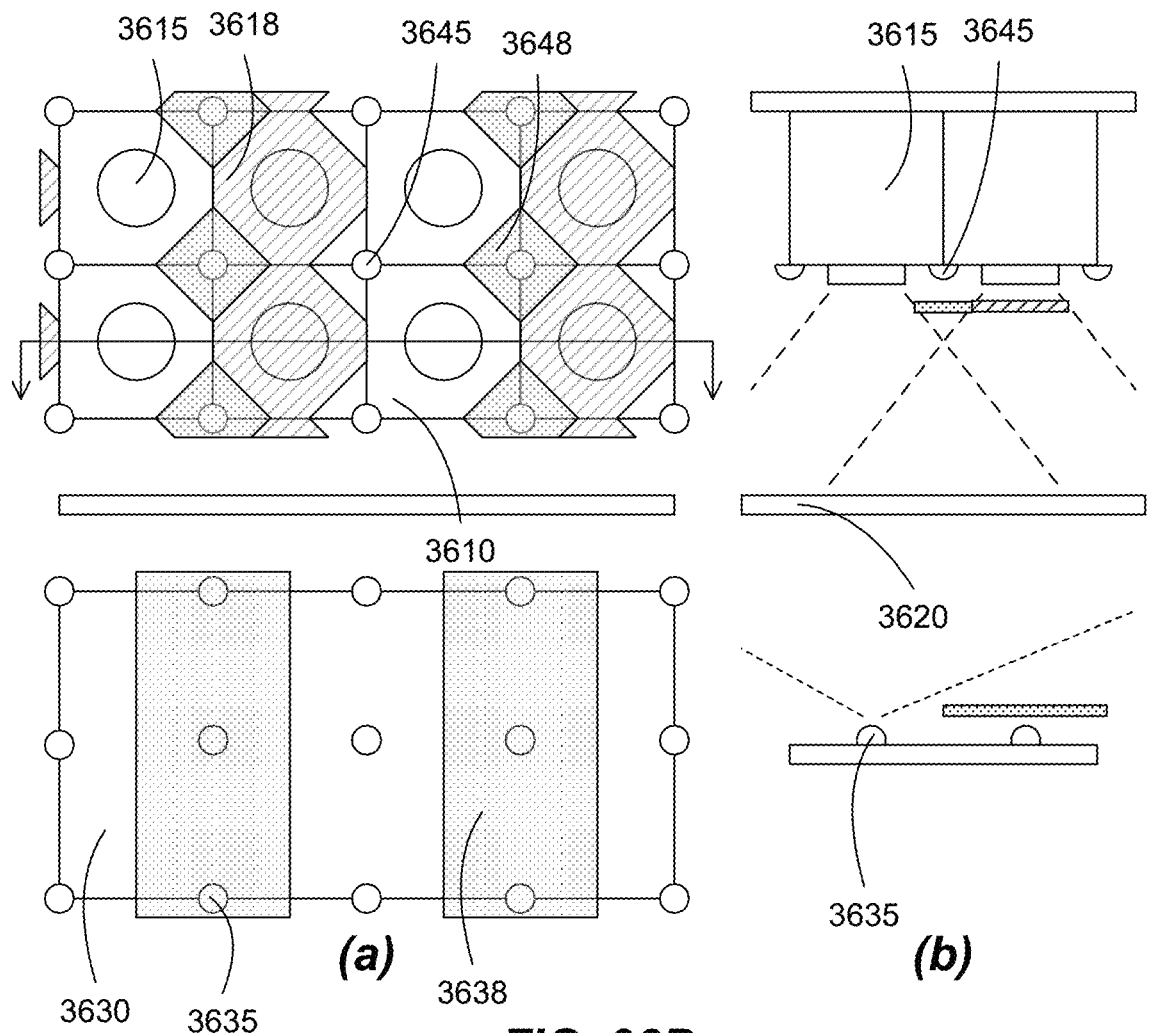

FIGS. 36A-36B illustrate a configuration for a computational fluorescence microscope system according to some embodiments. FIG. 36A shows a retrofit kit and FIG. 36B shows a computational fluorescence microscope system with the retrofit kit.

In FIG. 36A, a retrofit kit can include a set 3618 of emission filter for the camera units. The set 3618 of emission filter can be configured to be placed on the lenses of the camera units, to limit the radiation captured by the camera units to the wavelength range determined by the emission filter. The set of emission filter can include one or more large plates for covering multiple camera units. Alternatively, the set of emission filter can include multiple individual covers for individual camera units.

As shown, the set 3618 of emission filter is configured to cover a portion, such as half, of the camera units in an alternating columnar configuration. As shown, the camera units without the emission filter are configured to capture a large range of visible light. Alternatively, the set of emission filter can be configured to cover all camera units, with a first portion, e.g., half, covered by a first type of emission filters and a second portion, e.g., the remaining half, covered by a second type of emission filters.

The retrofit kit can include sets 3638 and 3648 of fluorescence excitation filter for the radiation source units. For example, a set 3638 can be used for the bottom radiation source units, and a set 3648 can be used for the top radiation source units. Alternatively, the retrofit can only include a top set 3648 or a bottom set 3638. The set of fluorescence excitation filter is configured to be placed on the radiation source units to limit the radiation generated by the radiation source units to the wavelength range determined by the fluorescence excitation filter. The set of fluorescence excitation filter can include one or more large plates for covering multiple radiation source units. Alternatively, the set of fluorescence excitation filter can include multiple individual covers for individual radiation source units.

As shown, the sets 3638 and 3648 of fluorescence excitation filter are configured to cover a portion, such as half, of the radiation source units in an alternating columnar configuration. As shown, the radiation source units without the fluorescence excitation filter are configured to generate a large range of visible light. Alternatively, the set of fluorescence excitation filter can be configured to cover all radiation source units, with a first portion, e.g., half, covered by a first type of fluorescence excitation filters and a second portion, e.g., the remaining half, covered by a second type of fluorescence excitation filters.

In some embodiments, the top set 3648 of fluorescence excitation filter can be integrated with the set 3618 of emission filter, to provide filters for the camera units and the radiation source units near the camera units.

In FIG. 36B, a retrofit kit can be assembled on a computational microscope system to form a computational fluorescence microscope system. The computational fluorescence microscope system can have an illumination source 3630 and/or 3640 and a camera array 3610 for capturing images of a sample 3620 or a portion of the sample 3620. A controller can be used to control the illumination system to provide different fluorescence excitation illumination patterns to the sample.

The set 3618 of emission filter can be placed on the camera units 3615 to form filtered camera units, e.g., camera units having the emission filter to be capable of capturing fluorescence signals passing through the emission filter.

The sets 3638 and 3648 of fluorescence excitation filter can be placed on the radiation source units 3635 and 3645, respectively, to form filtered radiation source units, e.g., radiation source units having the fluorescence excitation filter to be capable of generating radiation having the wavelength range determined by the fluorescence excitation filter.

After being retrofitted with the sets of filters, the controller can be modified. For example, the controller can be modified to form illumination patterns with each pattern including radiation from two different radiation source units. Further, the controller can be modified to adjust the fusing algorithm based on the different overlaps of the camera units in two directions. Further, the controller can be modified to calculate and correlating fluorescence properties.

FIG. 37 illustrates a flow chart for retrofitting a computational microscope system according to some embodiments. Operation 3700 provides a computational imaging system, with the computational imaging system having a camera array and an array of radiation sources, and with adjacent cameras in the camera array separate by a distance that provides overlapped field of views for fusing captured images.

Operation 3710 places a set of first filters on alternate columns of the radiation sources of the array of radiation sources, with the set of first filters configured to enable the radiation sources to generate radiation having wavelengths configured to generate first fluorescence excitation on a sample of the computational imaging system. Operation 3720 optionally places a set of second filters on remaining columns of the radiation sources of the array of radiation sources for generating second fluorescence excitation on the sample. Operation 3730 places a set of third filters on alternate columns of the cameras of the array of cameras, with the set of third filters configured to enable the cameras to capture the fluorescence signal emitted from the sample due to the first fluorescence excitation. Operation 3740 optionally places a set of fourth filters on remaining columns of cameras of the array of cameras for capturing second fluorescence excitation. Operation 3750 modifies fusing algorithm to account for new overlapped filed of views of the adjacent cameras.

FIGS. 38A-38B illustrate flow charts for retrofitting a microscope system according to some embodiments. The microscope system is configured to capture images of two types of images.

In FIG. 38A, operation 3800 forms a retrofit assembly for a computational imaging system, with the computational imaging system having an array of radiation sources and an array of cameras. The retrofit assembly can include a set of first filters configured to enable alternate columns of the radiation sources to generate radiation having wavelengths configured to generate fluorescence excitation on a sample. The retrofit assembly can include a set of second filters configured to enable columns of the cameras to capture the fluorescence signals emitted from the sample due to the fluorescence excitation. The retrofit assembly can include a modification of fuse algorithm to account for a new overlapped field of view of adjacent alternate columns of the cameras.

In FIG. 38B, operation 3820 forms a retrofit assembly for a computational imaging system, with the computational imaging system having an array of radiation sources and an array of cameras. The retrofit assembly can include two sets of first and second filters configured to enable alternate columns of the radiation sources to generate radiation having wavelengths configured to generate two different fluorescence excitation on a sample. The retrofit assembly can include two sets of third and fourth filters configured to enable alternate columns of the cameras to capture the fluorescence signals emitted from the sample due to the different fluorescence excitation. The retrofit assembly can include a modification of fuse algorithm to account for a new overlapped field of view of adjacent alternate columns of the cameras.

In some embodiments, the present invention discloses a computational fluorescence microscope system for capturing two types of images, such as two types of fluorescence images, or one type of fluorescence image and a visible light image. The camera array can be formed by making alternate columns of camera units becoming camera units of the second type, together with swapping the camera units by shifting the filters.

FIGS. 39A-39B illustrate a configuration for a computational fluorescence microscope system according to some embodiments. FIG. 39A shows a camera view and FIG. 39B shows a shifted camera view of a computational fluorescence microscope system.

A computational fluorescence microscope system can have an illumination source 3930 and 3940 and a camera array 3910 for capturing images of a sample 3920 or a portion of the sample. A controller can be used to control the illumination system to provide different fluorescence excitation illumination patterns to the sample.

The computational fluorescence microscope system can be configured with two types of emission filter for the camera units, together with two types of corresponding fluorescence excitation filter for the radiation source units of the illumination source. Alternatively, the computational fluorescence microscope system can be configured with one type of emission filter for a portion, such as half, of the camera units, together with one type of corresponding fluorescence excitation filter for a portion, such as half, of the radiation source units.

The illumination source can include k groups of radiation source units, with each group having two radiation source units 3935A and 3935B as bottom illumination source and 3945A and 3945B as top illumination source. The camera array can include n groups of camera units, with each group having two camera units 3915A and 3915B configured to capture images of the different fluorescence signals emitted by the sample due to the different fluorescence excitation caused by the radiation source units through the different types of fluorescence excitation filters.

The emission filters can be shifted to swap the camera units. For example, a first column of camera units is under a first type of emission filter, and a second column of camera units is under a second type of emission filter. By shifting the emission filters, the first column of camera units is under a second type of emission filter, and the second column of camera units is under a first type of emission filter. Thus, by taking two sets of images for the different positions of the filters, under a same illumination pattern, the number of images captured by the camera array can double, with the images being similarly overlapped in both directions. The fusing algorithm can be the same in both directions.

The controller can be provided with an original fusing algorithm, with the same number of images for each type of images.

FIG. 40 illustrates a flow chart for forming a computational microscope according to some embodiments. Operation 4000 forms a computational imaging system, with the computational imaging system having an array of radiation sources and an array of cameras.

The radiation sources can include multiple sets of radiation sources, with each set of radiation sources configured to generate radiation having a different band of wavelengths with each band configured to generate a different fluorescence excitation on the sample, or with a first set of radiation sources configured to illuminate a sample, and a second set of radiation source configured to generate radiation having a band of wavelengths configured to generate a fluorescence excitation on the sample.

The camera units can include multiple cameras arranged in rows and columns.

The computational imaging system can include a set of filters configured to change a capture characteristic of the cameras in alternate columns, wherein the set of filters is configured to be movable along the row direction. The set of filters is configured to at least one of cameras in alternate rows are configured to capture fluorescence signals emitted from the sample due to the fluorescence excitation based on a band of wavelengths, or cameras in first alternate rows are configured to capture images illuminated by the first set of radiation sources, cameras in second alternate rows are configured to capture fluorescence signals emitted from the sample due to the fluorescence excitation based on the band of wavelengths.

The computational imaging system comprises a fusing algorithm to fuse images captured from each set of cameras.

Figure 41:
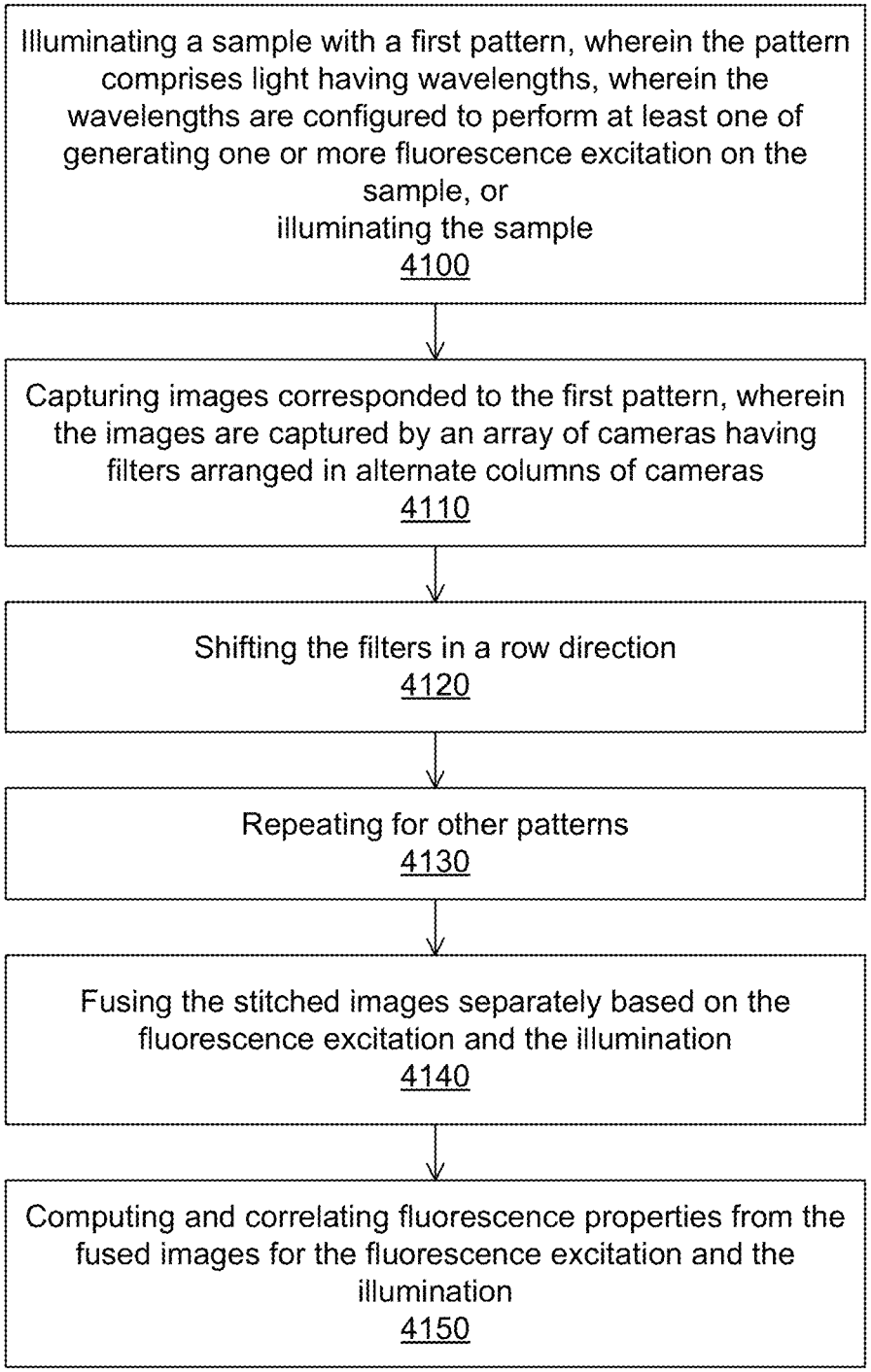
FIG. 41 illustrates a flow chart for operating a computational microscope according to some embodiments.

FIG. 41 illustrates a flow chart for operating a computational microscope according to some embodiments. Operation 4100 illuminates a sample with a first pattern, with the pattern having radiation having wavelengths configured to perform at least one of generating one or more fluorescence excitation on the sample, or illuminating the sample. Operation 4110 captures images corresponded to the first pattern, with the images captured by an array of cameras having filters arranged in alternate columns of cameras. Operation 4110 shifts the filters in a row direction. Operation 4110 repeats for other patterns. Operation 4110 fuses the stitched images separately based on the fluorescence excitation and the illumination. Operation 4110 computes and correlates fluorescence properties from the fused images for the fluorescence excitation and the illumination.

In some embodiments, the present invention discloses a retrofit kit for a computational microscope system to turn the computational microscope system into a computational fluorescence microscope system suitable for two types of image captures. The retrofit kit can include a set of fluorescence excitation filter for the radiation source units and a set of corresponding emission filter for the camera units, together with a moving mechanism to shift the filters.

FIGS. 42A-42B illustrate a configuration for a computational fluorescence microscope system according to some embodiments. FIG. 42A shows a retrofit kit and FIG. 42B shows a computational fluorescence microscope system with the retrofit kit.

In FIG. 42A, a retrofit kit can include a set 4218 of emission filter for the camera units. The set 4218 of emission filter can be configured to be placed on the lenses of the camera units, to limit the radiation captured by the camera units to the wavelength range determined by the emission filter. The set of emission filter can include one or more large plates for covering multiple camera units. Alternatively, the set of emission filter can include multiple individual covers for individual camera units.

The retrofit kit can include sets 4238 and 4248 of fluorescence excitation filter for the radiation source units. For example, a set 4238 can be used for the bottom radiation source units, and a set 4248 can be used for the top radiation source units. Alternatively, the retrofit can only include a top set 4248 or a bottom set 4238. The set of fluorescence excitation filter is configured to be placed on the radiation source units to limit the radiation generated by the radiation source units to the wavelength range determined by the fluorescence excitation filter. The set of fluorescence excitation filter can include one or more large plates for covering multiple radiation source units. Alternatively, the set of fluorescence excitation filter can include multiple individual covers for individual radiation source units.

The set 4218 of emission filters for the camera units can be mounted on a moving mechanism to shift the set of filters from one column of camera units to an adjacent column of camera units. The set of filters can have an extra column at one end, in order to cover the column of camera units, for example, at a left/right side when the set of filters is shifted to the right/left, respectively.

The retrofit kit can include modification to the controller. For example, the controller can be modified to form illumination patterns with each pattern including radiation from two different radiation source units. The controller can be modified to control the moving mechanism to shift the set of filters. The controller can be modified to adjust the fusing algorithm for a different number of images captured by the camera units. Further, the controller can be modified to calculate and correlating fluorescence properties.

Figure 43:
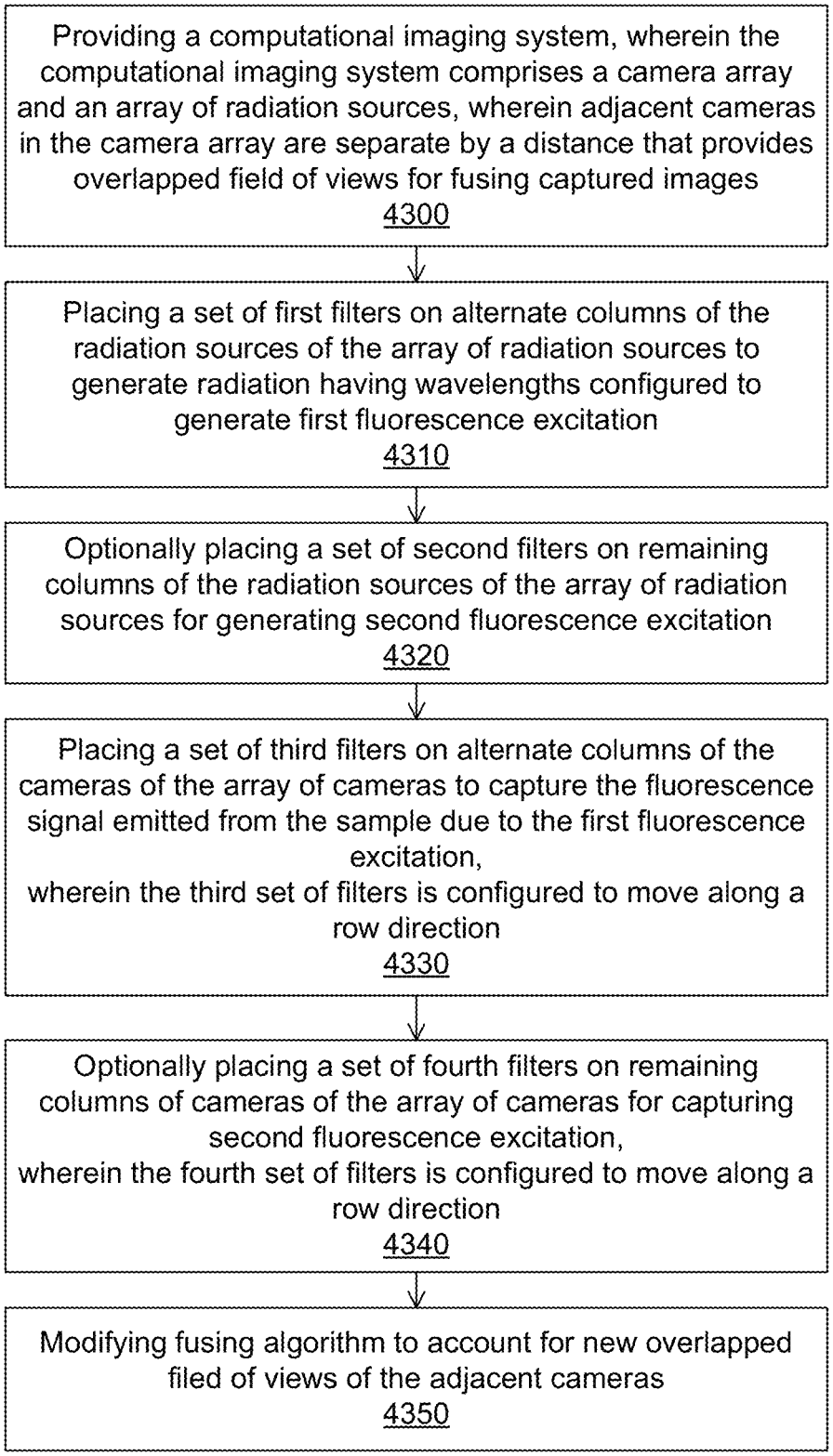
FIG. 43 illustrates a flow chart for forming a computational microscope according to some embodiments.

FIG. 43 illustrates a flow chart for forming a computational microscope according to some embodiments. Operation 4300 forms a computational imaging system, with the computational imaging system having an array of radiation sources and an array of cameras. The adjacent cameras in the camera array are separate by a distance that provides overlapped field of views for fusing captured images.

Operation 4310 places a set of first filters on alternate columns of the radiation sources of the array of radiation sources to generate radiation having wavelengths configured to generate first fluorescence excitation. Operation 4320 optionally places a set of second filters on remaining columns of the radiation sources of the array of radiation sources for generating second fluorescence excitation. Operation 4330 places a set of third filters on alternate columns of the cameras of the array of cameras to capture the fluorescence signal emitted from the sample due to the first fluorescence excitation. The third set of filters is configured to move along a row direction. Operation 4340 optionally places a set of fourth filters on remaining columns of cameras of the array of cameras for capturing second fluorescence excitation. The fourth set of filters is configured to move along a row direction.

Operation 4350 modifies a fusing algorithm to account for new overlapped filed of views of the adjacent camera units.

FIGS. 44A-44B illustrate flow charts for retrofitting a microscope system according to some embodiments. The microscope system is configured to capture images of two types of images.

In FIG. 44A, operation 4400 forms a retrofit assembly for a computational imaging system, with the computational imaging system having an array of radiation sources and an array of camera units. The retrofit assembly can include a set of first filters configured to enable alternate columns of the radiation sources to generate radiation having wavelengths configured to generate fluorescence excitation on a sample. The retrofit assembly can include a set of second filters configured to enable columns of the cameras to capture the fluorescence signals emitted from the sample due to the fluorescence excitation, wherein the set of second filters is configured to be movable along a row direction. The retrofit assembly can include a modification of fuse algorithm to account for a new overlapped field of view of adjacent alternate columns of the cameras In FIG. 44A, operation 4400 forms a retrofit assembly for a computational imaging system, with the computational imaging system having an array of radiation sources and an array of camera units. The retrofit assembly can include two sets of first and second filters configured to enable alternate columns of the radiation sources to generate radiation having wavelengths configured to generate two different fluorescence excitation on a sample. The retrofit assembly can include two sets of third and fourth filters configured to enable alternate columns of the cameras to capture the fluorescence signals emitted from the sample due to the different fluorescence excitation, with the sets of third and fourth filters configured to be movable along a row direction. The retrofit assembly can include a modification of fuse algorithm to account for a new overlapped field of view of adjacent alternate columns of the camera units.

What is claimed is:

1. A computational fluorescence microscope comprising
a camera array,
   wherein the camera array comprises multiple first camera units configured to capture images through multiple first filters,
   wherein each first camera unit of the multiple first camera units is configured to capture images through a first filter of the multiple first filters;
an illumination source,
   wherein the illumination source comprises one or more first radiation source units configured to generate first radiation through one or more second filters,
   wherein each first radiation source unit of the one or more first radiation source units is configured to generate first radiation through a second filter of the one or more second filters,
   wherein the second filter of the one or more second filters is configured to provide fluorescence excitation to a sample for the computational fluorescence microscope, which emits a first fluorescence signal passing through the first filter of the multiple first filters;

a controller,
- wherein the controller is configured to control the one or more first radiation source units to generate a first illumination pattern,
- wherein the controller is configured to control the multiple first camera units to capture images of areas of the sample under the first illumination pattern,
- wherein the controller is configured to calculate a fluorescence property of the sample based on the captured images.

2. A microscope as in claim 1,
wherein the camera array consists of the multiple first camera units,
wherein the illumination source consists of the one or more first radiation source units.

3. A microscope as in claim 1,
wherein the multiple first camera units are configured to capture individual and non overlapped areas of the sample.

4. A microscope as in claim 1,
wherein at least two different areas of the sample having images captured by two different first camera units of the multiple first camera units are partially overlapped,
wherein the overlapped images captured by the two different first camera units are configured to be suitable for stitching,
wherein the controller is configured to stitch the overlapped images captured by the two different first camera units.

5. A microscope as in claim 1,
wherein at least two different areas of the sample having images captured by two different first camera units of the multiple first camera units are partially overlapped,
wherein the overlapped images captured by the two different first camera units are configured to be suitable for fusing,
wherein the controller is configured to fused the overlapped images captured by the two different first camera units to form a first image reconstruction of the sample.

6. A microscope as in claim 1,
wherein the first filter comprise a band pass filter having wavelengths between 490 and 530 nm,
wherein the second filter comprise a high pass filter having wavelengths smaller than 500 nm.

7. A microscope as in claim 1,
wherein the first filter comprise a band pass filter having wavelengths between 590 and 630 nm,
wherein the second filter comprise a band pass filter for at least a wavelength of 545 nm.

8. A microscope as in claim 1,
wherein the camera array further comprises multiple second camera units configured to capture images through multiple third filters,
wherein each second camera unit of the multiple second camera units is configured to capture images through a third filter of the multiple third filters,
wherein the illumination source further comprises one or more second radiation source units configured to generate second radiation through one or more fourth filters,
wherein each second radiation source unit of the one or more second radiation source units is configured to generate second radiation through a fourth filter of the one or more fourth filters,
wherein fourth filter of the one or more fourth filters is configured to provide fluorescence excitation to the sample, which emits a second fluorescence signal passing through a third filter of the multiple third filters,
wherein the controller is configured to control the one or more first and second radiation source units to generate the first illumination pattern.

9. A microscope as in claim 1,
wherein the multiple first camera units are configured to capture images through multiple third filters by a moving mechanism configured to exchange the multiple first filters with the multiple third filters, so that each first camera unit of the multiple first camera units is configured to capture images through a third filter of the multiple third filters,
wherein the multiple first camera units are configured to capture images through the multiple third filters under a second illumination pattern,
wherein the illumination source further comprises one or more second radiation source units configured to generate second radiation through one or more fourth filters,
wherein each second radiation source unit of the one or more second radiation source units is configured to generate second radiation through a fourth filter of the one or more fourth filters,
wherein the fourth filter of the one or more fourth filters is configured to provide fluorescence excitation to the sample, which emits a second fluorescence signal passing through the third filter of the multiple third filters,
wherein the controller is configured to control the one or more second radiation source units to generate the second illumination pattern.

10. A microscope as in claim 1,
wherein the camera array further comprises multiple second camera units configured to capture images without filters,
wherein the illumination source further comprises one or more second radiation source units configured to generate second radiation without filters,
wherein the controller is configured to control the one or more first and second radiation source units to generate the first illumination pattern.

11. A microscope as in claim 1,
wherein the camera array further comprises multiple second camera units configured to capture images through multiple third filters,
wherein each second camera unit of the multiple second camera units is configured to capture images through a third filter of the multiple third filters,
wherein the camera array further comprises multiple third camera units configured to capture images without filters,
wherein the illumination source further comprises one or more second radiation source units configured to generate second radiation through one or more fourth filters,
wherein each second radiation source unit of the one or more second radiation source units is configured to generate second radiation through a fourth filter of the one or more fourth filters,
wherein the fourth filter of the one or more fourth filters is configured to provide fluorescence excitation to the sample, which emits a second fluorescence signal passing through the third filter of the multiple third filters,
wherein the illumination source further comprises one or more third radiation source units configured to generate third radiation without filters,
wherein the controller is configured to control the one or more first, second, and third radiation source units to generate the first illumination pattern.

12. A computational fluorescence microscope comprising a camera array,
   wherein the camera array comprises multiple first camera units configured to capture images through multiple first filters,
   wherein each first camera unit of the multiple first camera units is configured to capture images through a first filter of the multiple first filters,
   wherein the camera array comprises multiple second camera units configured to capture images through multiple second filters,
   wherein each second camera unit of the multiple second camera units is configured to capture images through a second filter of the multiple second filters;
an illumination source,
   wherein the illumination source comprises one or more first radiation source units configured to generate first radiation through one or more third filters,
   wherein each first radiation source unit of the one or more first radiation source units is configured to generate first radiation through a third filter of the one or more third filters,
   wherein the third filter of the one or more third filters is configured to provide fluorescence excitation to a sample for the computational fluorescence microscope, which emits a first fluorescence signal passing through the first filter of the multiple first filters,
   wherein the illumination source comprises one or more second radiation source units configured to generate second radiation through one or more fourth filters,
   wherein each second radiation source unit of the one or more second radiation source units is configured to generate second radiation through a fourth filter of the one or more fourth filters,
   wherein the fourth filter of the one or more fourth filters is configured to provide fluorescence excitation to the sample, which emits a second fluorescence signal passing through the second filter of the multiple second filters;
a controller,
   wherein the controller is configured to control at least one of the one or more first radiation source units or the one or more second radiation source units to generate one or more illumination patterns,
   wherein the controller is configured to control the multiple first and second camera units to capture images of areas of the sample under each of the one or more illumination patterns,
   wherein the controller is configured to calculate a fluorescence property of the sample based on the captured images.

13. A microscope as in claim 12,
wherein the multiple first camera units and the multiple second camera units are interleaved.

14. A microscope as in claim 12,
wherein the multiple first and second camera units are configured to capture individual and non overlapped areas of the sample.

15. A microscope as in claim 12,
wherein at least two different areas of the sample having images captured by two different first camera units of the multiple first camera units are partially overlapped,
wherein the overlapped images captured by the two different first camera units are configured to be suitable for stitching or for fusing,
wherein the controller is configured to stitch or fuse the overlapped images captured by the two different first camera units,
wherein at least two different areas of the sample having images captured by two different second camera units of the multiple second camera units are partially overlapped,
wherein the overlapped images captured by the two different second camera units are configured to be suitable for stitching or for fusing,
wherein the controller is configured to stitch or fuse the overlapped images captured by the two different second camera units.

16. A computational fluorescence microscope comprising a camera array,
   wherein the camera array comprises multiple first camera units configured to capture images through multiple first filters of a set of filters,
   wherein each first camera unit of the multiple first camera units is configured to capture images through a first filter of the multiple first filters,
   wherein the multiple first camera units are configured to capture images through the multiple first filters under one or more first illumination patterns,
   wherein the set of filters further comprises multiple second filters arranged in an interleaved configuration with the multiple first filters,
   wherein the multiple first camera units are configured to capture images through the multiple second filters of the set of filters by a moving mechanism configured to exchange the multiple first filters with the multiple second filters, so that each first camera unit of the multiple first camera units is configured to capture images through a second filter of the multiple second filters,
   wherein the multiple first camera units are configured to capture images through the multiple second filters under one or more second illumination patterns;
an illumination source,
   wherein the illumination source comprises one or more first radiation source units configured to generate first radiation through one or more third filters,
   wherein each first radiation source unit of the one or more first radiation source units is configured to generate first radiation through a third filter of the one or more third filters,
   wherein the third filter of the one or more third filters is configured to provide fluorescence excitation to a sample for the computational fluorescence microscope, which emits a first fluorescence signal passing through the first filter of the multiple first filters,
   wherein the illumination source further comprises one or more second radiation source units configured to generate second radiation through one or more fourth filters,
   wherein each second radiation source unit of the one or more second radiation source units is configured to generate second radiation through a fourth filter of the one or more fourth filters, wherein the fourth filter of the one or more fourth filters is configured to provide fluorescence excitation to the sample, which emits a second fluorescence signal passing through the second filter of the multiple second filters;

a controller,
- wherein the controller is configured to control at least the one or more first radiation source units to generate the one or more first illumination patterns,
- wherein the controller is configured to control at least the one or more second radiation source units to generate the one or more second illumination patterns,
- wherein the controller is configured to control the camera array to capture images of areas of the sample under the one or more first and second illumination patterns,
- wherein the controller is configured to calculate a fluorescence property of the sample based on the captured images.

17. A microscope as in claim 16,
wherein the multiple first and second camera units are configured to capture individual and non overlapped areas of the sample.

18. A microscope as in claim 16,
wherein at least two different areas of the sample having images captured by two different first camera units of the multiple first camera units are partially overlapped,
wherein the overlapped images captured by the two different first camera units are configured to be suitable for stitching or for fusing,
wherein the controller is configured to stitch or fuse the overlapped images captured by the two different first camera units,
wherein at least two different areas of the sample having images captured by two different second camera units of the multiple second camera units are partially overlapped,
wherein the overlapped images captured by the two different second camera units are configured to be suitable for stitching or for fusing,
wherein the controller is configured to stitch or fuse the overlapped images captured by the two different second camera units.

19. A computational fluorescence microscope comprising
a camera array,
- wherein the camera array comprises multiple first camera units configured to capture images through multiple first filters,
- wherein each first camera unit of the multiple first camera units is configured to capture images through a first filter of the multiple first filters,
- wherein the camera array comprises multiple second camera units configured to capture images without filters;

an illumination source,
- wherein the illumination source comprises one or more first radiation source units configured to generate first radiation through one or more second filters,
- wherein each first radiation source unit of the one or more first radiation source units is configured to generate first radiation through a second filter of the one or more second filters,
- wherein the second filter of the one or more second filters is configured to provide fluorescence excitation to a sample for the computational fluorescence microscope, which emits a first fluorescence signal passing through the first filter of the multiple first filters, wherein the illumination source comprises one or more second radiation source units configured to generate second radiation without filters;

a controller,
- wherein the controller is configured to control at least one of the one or more first radiation source units or the one or more second radiation source units to generate one or more illumination patterns,
- wherein the controller is configured to control the multiple first and second camera units to capture images of areas of the sample under each of the one or more illumination patterns,
- wherein the controller is configured to calculate a fluorescence property and a non-fluorescence property of the sample based on the captured images.

20. A microscope as in claim 19,
wherein the camera array further comprises multiple third camera units configured to capture images through multiple third filters,
wherein each second camera unit of the multiple third camera units is configured to capture images through a third filter of the multiple third filters,
wherein the illumination source further comprises one or more third radiation source units configured to generate third radiation through one or more fourth filters,
wherein each third radiation source unit of the one or more third radiation source units is configured to generate third radiation through a fourth filter of the one or more fourth filters,
wherein the fourth filter of the one or more fourth filters is configured to provide fluorescence excitation to the sample, which emits a second fluorescence signal passing through the third filter of the multiple third filters,
wherein the controller is configured to control the one or more first, second, and third radiation source units to generate the first illumination pattern.

* * * * *